(12) United States Patent
Lochkovic et al.

(10) Patent No.: US 7,050,688 B2
(45) Date of Patent: May 23, 2006

(54) FIBER OPTIC ARTICLES, ASSEMBLIES, AND CABLES HAVING OPTICAL WAVEGUIDES

(75) Inventors: Gregory A. Lochkovic, Conover, NC (US); Sheila A. Cooper, Hickory, NC (US); Leigh R. Josey, Hickory, NC (US); James A. Register, III, Hickory, NC (US); Larry W. Self, Newton, NC (US); Edward J. Fewkes, Horseheads, NY (US); Michael J. Winningham, Big Flats, NY (US); Huan-Hung Sheng, Charlotte, NC (US); Michelle D. Fabian, Horseheads, NY (US)

(73) Assignee: Corning Cable Systems LLC, Hickory, NC (US)

( * ) Notice: Subject to any disclaimer, the term of this patent is extended or adjusted under 35 U.S.C. 154(b) by 229 days.

(21) Appl. No.: 10/623,219

(22) Filed: Jul. 18, 2003

(65) Prior Publication Data

US 2005/0013573 A1    Jan. 20, 2005

(51) Int. Cl.
*G02B 6/44* (2006.01)
(52) U.S. Cl. ...................... 385/128; 385/114
(58) Field of Classification Search ............... 385/114, 385/128
See application file for complete search history.

(56) References Cited

U.S. PATENT DOCUMENTS

| 4,474,830 | A |   | 10/1984 | Taylor ...................... 427/54.1 |
| 4,514,037 | A |   | 4/1985  | Bishop et al. ........... 350/96.23 |
| 4,552,433 | A | * | 11/1985 | Titchmarsh et al. ........ 385/107 |
| 4,581,165 | A |   | 4/1986  | Frank et al. ............. 260/112.5 |
| 4,609,718 | A |   | 9/1986  | Bishop et al. ............... 528/49 |
| 4,629,287 | A |   | 12/1986 | Bishop ..................... 350/96.34 |
| 4,682,850 | A | * | 7/1987  | White et al. ................ 385/109 |
| 4,682,851 | A |   | 7/1987  | Ansel ...................... 350/96.34 |
| 4,798,852 | A |   | 1/1989  | Zimmerman et al. ......... 522/96 |
| 4,900,126 | A | * | 2/1990  | Jackson et al. ............. 385/114 |
| 4,962,992 | A |   | 10/1990 | Chapin et al. ........... 350/96.23 |
| 5,062,685 | A |   | 11/1991 | Cain et al. ............... 350/96.23 |
| 5,093,386 | A |   | 3/1992  | Bishop et al. ................ 522/96 |
| 5,104,433 | A |   | 4/1992  | Chapin et al. ................ 65/3.1 |
| 5,388,175 | A |   | 2/1995  | Clarke ........................ 385/100 |
| 5,408,564 | A |   | 4/1995  | Mills .......................... 385/128 |
| 5,416,880 | A | * | 5/1995  | Edwards et al. ............ 385/128 |
| 5,420,955 | A |   | 5/1995  | Cooke et al. ................ 385/110 |
| 5,442,722 | A |   | 8/1995  | DeCarlo ..................... 385/114 |
| 5,527,835 | A |   | 6/1996  | Shustack ..................... 522/42 |

(Continued)

FOREIGN PATENT DOCUMENTS

WO    WO 99/17144    *   4/1999

*Primary Examiner*—John D. Lee
*Assistant Examiner*—Mike Stahl
(74) *Attorney, Agent, or Firm*—Michael E. Carroll, Jr.

(57) ABSTRACT

Fiber optic articles, assemblies, and cables preserve optical performance by using optical waveguides having a core, a cladding, and a coating system according to the present invention. Moreover, the optical articles, assemblies, and cables of the present invention may achieve performance levels that were previously unattainable, for instance, the present invention contemplates acceptable optical performance for wavelengths such as 1625 nm and higher. Additionally, articles, assemblies, and/or cables of the present invention advantageously preserve optical performance, i.e., have relatively low delta attenuation, when subjected to manufacturing processes and/or environmental conditions such as temperature cycling. In other words, the articles, assemblies, and cables can withstand increased stress/strain before having significant attenuation.

44 Claims, 33 Drawing Sheets

U.S. PATENT DOCUMENTS

| | | | | |
|---|---|---|---|---|
| 5,561,730 A * | 10/1996 | Lochkovic et al. | ......... | 385/114 |
| 5,561,731 A * | 10/1996 | Cooke et al. | ............... | 385/114 |
| 5,566,266 A | 10/1996 | Nave et al. | ................. | 285/113 |
| 5,639,846 A | 6/1997 | Shustack | ..................... | 528/44 |
| 5,744,514 A | 4/1998 | Shustack | .................... | 522/42 |
| 5,768,460 A | 6/1998 | Levi et al. | ................. | 385/114 |
| 5,837,750 A | 11/1998 | Szum et al. | .................. | 522/81 |
| 5,852,698 A | 12/1998 | Bringuier | ................... | 385/113 |
| 5,857,051 A * | 1/1999 | Travieso et al. | ............ | 385/114 |
| 5,908,484 A | 6/1999 | Decker et al. | ................ | 65/377 |
| 5,917,978 A | 6/1999 | Rutterman | .................. | 385/109 |
| 5,970,196 A | 10/1999 | Greveling et al. | ........... | 385/114 |
| 6,014,487 A | 1/2000 | Field et al. | ................. | 385/110 |
| 6,014,488 A | 1/2000 | Shustack | .................... | 385/128 |
| 6,023,547 A * | 2/2000 | Tortorello | ................... | 385/114 |
| 6,025,422 A | 2/2000 | Hall | ............................. | 524/405 |
| 6,035,087 A * | 3/2000 | Bonicel et al. | ............. | 385/109 |
| 6,049,647 A | 4/2000 | Register et al. | ............. | 385/101 |
| 6,057,018 A * | 5/2000 | Schmidt | .................... | 428/36.9 |
| 6,057,034 A | 5/2000 | Yamazaki et al. | .......... | 428/378 |
| 6,064,789 A * | 5/2000 | Mills | ......................... | 385/114 |
| 6,075,065 A | 6/2000 | Yamazaki et al. | ............ | 522/64 |
| 6,097,866 A * | 8/2000 | Yang et al. | ................. | 385/114 |
| 6,101,305 A | 8/2000 | Wagman et al. | ............ | 385/113 |
| 6,110,593 A | 8/2000 | Szum et al. | ................ | 428/383 |
| 6,122,424 A | 9/2000 | Bringuier | ..................... | 385/100 |
| 6,136,880 A | 10/2000 | Snowwhite et al. | .......... | 522/64 |
| 6,192,178 B1 | 2/2001 | Logan et al. | ................ | 385/109 |
| 6,195,486 B1 | 2/2001 | Field et al. | ................. | 385/100 |
| 6,215,934 B1 | 4/2001 | Aloisio, Jr. et al. | ......... | 385/128 |
| 6,243,523 B1 | 6/2001 | Aloisio et al. | ............... | 385/128 |
| 6,249,629 B1 | 6/2001 | Bringuier | ..................... | 385/113 |
| 6,253,013 B1 | 6/2001 | Lochkovic et al. | .......... | 385/114 |
| 6,289,158 B1 | 9/2001 | Blyler et al. | ................. | 385/128 |
| 6,298,189 B1 | 10/2001 | Szum et al. | ................. | 385/128 |
| 6,304,701 B1 | 10/2001 | Bringuier et al. | ........... | 385/106 |
| 6,316,516 B1 | 11/2001 | Chien et al. | .................. | 522/91 |
| 6,326,416 B1 | 12/2001 | Chien et al. | .................. | 522/91 |
| 6,356,690 B1 | 3/2002 | McAlpine et al. | .......... | 385/109 |
| 6,360,044 B1 | 3/2002 | Mills et al. | .................. | 385/114 |
| 6,363,192 B1 | 3/2002 | Spooner | ...................... | 385/101 |
| 6,370,303 B1 * | 4/2002 | Fitz et al. | .................... | 385/113 |
| 6,370,304 B1 | 4/2002 | Mills et al. | ................. | 385/114 |
| 6,374,023 B1 | 4/2002 | Parris | ......................... | 385/109 |
| 6,389,204 B1 | 5/2002 | Hurley | ........................ | 385/102 |
| 6,449,412 B1 | 9/2002 | Rutterman et al. | ......... | 385/103 |
| 6,463,199 B1 | 10/2002 | Quinn et al. | ................ | 385/109 |
| 6,472,450 B1 | 10/2002 | Szum et al. | ................. | 522/81 |
| 6,487,347 B1 | 11/2002 | Bringuier | .................... | 385/113 |
| 6,496,628 B1 * | 12/2002 | Opel et al. | .................. | 385/110 |
| 6,501,887 B1 | 12/2002 | Bringuier et al. | ............ | 385/109 |
| 6,501,888 B1 | 12/2002 | Gimblet et al. | .............. | 385/113 |
| 6,519,399 B1 | 2/2003 | Strong et al. | ................ | 385/114 |
| 6,528,553 B1 | 3/2003 | Komiya et al. | ................ | 522/96 |
| 6,531,522 B1 | 3/2003 | Winningham | ................. | 522/96 |
| 6,534,557 B1 | 3/2003 | Szum et al. | ................... | 522/90 |
| 6,535,673 B1 | 3/2003 | Lochkovic | .................... | 385/114 |
| 6,539,152 B1 | 3/2003 | Fewkes et al. | .............. | 385/114 |
| 6,542,674 B1 | 4/2003 | Gimblet | ...................... | 385/113 |
| 6,546,175 B1 | 4/2003 | Wagman et al. | ............. | 385/113 |
| 6,553,167 B1 | 4/2003 | Hurley et al. | ................ | 385/102 |
| 6,553,169 B1 | 4/2003 | Fabian | ........................ | 385/128 |
| 6,559,197 B1 | 5/2003 | Fewkes et al. | .............. | 522/172 |
| 6,563,996 B1 * | 5/2003 | Winningham | ............... | 385/128 |
| 6,579,618 B1 | 6/2003 | Ishikawa et al. | ............. | 428/378 |
| 6,584,263 B1 | 6/2003 | Fewkes et al. | .............. | 385/128 |
| 6,602,601 B1 | 8/2003 | Fewkes et al. | .............. | 428/378 |
| 6,621,966 B1 | 9/2003 | Lail | ........................... | 385/114 |
| 6,633,709 B1 * | 10/2003 | VanVickle et al. | .......... | 385/112 |
| 6,636,673 B1 | 10/2003 | Register, III et al. | ....... | 385/105 |
| 6,671,441 B1 * | 12/2003 | Bocanegra et al. | ......... | 385/112 |
| 6,775,451 B1 | 8/2004 | Botelho et al. | .............. | 385/128 |
| 2002/0009272 A1 | 1/2002 | Parris | | |
| 2002/0102078 A1 | 8/2002 | Bringuier et al. | | |
| 2002/0102079 A1 | 8/2002 | Lail et al. | | |
| 2002/0102086 A1 | 8/2002 | Fewkes et al. | | |
| 2002/0146225 A1 | 10/2002 | Bulters et al. | | |
| 2002/0197030 A1 | 12/2002 | McAlpine et al. | | |
| 2002/0197040 A1 | 12/2002 | Takahashi et al. | | |
| 2003/0012530 A1 | 1/2003 | Yamasaki et al. | | |
| 2003/0016923 A1 | 1/2003 | Summers et al. | | |
| 2003/0018122 A1 | 1/2003 | Bishop et al. | | |
| 2003/0044140 A1 | 3/2003 | Fewkes et al. | | |
| 2003/0044141 A1 | 3/2003 | Melton et al. | | |
| 2003/0049446 A1 | 3/2003 | Schissel et al. | | |
| 2003/0059188 A1 | 3/2003 | Baker et al. | | |
| 2003/0077059 A1 | 4/2003 | Chien et al. | | |
| 2003/0091307 A1 | 5/2003 | Hurley et al. | | |
| 2003/0095770 A1 | 5/2003 | Fewkes et al. | | |
| 2003/0100627 A1 | 5/2003 | Bishop et al. | | |
| 2003/0118295 A1 | 6/2003 | Lail et al. | | |
| 2003/0118299 A1 | 6/2003 | Seddon et al. | | |
| 2003/0118300 A1 | 6/2003 | Seddon et al. | | |
| 2003/0118301 A1 | 6/2003 | Hurley et al. | | |
| 2003/0123839 A1 | 7/2003 | Chou et al. | | |
| 2003/0128941 A1 | 7/2003 | Lanier et al. | | |
| 2003/0174989 A1 | 9/2003 | Lanier et al. | | |
| 2003/0185529 A1 | 10/2003 | Register et al. | | |
| 2003/0197032 A1 | 10/2003 | Petit | | |
| 2003/0223713 A1 | 12/2003 | Chiasson et al. | | |
| 2003/0223714 A1 | 12/2003 | Conrad et al. | | |
| 2004/0022504 A1 | 2/2004 | Hurley et al. | | |
| 2004/0022510 A1 * | 2/2004 | Suzuki et al. | ................ | 385/128 |
| 2004/0052483 A1 | 3/2004 | Chandraiah et al. | | |

\* cited by examiner

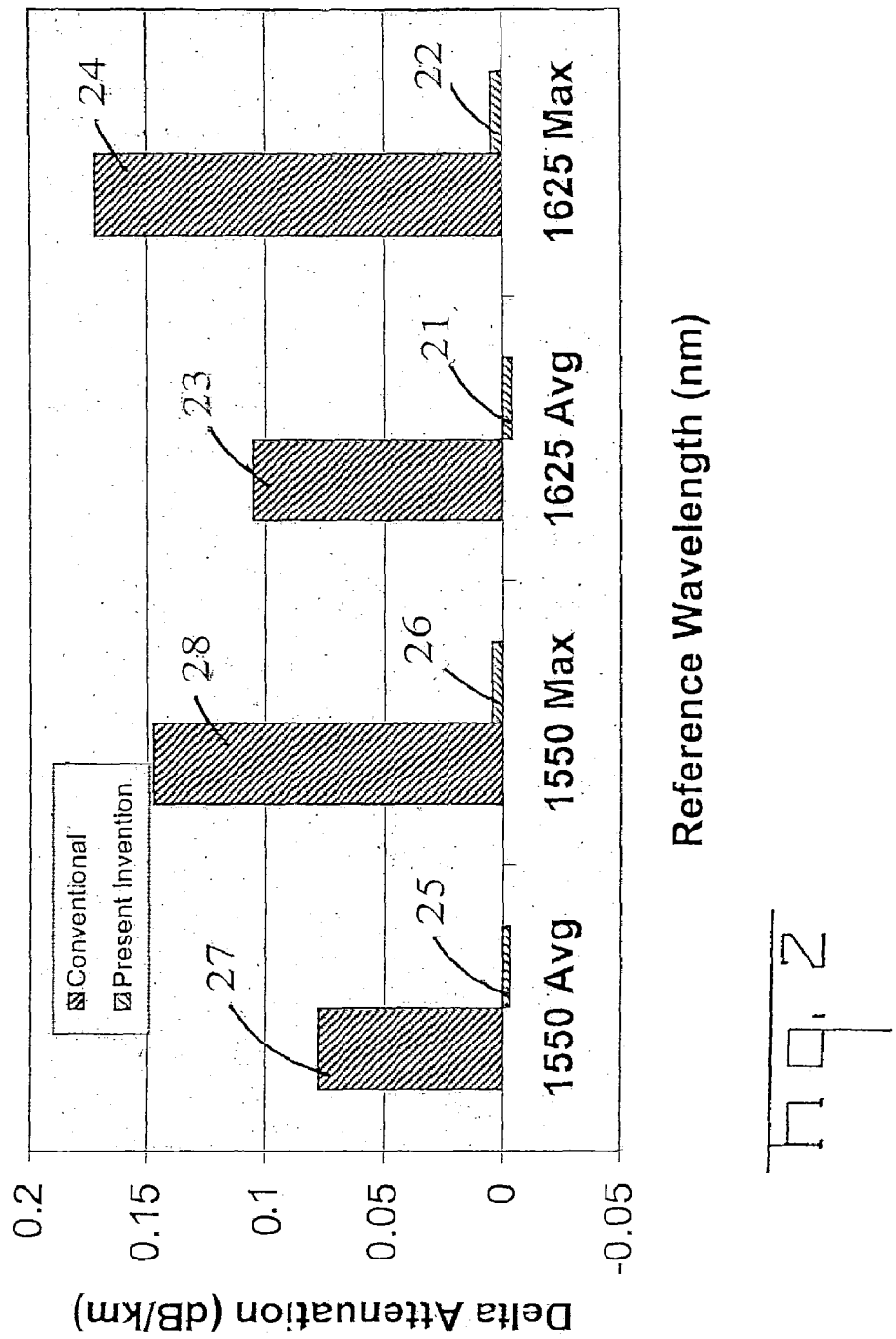

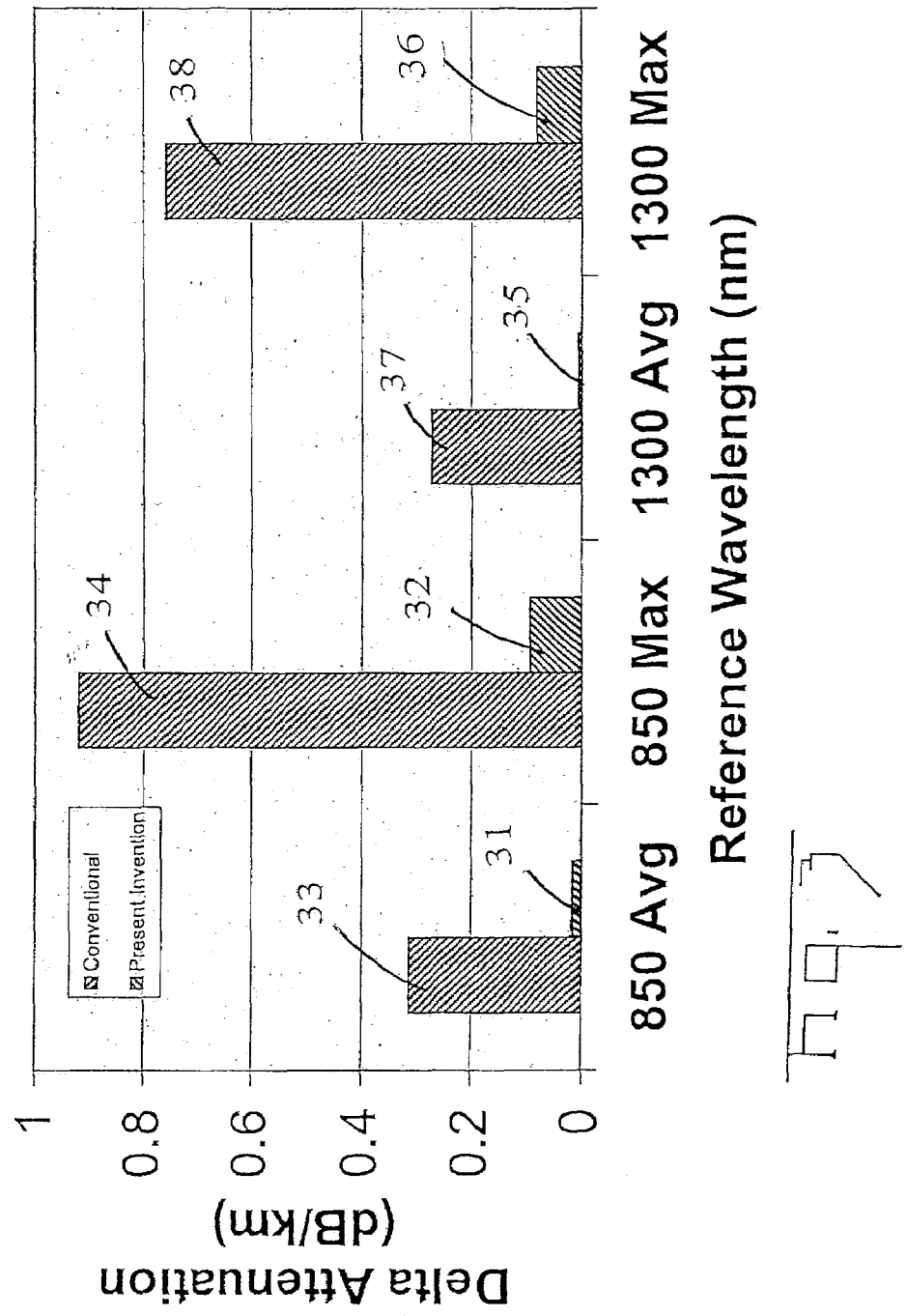

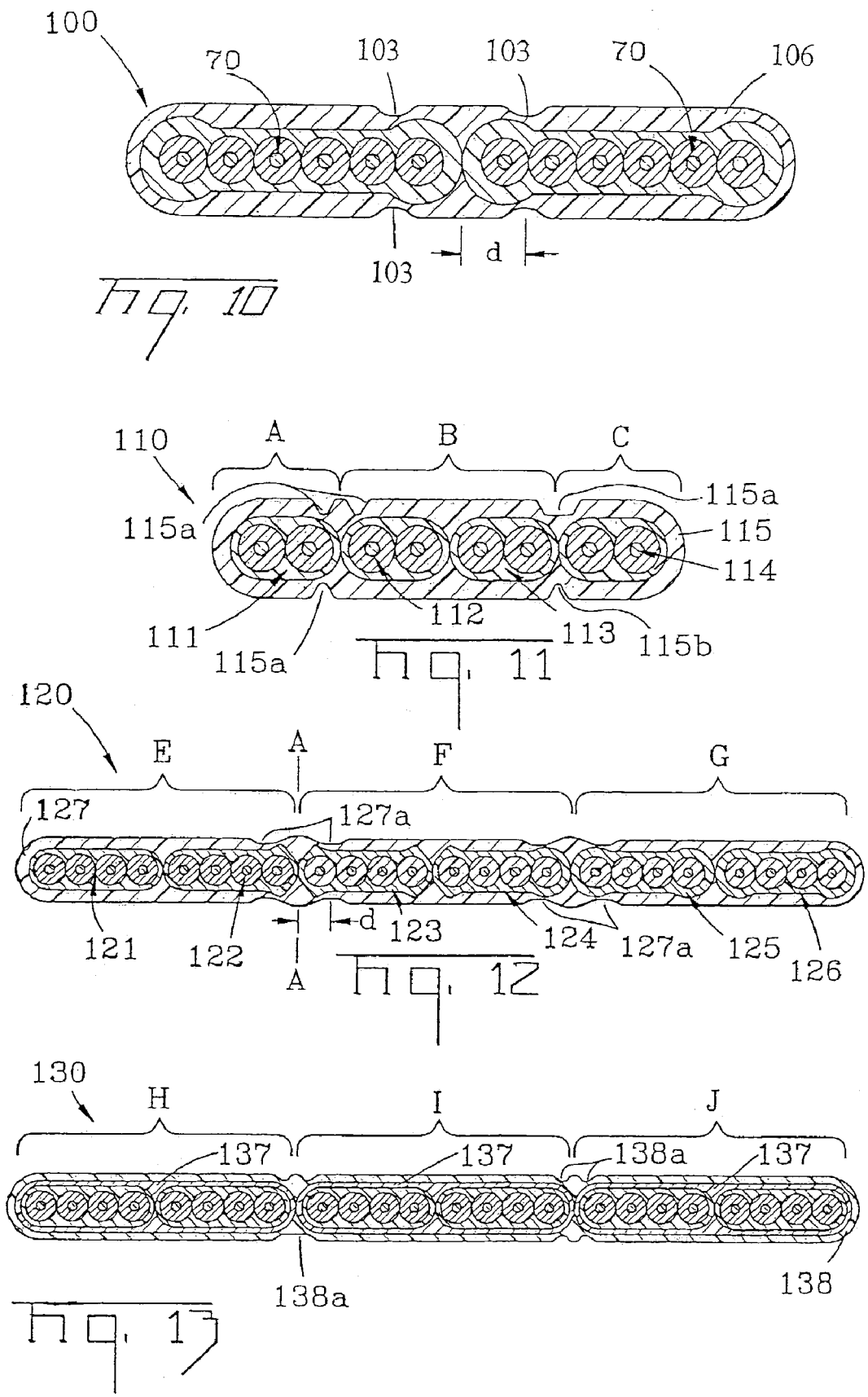

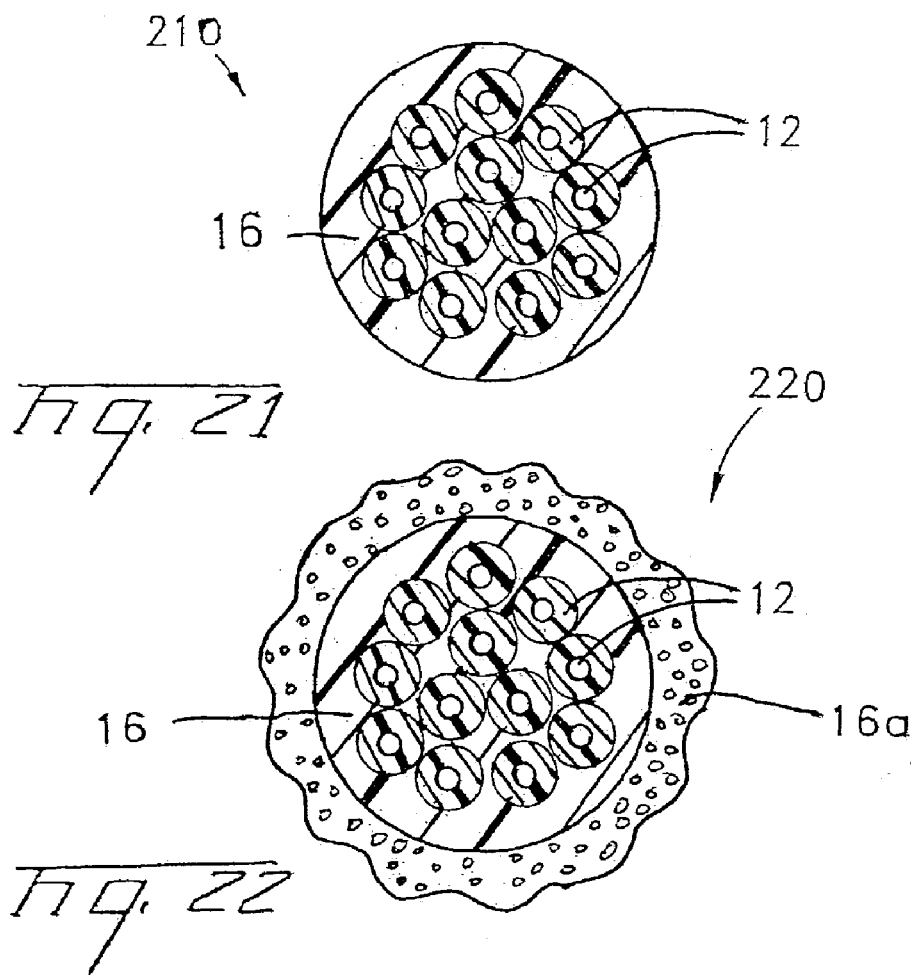
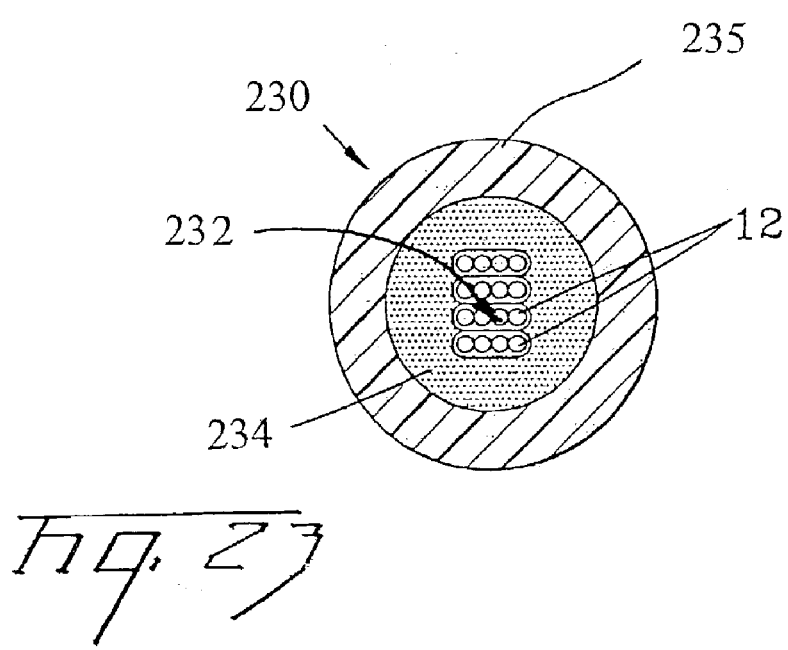

FIBER OPTIC ARTICLES, ASSEMBLIES, AND CABLES HAVING OPTICAL WAVEGUIDES

FIELD OF THE INVENTION

The present invention relates generally to fiber optic articles, assemblies, and cables. More specifically, the invention relates to fiber optic articles, assemblies, and cables that preserve optical performance.

BACKGROUND OF THE INVENTION

Optical articles, assemblies, and cables include optical waveguides such as optical fibers that transmit optical signals such as voice, video, and/or data information. Optical fibers are drawn from a glass preform/blank and are coated in a manufacturing process. After their manufacture, the optical fibers have a given optical performance level that is relatively sensitive to external forces that can degrade optical performance. Consequently, optical waveguides generally require packaging to protect them from the application of stresses and/or strains that can degrade optical performance. Unfortunately, the packaging of conventional optical waveguides into optical articles, assemblies, and cables often impart stresses that cause unavoidable degradation in optical performance. Likewise, environmental conditions can also degrade optical performance.

The degradation in optical performance between a final state and an initial state can be measured as delta attenuation. Delta attenuation is measured in terms of decibels per kilometer (dB/km) and represents a loss in optical power transmitted along the optical waveguide. A system designer must be concerned with these power losses when designing an optical network. For instance, transmitting/receiving equipment must have a signal with enough power to overcome the power losses, and maintain signal recognition. System designers must also balance optical network power requirements with cost considerations. Generally speaking, optical networks having relatively high losses require more components and/or components rated at higher power levels to overcome the optical network power losses. These additional and/or high power components add undesirable expense to the optical network.

SUMMARY OF THE INVENTION

In one embodiment, the present invention is directed to a fiber optic ribbon including a plurality of optical fibers and a joining material. At least one of the plurality of optical fibers having a core, a cladding, and a coating system as described herein. The joining material connects the plurality of optical fibers, thereby forming a planar structure. In preferred embodiments, the fiber optic ribbon has a maximum delta attenuation of about 0.050 dB/km or less for a ribbon optical performance test at a reference wavelength of 1550 nm.

The present invention is also directed to a tube assembly including at least one optical waveguide and a tube. The at least one optical waveguide has a core, a cladding, and a coating system as described herein and is disposed within the tube.

The present invention is further directed to a fiber optic cable including at least one optical waveguide and a jacket. The at least one optical waveguide has a core, a cladding, and a coating system as described herein and is disposed within the jacket.

BRIEF DESCRIPTION OF THE FIGURES

FIG. 2 is a bar graph depicting average and maximum delta attenuations for a single-mode fiber optic ribbons according to FIG. 1 and a conventional single-mode fiber optic ribbon using the ribbon optical performance test measured at reference wavelengths of 1550 nm and 1625 nm.

FIG. 3 is a bar graph depicting average and maximum delta attenuations for a 50 µm multi-mode fiber optic ribbon according to FIG. 1 and a conventional multi-mode fiber optic ribbon using the ribbon optical performance test measured at reference wavelengths of 850 nm and 1300 nm.

FIGS. 6–16 illustrate exemplary optical waveguide assemblies according to the present invention.

FIGS. 21 and 22 depict other exemplary optical waveguide assemblies according to the present invention.

FIGS. 23–27 depict exemplary tube assemblies according to the present invention.

FIGS. 62–68 depict exemplary drop cables according to the present invention.

DETAILED DESCRIPTION OF THE INVENTION

The present invention will now be described more fully hereinafter with reference to the accompanying drawings showing preferred embodiments, of the invention. The invention may, however, be embodied in many different forms and should not be construed as limited to the embodiments set forth herein; rather, these embodiments are provided so that the disclosure will fully convey the scope of the invention to those skilled in the art. The drawings are not necessarily drawn to scale but are configured to clearly illustrate the invention.

The present invention is directed to optical articles, assemblies, and cables that preserve optical performance. Moreover, the optical articles, assemblies, and cables, of the present invention may achieve performance levels that were previously unattainable, for instance, the present invention contemplates acceptable optical performance for wavelengths such as 1625 nm and higher. Likewise, cable engineers have new freedom in designing articles, assemblies, and/or cables using the concepts of the present invention while still maintaining acceptable optical performance. For instance, compared with conventional designs the assemblies and cables of the present invention can have fewer strength members, thinner tube walls and/or jackets, increased packing densities, and/or smaller sizes/diameters. Additionally, articles, assemblies, and/or cables of the present invention advantageously preserve optical performance, i.e., have low delta attenuation, when subjected to manufacturing processes and/or environmental conditions such as temperature cycling. In other words, the articles, assemblies, and cables can withstand increased stress/strain before having significant attenuation.

Figure 1:
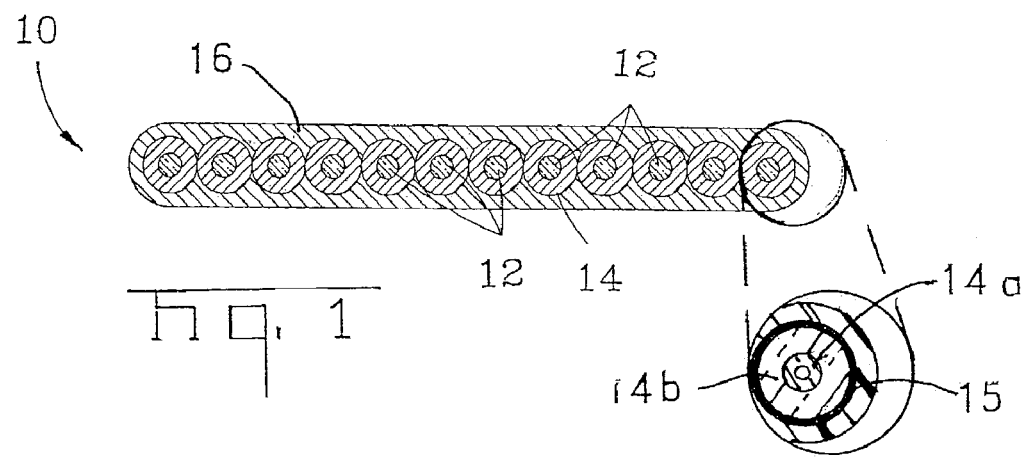
FIG. 1 is a cross-sectional view of a fiber optic ribbon according to the present invention.

FIG. 1 depicts a fiber optic assembly according to the present invention that includes at least one optical waveguide 12. More specifically, the fiber optic assembly is a fiber optic ribbon assembly 10 (hereinafter ribbon) and optical waveguide 12 is preferably an optical fiber. In this assembly, the at least one optical waveguide 12 is one of a plurality of optical waveguides connected by a joining material 16, thereby forming a planar structure. The at least one optical waveguide 12 has a coating system 14 that preserves its optical performance in ribbon 10. Generally speaking, coating system 14 has a relatively soft inner layer for cushioning purposes and a relatively hard outer layer for protection purposes. In one embodiment, ribbon 10 has at least one optical fiber 12 disposed at an end location of ribbon 10 as shown in FIG. 1, thereby occupying a position in the ribbon that typically experiences higher levels of stress and/or strain. In other variations of ribbon 10, all of the optical fibers of ribbon 10 are optical waveguides 12 according to the present invention.

The concepts of the present invention can be practiced with articles, assemblies, and cables having any suitable optical waveguide 12. For example, suitable optical fibers can be single-mode, multi-mode, pure-mode, erbium doped, polarization-maintaining fiber, large effective area fibers or other suitable types of light waveguides, and/or combinations thereof. Moreover, the packaging of articles, assemblies, and cables according to the present invention can take different forms such as ribbons, stacks of ribbons, tube assemblies, buffered optical waveguides, bundles of optical waveguides, cables, interconnect assemblies, and the like.

Each optical waveguide 12 may include a silica-based core (not numbered) that is operative to transmit light and is surrounded by a silica-based cladding (not numbered) having a lower index of refraction than the core. Additionally, optical waveguide 12 includes coating system 14 having an inner coating 14a and an outer coating 14b. Coating system 14 can also include an identifying means such as ink or other suitable indicia for identification purposes that includes an adhesion agent that inhibits the removal of the identifying means. Moreover, optical waveguide 12 can have any suitable size or shape. In one embodiment, two or more layers of coloring ink, or other suitable layers, are applied to the optical waveguide 12. Additionally, other advantageous embodiments of the present invention have other substances applied to coating system 14 as will be discussed herein. Inner coating 14a is a relatively soft coating that generally surrounds the cladding and serves to cushion the cladding and core, thereby aiding in preserving optical performance. Suitable inner coatings 14a of coating system 14 are disclosed in U.S. Pat. No. 6,563,996; U.S. patent application Pub. Nos. 2003/0077059 and 20030095770; and U.S. patent application Ser. No. 09/916,536 filed on Jul. 27, 2001, the disclosures of which are incorporated herein by reference. Outer coating 14b is a relatively rigid coating that generally surrounds inner coating 14a of optical waveguide 12. Suitable outer coatings 14b of coating system 14 are disclosed in U.S. patent application Pub. No. 2003/0059188 and U.S. patent application Ser. No. 09/722,895 filed on Nov. 27, 2000, the disclosures of which are incorporated herein by reference. Preferably, coating system 14 includes an inner coating 14a and an outer coating 14b as disclosed in the U.S. patent application filed even date herewith, listing Fabian, et al. as the inventive entity and titled "OPTICAL FIBER COATING SYSTEM AND COATED OPTICAL FIBER," the disclosure of which is incorporated herein by reference. Suitable optical waveguides of the present invention will be commercially available from Corning Incorporated of Corning, N.Y.

As the skilled artisan will appreciate, the inner coating 14a may be the cured reaction product of an inner coating curable composition. Similarly, outer coating 14b may each be the cured reaction product of an outer coating curable composition. Desirable inner and outer coating curable compositions are given below in Table 1. Curable compositions are formulated such that the amounts of oligomer, monomer, and photoinitiator total 100 wt %; other additives such as antioxidant are added to the total mixture in units of pph. KWS 4131 and BR3741 are oligomers from Bomar Specialties. PHOTOMER 4003, PHOTOMER 4028 and PHOTOMER 3016 fare monomers available from Cognis. PHOTOMER 4003 is ethoxylated(4) nonylphenol acrylate. PHOTOMER 4028 is ethoxylated(4EO/BP) Bisphenol A diacrylate. PHOTOMER 3016 is the diacrylated adduct of Bisphenol A diacrylate with two equivalents of glycidol. TONE M-100 is a caprolactone acrylate monomer available from Dow Chemical. IRGACURE 819 and IRGACURE 814 are photoinitiators available from Ciba Additives. IRGANQX 1035 is an antioxidant available from Ciba Additives.

TABLE 1

|  | Curable Composition | | | |
|---|---|---|---|---|
| Component | Inner A | Inner B | Inner C | Outer |
| BR 3741 (wt %) | 52 | 52 | 52 | — |
| KWS 4131 (wt %) | — | — | — | 10 |
| PHOTOMER 4003 (wt %) | 25 | 25 | 45 | — |
| TONE M-100 (wt %) | 20 | 20 | — | — |
| PHOTOMER 4028 | — | — | — | 82 |
| PHOTOMER 3016 | — | — | — | 5 |
| IRGACURE 819 (wt %) | 1.5 | 1.5 | 1.5 | 1.5 |
| IRGACURE 184 (wt %) | 1.5 | 1.5 | 1.5 | 1.5 |
| (3-acryloxypropyl)-trimethoxysilane (pph) | 1 | 1 | 1 | — |
| IRGANOX 1035 (pph) | 1 | 1 | 1 | 0.5 |

TABLE 1-continued

| Component | Curable Composition | | | |
|---|---|---|---|---|
| | Inner A | Inner B | Inner C | Outer |
| Pentaerythritol tetrakis (3-mercaptoproprionate) (pph) | — | 0.032 | 0.032 | — |

Besides inks, other substances such as release agents, and/or adhesion promoters may be applied to, or over, coating, system 14 as a further layer. For example, a release substance may be coated over an ink layer so that a matrix material or other joining material can be easily removed from the optical waveguides of assembly 10 without removing the ink layer. For instance, a suitable release agent is available commercially from Zeon of Charlotte, N.C. under the tradename of UVA skin 56A. However, any suitable substance can be added as a further layer to coating system 14. Suitable further layers also include agents for tailoring adhesion, friction, or static characteristics. In one advantageous embodiment, two ink layers are applied to optical waveguide 12 for identifying 24 loose fibers in a tube. For instance, a black tracer is applied as a first layer and a second continuous colored layer is applied over the tracer for identifying a second set of twelve optical waveguides.

Joining material 16 connects the individual optical waveguides in an elongate structure. Joining material 16 is preferably a radiation-curable matrix material such as 950-706 available from DSM Desotech Inc. of Elgin Ill.; however, other suitable materials can be used. For instance, other suitable UV curable materials include, cationic or cationic/free radical blends. Additionally, thermoplastics, thermosets, other polymers, elastomers, expoxies, hot melt glues, or other joining materials may also be used. Preferably, joining material 16 has a coefficient of thermal expansion that is compatible with the coefficient of thermal expansion for the optical waveguides. Embodiments according to the present invention can use a joining material 16 that has enhanced flame and smoke retardance since typical radiation-curable materials generally are susceptible to burning that can cause difficulty in meeting flame and smoke ratings for plenum and riser applications. For instance, joining material 16 can be a polymer such as flame-retardant PVC or a LSZH material. Likewise, radiation-curable materials or other suitable joining material 16 may include flame retardant components such as aluminum trihydrate (ATH) in their formulations.

Manufacturing steps during packaging such as ribbonizing and/or other conditions such as environmental conditions can cause residual stress and/or strains on the assembly. Unlike the present invention, these residual stresses and/or strains can cause significant degradation in the optical performance of conventional articles, assemblies, and/or cables. By way of example, a conventional unprinted optical fiber ribbon has a given optical attenuation (dB/Km) at a specified reference wavelength. However, after printing on the conventional optical fiber ribbon the optical attenuation (dB/Km) at the same reference wavelength may have a relatively large increase while on the ribbon winding spool. In other words, the optical performance of the conventional optical fiber ribbon is degraded by the printing process, thereby causing a relatively high delta attenuation.

How the printing process can affect conventional ribbons using optical fibers with conventional coating systems is known. For instance, U.S. Pat. No. 6,064,789 discloses that the delta attenuation between printed ribbons and unprinted ribbons can be decreased by using predetermined print pitch (characters/cm) and/or increasing spacing between the printed indicia. Additionally, U.S. Pat. No. 6,360,044 discloses that delta attenuation between printed ribbons and unprinted ribbons can be improved by printing randomly spaced ink shapes on an article used for the transmission of optical signals. Thus, a common manufacturing step such as printing can cause significant delta attenuation depending on printing conditions.

With the known effects of printing on a ribbon, a ribbon optical performance test was, designed to subject ribbons to severe printing conditions. The severe conditions of the ribbon optical performance test serve to quantify optical performance of a ribbon design, i.e., how susceptible the optical performance of the unit is to stress and/or strains. The ribbon optical performance test was performed for both single-mode and multi-mode ribbons. Additionally, the tested ribbons 10 were hybrid ribbons. In other words, the hybrid ribbons had groups of both conventional ribbon assemblies and ribbon assemblies according to the present invention in predetermined combinations within a given ribbon. Consequently, the hybrid ribbons that were tested minimize any unknown differential process variations possibly induced among ribbon lengths and provided a higher reliability for statistical comparison purposes. Moreover, the results of the ribbon optical performance test are presented as a maximum, or an average, delta attenuation for similar assemblies at the same reference wavelength. Likewise, the other ribbon experiments discussed herein also used hybrid ribbons for minimizing process variations, thereby enhancing the statistical analysis of the data.

The ribbon optical performance test tested twelve fiber ribbons joined by a, radiation-curable matrix available from DSM Desotech Inc. of Elgin, Ill. under the tradename Cablelite 950-706. Cablelite 950-706 has a tensile strength of about 28 Mpa, an elongation to break of about 31%, and a modulus of about 770 Mpa. The tested ribbons all used the same standard geometry for a twelve fiber ribbon, namely, a thickness of 0.310 mm and a width of 3.12 mm. Likewise, each optical fiber of the tested ribbons had a core/cladding outer diameter of about 125 microns, an inner coating diameter of about 190 microns, an outer coating diameter of about 245 microns, and an ink layer with a nominal diameter of about 258 microns. The ink used is available from DSM Desotech Inc. under the tradename LTS.

As used herein, the ribbon optical performance test requires that an unprinted ribbon 10 be wound onto a suitable reel used throughout the test using similar wind conditions such as wind tension, speed, and wind pitch. Moreover, the test requires that a suitable length of ribbon so that the measured signal to noise ratio is not an issue. For instance, a 1 kilometer sample of ribbon is wound with a tension of, for example, 300 grams at a speed of 200 meters per minute with a trapezoidal wind shape 19b as shown in FIG. 1c. Specifically, trapezodial wind shape 19b had 1.0 mm taper on the ends of the ribbon package. Additionally, trapezodial wind shape 19b is spaced from the reel flanges for preventing the ribbon from hitting the reel flanges while leaving an inside end 19a of the ribbon free for testing. In other words, the width of the ribbon package is reduced by 1.0 mm on each side of the package per full traverse. The trapezodial wind shape provides a common winding condition for the edge fibers of the ribbon. In other words, it ensures that the edge fibers see a base, that is, the edge fibers are wound on the ribbon from the layer below. This avoids the random potential for the edge fibers to "hang over," i.e., avoid touching the ribbon edge from the previous layer.

Furthermore, winding about 10 meters onto the spool before initiating the trapezodial wind shape provides inside end 19a access for the ribbon.

As an example, a suitable reel has a hub with a diameter of about 225 mm and about 300 mm between reel flanges. After the ribbon is wound on the reel, the optical attenuation at one or more predetermined reference wavelengths is measured for each optical waveguide of ribbon 10 while it is on the reel. Moreover, the unprinted optical attenuation measurement should occur after any transient optical response from manufacturing the ribbon dampens, for example, the experimental measurement results presented were performed within 24±6 hours of the manufacture of ribbon 10.

Figure 1A:
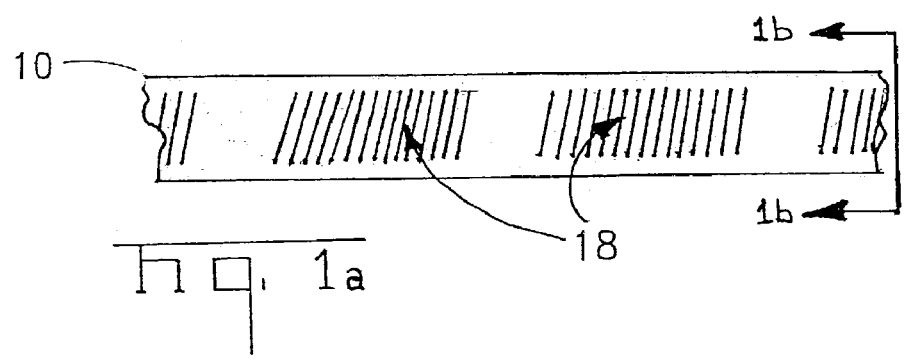
FIGS. 1a–b are plan and cross-sectional views depicting print indicia on the ribbon of FIG. 1 according to a ribbon optical performance test.
Figure 1B:
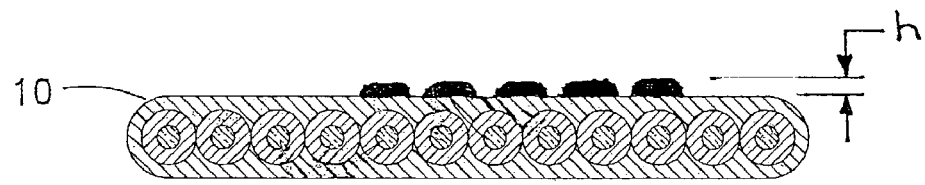
Figure 1C:
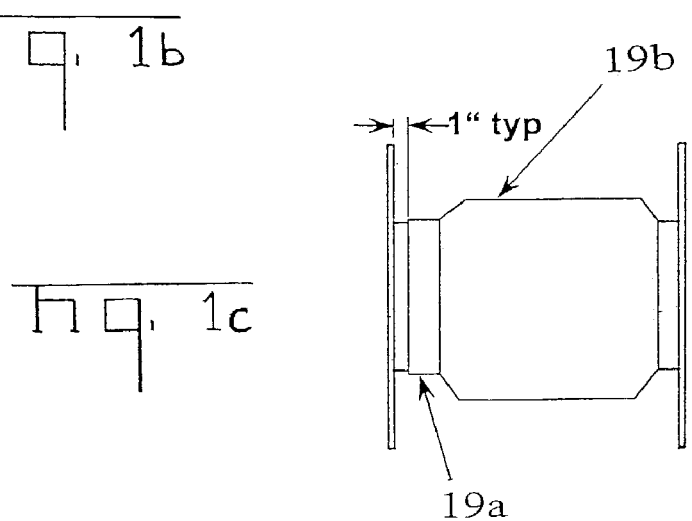
FIG. 1c is a schematic representation depicting a reel having a ribbon wound thereon with a trapezoidal wind shape.

Thereafter, as shown in FIGS. 1a–b print indicia having fifteen forward slashes "///////////////" having a print spacing of 50 mm between sets of the print indicia and a print pitch of 5.0 characters/cm was printed on one side of ribbon 10 using for instance a 201 series Wiedenbach ink jet printer. The print indicia ink used for the test had a density between about 0.841 g/cc and about 0.850 g/cc and is commercially available as Wiedenbach 12k printing ink. The print indicia was applied using a 55 μm nozzle so that the print characters have a height h, in the range of about 2 μm to about 5 μm. Other suitable ink jet printers may be used as long as all of the print conditions are similar to the described conditions. After the printing occurs, ribbon 10 is wound back onto a spool similar to the first spool with the same wind conditions used before printing. Thereafter, the optical attenuation is measured at the one or more predetermined reference wavelengths after the transient response from printing has damped such as within 2416 hours after the printing and winding. Delta attenuation can then be calculated for a predetermined reference wavelength and averaged using a suitable number of samples. The single-mode optical ribbons are measured at bend sensitive reference wavelengths such as 1550 nm and 1625 nm in the ribbon optical performance test. Whereas, the multi-mode ribbons were tested using reference wavelengths of 850 nm or 1300 nm.

FIG. 2 is a bar graph depicting the results of a ribbon optical performance test for single-mode large effective area ribbons according to the present invention at reference wavelengths of 1550 nm and 1625 nm. In the past, it has been difficult to achieve acceptable performance, i.e., specability, at a reference wavelength of 1625 nm due to relatively large delta attenuations caused during manufacturing and/or environmental conditions; however, the present invention preserves optical performance at wavelengths such as 1625 nm and higher. Results for conventional single-mode large effective area ribbons using LEAF® single-mode optical fibers available from Corning, Incorporated are presented for comparison purposes. The conventional ribbons used optical fibers that had core/cladding glass configurations that were from the common fiber draw blanks used for the tested ribbons according to the present invention in order to minimize experimental noise; however, the optical fibers of the conventional ribbons included a conventional coating system. Single-mode large effective area ribbons were tested because these assemblies are more sensitive to stresses and/or strains than regular single-mode assemblies and clearly demonstrate the advantages of the present invention. Likewise, the optical performance at reference wavelengths of 1550 nm and 1625 nm was tested because these reference wavelengths are generally more sensitive to delta, attenuation. Additionally, conventional ribbons using SMF-28 single-mode optical waveguides available from Corning, Incorporated were also tested to show the sensitivity difference between the large effective area ribbons and SMF-28 single-mode ribbons.

Bars 21 and 22 respectively represent an average and a maximum delta attenuation for large effective area single-mode ribbons 10 according to the present invention measured at a reference wavelength of 1625 nm. Likewise, bars 25 and 26 respectively represent an average and a maximum delta attenuation for the same ribbons at a reference wavelength 1550 nm. The ribbons representing bars 21, 22, 25, and 26 had a coating system 14 using inner coating A and the outer coating of Table 1. As shown for both reference wavelengths, the average and maximum delta attenuation for the ribbons of the present invention are essentially about 0.000 dB/km; however, non-zero values for bars 21, 22, 25, and 26 are shown for illustrative purposes. Specifically, at 1625 nm the average; and maximum attenuations, bars 21 and 22, were respectively −0.004 dB/Km and 0.005 dB/km for the ribbon optical performance test. At 1550 nm, the average and maximum attenuations, bars 25 and 26, respectively were −0.003 dB/Km and 0.005 dB/km for the ribbon optical performance test. The relatively small, and even negative attenuation values, indicate that the measurements are within the test noise floor.

On the other, hand, the average delta attenuation for the conventional single-mode large effective area ribbons at both wavelengths was significantly higher as shown in FIG. 2. Bars 23 and 24 respectively represent an average and a maximum delta attenuation for conventional single-mode large effective area ribbons measured at a reference wavelength of 1625 nm. Specifically, the average and maximum delta attenuations, bars 23 and 24, respectively were 0.105 dB/Km and 0.172 dB/km for the ribbon optical performance test. Likewise, bars 27 and 28 respectively represent an average and a maximum delta attenuation for the same ribbons at a reference wavelength 1550 nm. At 1550 nm, the average and maximum delta attenuations, bars 27 and 28, respectively were 0.078 dB/Km and 0.147 dB/km for the ribbon optical performance test.

Average and maximum delta attenuation measurements were also performed for a conventional single-mode ribbon to illustrate the sensitivity of the single-mode large effective area assemblies. At 1550 nm, the average and maximum delta attenuations for a conventional single-mode ribbon respectively were 0.027 dB/Km and 0.062 dB/km for the ribbon optical performance test. Stated another way, the average and maximum delta attenuation values for the conventional single-mode large effective area ribbon assemblies is more than double the respective attenuation values of the conventional single-mode ribbon.

The severe printing conditions of the ribbon optical performance test had little, or no effect, on the average delta attenuation for the large effective area single-mode ribbons of the present invention. On the other hand, the conventional ribbons had significant delta attenuation that generally increased as the wavelength increased. In other words, the ribbons of the present invention preserved the optical performance by more than an order of magnitude at reference wavelengths of 1625 nm and 1550 nm in the ribbon optical performance test. Table 2 is a summary of the test results for the ribbon optical performance test.

TABLE 2

Delta attenuation for singe-mode large effective area ribbons in the ribbon optical performance test

| Assembly | 1550 nm Ave | 1550 nm Max | 1625 nm Ave | 1625 nm Max |
|---|---|---|---|---|
| Conventional | 0.078 | 0.147 | 0.105 | 0.175 |
| Present Invention | −0.003 | 0.005 | −0.004 | 0.005 |

Articles, assemblies, and/or cables using ribbons according to the present invention can take advantage of this ability to preserve optical performance in a variety of ways. Stated another way, configurations and designs that were difficult, if not impossible, to qualify previously for given wavelength performance levels are now possible with the present invention. For instance, assemblies of the present invention can have suitable performance levels at wavelengths such as 1625 nm, 1650 nm and higher, whereas the conventional assemblies have significant power losses. As another example, cable designs previously suitable for single-mode waveguides can now employ multi-mode waveguides with suitable optical performance.

The ribbon optical performance test was also performed on multi-mode ribbons. FIG. 3 is a bar graph depicting the results of a ribbon optical performance test performed on a hybrid multi-mode ribbons. The tested hybrid ribbons included ribbon portions according to the present invention and ribbon portions having conventional multi-mode ribbon portions for comparison purposes. The ribbon optical performance test was performed at two different reference wavelengths, namely, 850 nm and 1300 nm. The conventional multi-mode ribbons used optical fibers having a 50 μm core available from Corning, Incorporated under the tradename Infinicor 600. Additionally, both the multi-mode ribbons of the present invention and the conventional multi-mode ribbons used optical fibers that had core/cladding glass configurations that were from common fiber draw blanks in order to minimize experimental noise. As before, coating system 14 for the tested multi-mode ribbons of the present invention had inner coating A and the outer coating as specified in Table 1. Multi-mode ribbons with 50 micron cores were used because they are more sensitive than, for instance, 62.5 micron cores. Moreover, the results with assemblies having 50 micron cores clearly illustrate the advantages of the assemblies.

Bars 31 and 32 respectively represent an average and a maximum delta attenuation for multi-mode optical fibers of ribbon 10 according to the present invention measured at reference wavelengths of 850 nm. Likewise, bars 35 and 36 respectively represent an average and a maximum delta attenuation for the same ribbons at a reference wavelength of 1300 nm. As shown, average and maximum delta attenuations for the ribbons having multi-mode optical fibers according to the present invention were relatively low at both reference wavelengths compared with the conventional multi-mode ribbon. Specifically, at 850 nm the average and maximum delta attenuations bars 31 and 32, were respectively 0.015 dB/km and 0.090 dB/km. At 1300 nm, the average and maximum attenuations, bars 35 and 36, were respectively 0.006 dB/km and 0.077 dB/km.

On the other hand, the conventional multi-mode ribbons had significant average and maximum delta attenuations for both reference wavelengths. Bars 23 and 24 respectively represent an average and a maximum delta attenuation of 0.310 dB/km and 0.919 dB/km for conventional multi-mode ribbons measured at a reference wavelength of 850 nm. Likewise, bars 37 and 38 respectively represent an average and a maximum delta attenuation of 0.270 dB/km and 0.760 dB/km for the same ribbons at a reference wavelength of 1300 nm. Table 3 is a summary of the test results for the multi-mode ribbon optical performance test.

TABLE 3

Delta attenuation for 50 micron multi-mode ribbons in the ribbon optical performance test

| Assembly | 850 nm Ave | 850 nm Max | 1300 nm Ave | 1300 nm Max |
|---|---|---|---|---|
| Conventional | 0.310 | 0.919 | 0.270 | 0.760 |
| Ribbon 10 | 0.015 | 0.090 | 0.006 | 0.077 |

The conventional multi-mode ribbons had relatively elevated levels of average and maximum delta attenuations for the ribbon optical performance test. With these performance levels conventional multi-mode ribbons may be difficult to package with acceptable optical performance for inhibiting power losses of an optical network. Conversely, the severe printing conditions of the ribbon optical performance test had relatively little effect on the delta attenuations for the multi-mode ribbons of the present invention. Stated another way, the tested multi-mode ribbon had about an order of magnitude reduction in delta attenuation compared with the conventional multi-mode ribbon.

As shown, both the single-mode and multi-mode ribbons of the present invention had significant improvements compared with their conventional counterparts. Generally speaking, the average delta attenuation improvement for both single-mode and multi-mode embodiments was about an order of magnitude or more compared with their respective conventional counterpart ribbons under the ribbon optical performance test. Likewise, the maximum delta attenuation improvement for both single-mode and multi-mode embodiments was about an order of magnitude or more compared with their respective conventional counterpart ribbons.

The experimental results discussed in the ribbon optical performance tests are exemplary and other embodiments of the present invention may also provide excellent optical performance. For instance, assemblies according to the present invention can have other coating systems 14 that provide similar benefits. Likewise, the coating systems 14 are suitable for other core/cladding configurations than those tested. Hence, single-mode ribbons 10 of the present invention have an average delta attenuation for the ribbon optical performance test that is preferably about 0.020 dB/km or less, more preferably about 0.010 dB/km or less, and most preferably about 0.005 dB/km or less at a reference wavelength of 1550 nm. Likewise, single-mode optical assemblies of the present invention have a maximum delta attenuation for the ribbon optical performance test that is preferably about 0.050 dB/km or less, more preferably about 0.030 dB/km or less, and most preferably about 0.020 dB/km or less at a reference wavelength of 1550 nm.

Furthermore, the results presented illustrate that the advantages of the present invention are beneficial for multi mode assemblies such as 50 micron multi-mode assemblies. However, the results for the ribbon optical performance test are exemplary and other core/cladding configurations such as a 62.5 micron multi-mode ribbon may have other beneficial results. Accordingly, multi-mode ribbons 10 have an average delta attenuation for the ribbon optical performance test that is preferably about 0.300 dB/km or less, more preferably about 0.200 dB/km or less, and most preferably about 0.100 dB/km or less at a reference wavelength of 850 nm. Likewise, multi-mode optical assemblies of the present invention can have a maximum delta attenuation for the ribbon optical performance test that is preferably about 0.500 dB/km or less, more preferably about 0.300 dB/km or less, and most preferably about 0.100 dB/km or less at a reference wavelength of 850 nm. At a reference wavelength of 1300 nm, multi-mode optical assemblies of the present invention have an average delta attenuation, for the ribbon optical performance test that is preferably about 0.200 dB/km or less, more preferably about 0.150 dB/km or less, and most, preferably about 0.100 dB/km or less and/or a maximum delta attenuation that is preferably about 0.400 dB/km or less, more preferably about 0.200 dB/km or less, and most preferably about 0.100 dB/km or less.

Other changes in conditions are possible for investigating the optical degradation, i.e., the delta attenuation, of articles, assemblies, and/or cables. One frequent environmental change experienced during service is the change in temperature that can degrade optical performance. The change in temperature can cause differential stain and/ stress on the optical articles, assemblies, or cables, thereby causing delta attenuation. Therefore, assemblies were also temperature cycled in order quantify the performance gains of the present invention. As before, the multi-mode assemblies according to the present invention included optical fibers 12 with a coating system 14. The assemblies tested and presented had the same ribbon geometry and coating system 14 as used in the ribbon optical performance test. Specifically, coating system 14 for the tested multi-mode portions had inner coating A and the outer coating as specified in Table 1.

As used herein, a ribbon temperature performance test requires that a ribbon of a suitable length be wound onto a suitable reel in a manner as described above for the ribbon optical performance test. However, for comparative purposes, it is only important that the ribbons are wound on a reel of the same design under the same wind conditions. Then the ribbon package is placed into a thermal chamber. The temperature within the thermal chamber is cycled while measuring delta attenuation at predetermined times after the package reaches thermal stability at the predetermined temperature.

Specifically, after winding, preferably using a trapezodial wind package, the ribbon package is placed in a thermal chamber at 23° C. and the ribbon package is allowed to reach a steady-state temperature so that a baseline attenuation measurement can be taken at a predetermined reference wavelength. The temperature chamber is taken down to −40° C., then the ribbon package completes two temperature cycles from −40° C. to 70° C. as will be defined. Thereafter the ribbon package is held at 85° C. for five days of heat aging followed by two more temperature cycles of −40° C. to 70° C. and then the temperature is ramped back down to 23° C. for a final attenuation measurement. As used herein, a temperature cycle begins at 23° C. and is ramped down to about −40° C. over a four-hour period then this temperature plateau is held, or dwelled, for four hours after which, an attenuation measurement is taken. Next, the temperature is ramped up to 70° C. over a four-hour period, then this temperature plateau is held for four hours after which an attenuation measurement is taken, thereby completing one temperature cycle. The second temperature cycle begins while ramping the temperature back down to −40° C. over a four-hour period. After the second temperature cycle is completed, a heat aging test is performed at 85° C. and held for five days and then an attenuation measurement is taken. Thereafter, the temperature is ramped back down to 23° C. so the last two temperature cycles can be performed followed by ramping the temperature back down to 23° C. for a final attenuation measurement. Delta attenuations for temperature cycling are calculated by taking the attenuation measurement after the dwell times at each predetermined point and subtracting the baseline attenuation (initial attenuation at 23° C.) at the same reference wavelength.

Figure 4:
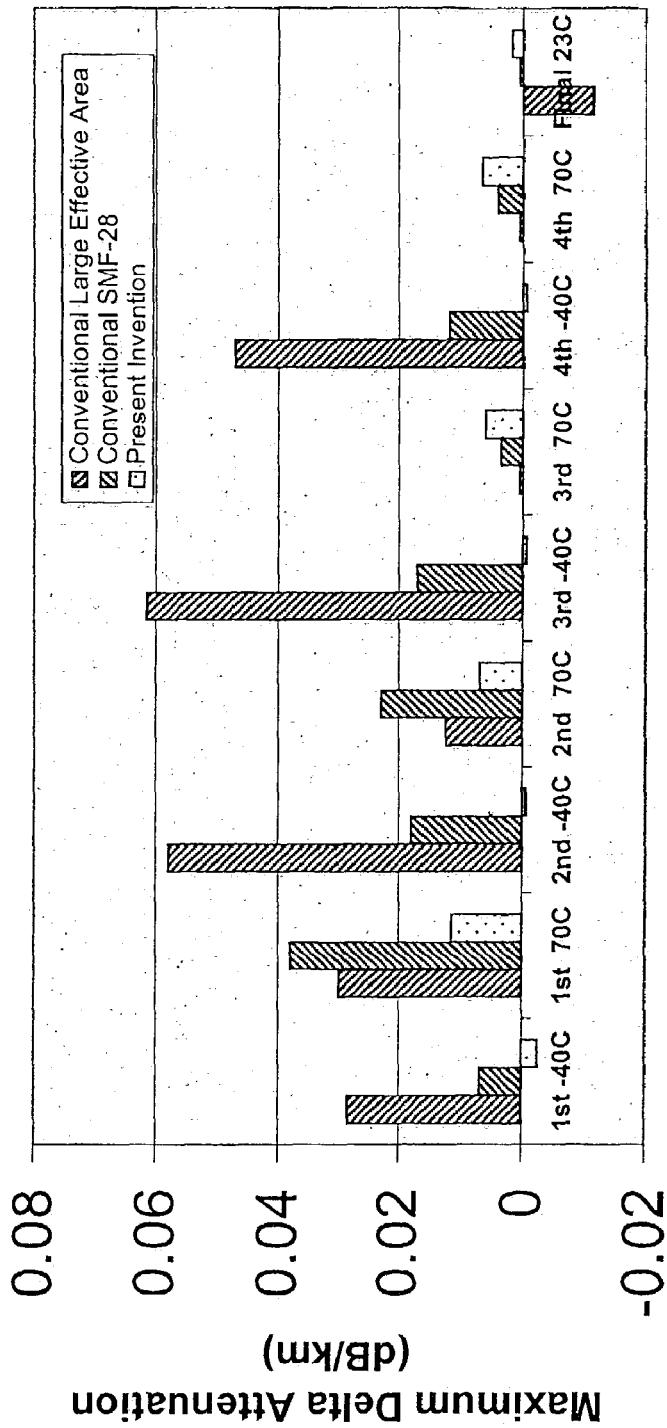
FIG. 4 is a graph depicting maximum delta attenuation for a single-mode fiber optic ribbon according to FIG. 1 and a conventional single-mode ribbon during a temperature performance test.

FIG. 4 is a bar graph depicting maximum delta attenuation results for the ribbon temperature performance test using hybrid single-mode ribbons having portions according to the present invention and comparing them with two different conventional ribbon portions at a reference wavelength of 1550 nm. Specifically, the conventional ribbons of this experiment used two different types of single-mode optical fibers, namely, a large effective area fiber as used before and a SMF-28 optical fiber available from Corning, Incorporated. As shown, all things being equal, the conventional large-effective area optical fiber ribbon is more sensitive to the temperature performance test than the conventional single-mode optical fiber ribbon. The maximum delta attenuation (dB/km) results at the minus forty temperature stages for the ribbon temperature performance test of the single-mode ribbons are summarized in Table 4.

TABLE 4

Maximum delta attenuation for single-mode ribbons during the ribbon temperature performance test

| Assembly | 1st −40 C. | 2nd −40 C. | 3rd −40 C. | 4th −40 C. |
|---|---|---|---|---|
| Conventional Large Effective Area | 0.0285 | 0.058 | 0.0615 | 0.047 |
| Conventional SMF-28 | 0.007 | 0.018 | 0.017 | 0.012 |
| Present Invention | −0.0025 | −0.0005 | −0.0005 | −0.0005 |

For the most part, the delta attenuation is elevated for both conventional ribbons. However, the delta attenuation for the conventional large effective area ribbons is the highest, thereby showing that they are more sensitive to the temperature performance test. On the other hand, the single-mode ribbons of the present invention show that they preserve optical performance in the ribbon temperature performance test.

Figure 5:
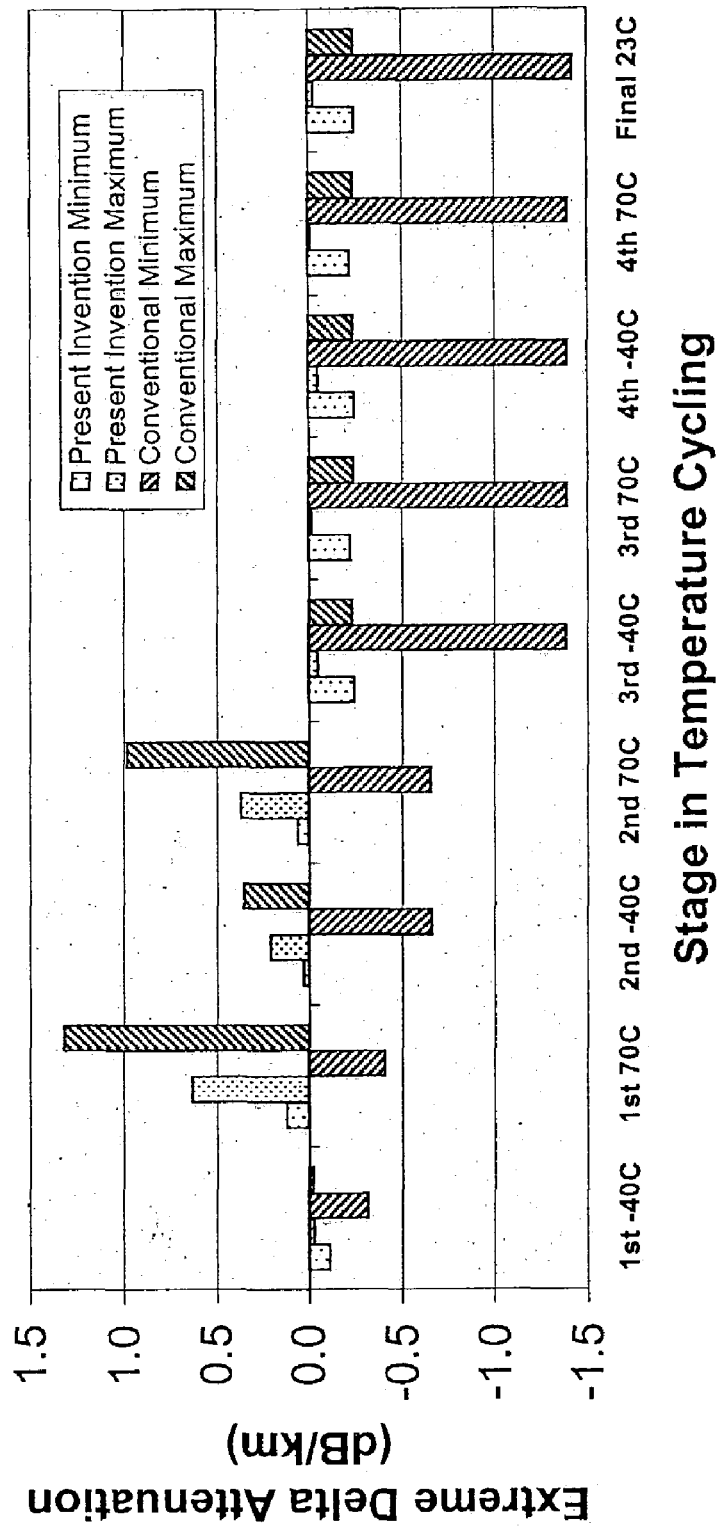
FIG. 5 is a bar graph depicting extreme delta attenuation for a multi-mode fiber optic ribbon according to FIG. 1 and a conventional multi-mode ribbon; during a temperature performance test.

FIG. 5 is a bar graph depicting maximum delta attenuation results for the ribbon temperature performance test using hybrid multi-mode ribbons having portions according to the present invention and comparing them with a conventional ribbon portions at a reference wavelength of 1550 nm. The conventional multi-mode ribbon portions used 50 μm optical fibers available from Corning, Incorporated under the tradename Infinicor 600. Additionally, both the multi-mode ribbons of the present invention and the conventional multi-mode ribbons used optical fibers that had core/cladding glass configurations that were from common fiber draw blanks in order to minimize experimental noise.

In this particular experiment, the ribbons tested had relatively high levels of initial attenuation, thus, during temperature cycling the stress was relieved and the delta attenuation was negative. FIG. 5 depicts extreme values of delta attenuation for the ribbons of this experiment. In other words, FIG. 5 depicts a maximum total change and a minimum total change of each type of ribbon. The extreme delta attenuation (dB/km) results at the minus forty temperature stages for the ribbon temperature performance test of the multi-mode ribbons is summarized in Table 4.

TABLE 5

Extreme delta attenuation for multi-mode ribbons during the ribbon temperature performance test

| Extreme Delta Attenuation | 1st −40 C. | 2nd −40 C. | 3rd −40 C. | 4th −40 C. |
|---|---|---|---|---|
| Conventional Minimum | −0.313 | −0.657 | −1.384 | −1.391 |
| Conventional Maximum | −0.19 | 0.347 | −0.226 | −0.230 |
| Present Invention Minimum | −0.109 | 0.024 | −0.237 | −0.239 |
| Present Invention Maximum | −0.028 | 0.201 | −0.046 | −0.049 |

The experimental results discussed in the ribbon temperature performance tests are exemplary. Moreover, embodiments of the present invention such as different core/claddings and/or coating systems 14 may have other values while still providing excellent optical performance. For instance, single-mode optical assemblies of the present invention have a maximum delta attenuation for the ribbon temperature performance test that is preferably about 0.0300 dB/km or less, more preferably about 0.0250 dB/km or less, and most preferably about 0.020 dB/km or less at a reference wavelength of 1550 nm.

Figure 6:
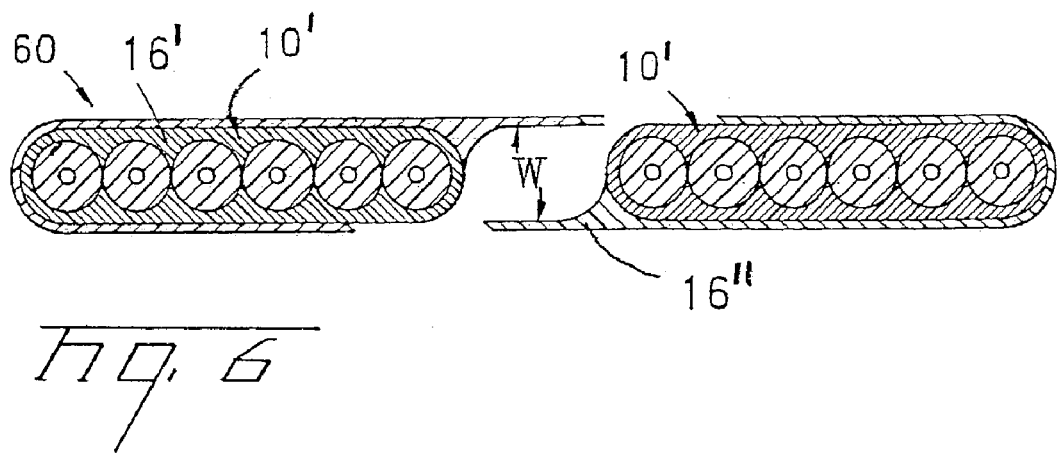

Optical assemblies of the present invention can also employ other geometry, materials, and/or constructions than those depicted in ribbon 10. For instance, as depicted in FIG. 6, ribbon's of the present invention can be a portion of a larger assembly such as a unitized ribbon 60. Unitized ribbon 60 can include a plurality of sub-unit ribbons 10' each having a respective joining material 16', which are brought together and overcoated with a common joining material 16". Consequently, the craftsman can separate unitized ribbon 60 into intact subunits 10' if necessary for optical connection. Even though this embodiment is advantageous it has drawbacks. For instance, during separation of unitized ribbon 60 into subunits 10' the uncontrolled fracture of the secondary matrix can create wings W, i.e. overhanging portions, of the secondary matrix.

Figure 7:
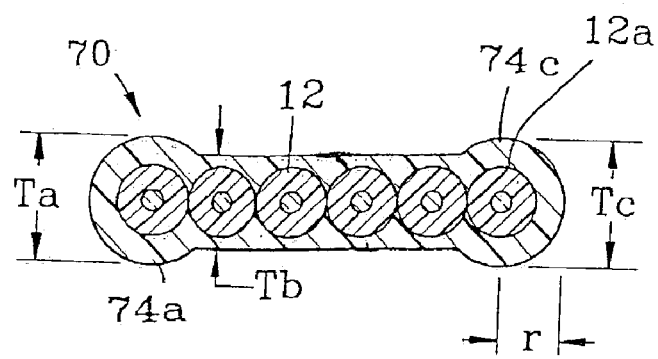
Figure 7A:
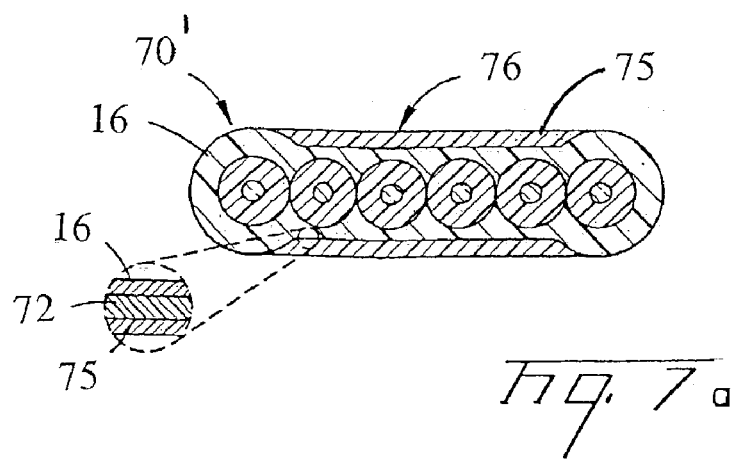

U.S. patent application Ser. No. 10/159,730 filed on May 31, 2002, the disclosure of which is incorporated herein by reference, discusses ribbons that influence the fracture point of the secondary matrix, thereby reducing the likelihood of wings. Specifically, ribbon 70 has a non-uniform thickness such as one or more bulbous end portions 74a, 74c. End portions 74a, 74c each having a respective maximum thickness $T_a, T_c$, which is greater than a medial thickness $T_b$, that generally occurs at a distance r from the edge of ribbon 70 for influencing the initiation of a fracture point in a unitized ribbon. Suitable values of range r generally dispose the maximum thickness $T_a$, $T_c$ over a cross-section of edge fiber 12a. Additionally, ribbons can have end portions with shapes that are different than illustrated, or can have a single bulbous end portion. FIG. 7a depicts ribbon 70' having a secondary material 75 disposed on outward portions of joining material 16. Using secondary material 75 can have several advantages/functions. For example, secondary material 75 can impart generally planar surfaces 76 to ribbon 70'. Planar surfaces 76 can also provide stability when ribbon 70' is used as a portion of a ribbon stack. Additionally, secondary material 75 may also provide material characteristics that are different from the joining material such as adhesion, COF characteristics, or hardness. This can be accomplished, for example, by using a secondary material 75 material that is similar to the joining material with different processing characteristics such as cure characteristics, or by using a material that is different than the joining material. Likewise, different portions of secondary material 75 can be different materials and/or have distinct material characteristics. Ribbon 70' includes an adhesion zone 72 between joining material 16 and secondary material 75 induced by a treatment such as a corona or a plasma discharge. Additionally, other ribbons may use the adhesion zone between layers.

Figure 8:
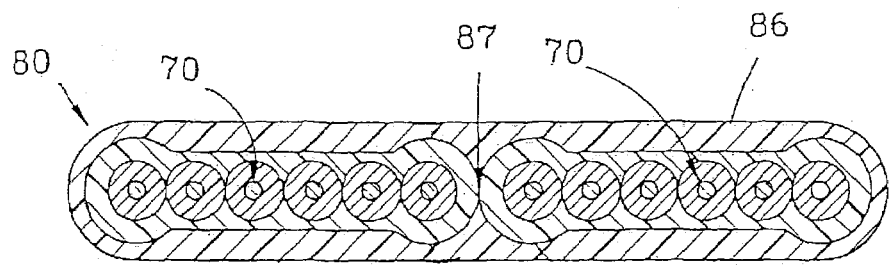
Figure 8A:
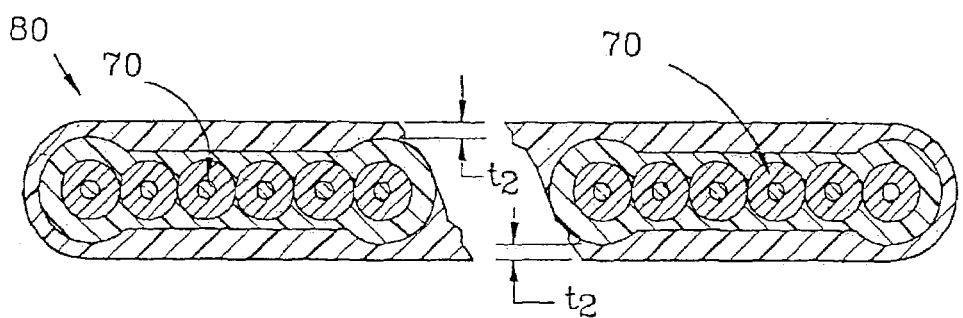

Ribbon 70 is useful in larger assemblies where end portions 74a, 74c create a preferential tear portion in ribbons having subunits. For instance, FIGS. 8 and 8a depict ribbon 80 having two ribbons 70 used as subunits connected together using a second joining material 86 having a local minimum thickness t2 disposed adjacent to a subunit interface 87. As shown in FIG. 8a, this local minimum thickness t2 inhibits the formation of wings during the separation of subunits 70. FIG. 10 depicts ribbon 100 having two subunits 70 attached by a secondary joining material 106 having at least one preferential tear feature such as one or more notches 103 offset at a distanced from the subunit interface.

Figure 9:
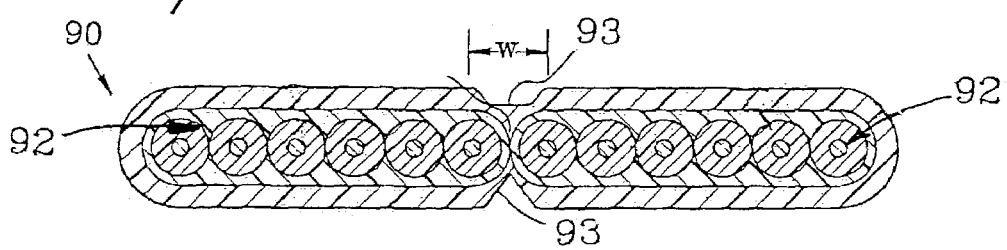
Figure 9A:
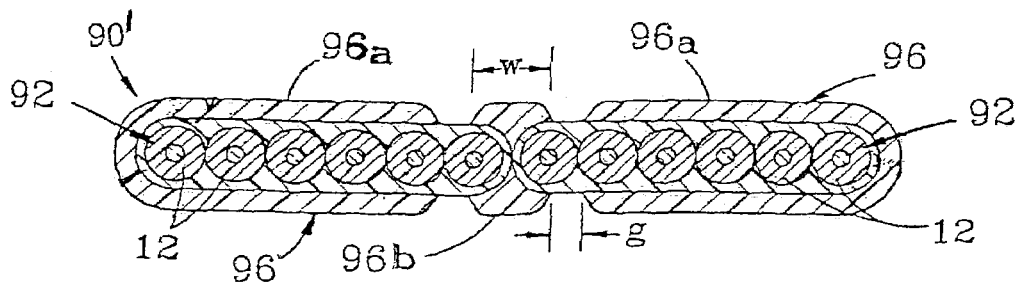

Additionally, ribbons having a uniform thickness can also have a preferential tear portion such as a recess or notch 93 having a suitable width, depth, or shape adjacent to the interface between subunits 92 of the present invention as shown in ribbon 90 of FIG. 9. Likewise, subunits 92 having a uniform thickness can have preferential tear portions as illustrated in FIG. 9a and disclosed in U.S. patent application Ser. No. 10/376,786 filed on Feb. 28, 2003, the disclosure of which is incorporated herein by reference. Specifically, FIG. 9a shows a ribbon 90' having preferential tear portions for separating the pair of subunits 92 connected by a secondary joining material 96. Specifically, secondary joining material 96 includes at least one end portion 96a and at least one medial portion 96b. Medial portion 96b has a suitable width w and is generally disposed over an interface between subunits 92. Although medial portion 96b is shown to have generally flat planar surfaces it can have other suitable shapes such as arcuate or v-shaped. In this embodiment, ribbon 90' has two end portions 96a and one medial portion 96b connecting subunits 92 together, thereby forming a cross-section with a non-uniform thickness. Specifically, medial portion 96b of secondary joining material 96 is spaced apart from at least one of end portions 96a over at least a portion of the longitudinal axis of ribbon 90' by a gap g. As used herein, spaced apart or gap means essentially that little or no secondary joining material 96 is located over the subunit located below; however, trace amounts such as a thin film of secondary matrix can be located at this location. Additionally, medial portion 96b can be recessed below the surface of end portion 96a.

Additionally, unitized ribbons can be constructed to separate in a specific order of separation. U.S. patent application Ser. No. 10/411,406 filed on Apr. 10, 2003, the disclosure of which is incorporated herein by reference, discusses ribbons that can separate in a preferential separation sequence for connectorization or splicing purposes. For instance, FIG. 11 illustrates ribbon 110 including a second joining material 115 having a plurality of preferential tear portions 115a, 115b for separating a plurality of ribbon-units A, B, and C, thereby providing ribbon 110 with a preferential separation sequence. In other words, ribbon 110 has a preference to separate at a ribbon-unit interface(s) A/B and/or B/C before separating at a subunit interface such as between subunits 112, 113. In this embodiment, each subunit 111–114 includes two optical fibers 12 (not numbered) that are connected by respective first joining materials (not numbered) having a generally uniform thickness. Each ribbon-unit A, B, and C includes at least one subunit, but at least one of the ribbon-units should include at least two subunits. In this case, ribbon-unit B includes two subunits 112,113 having two optical fibers 12 and ribbon-units A and C each include one subunit having two optical fibers 12. The preferential separation sequence occurs at the ribbon-unit interfaces A/B and/or B/C because the preferential tear portions 115a,115b of second joining material 115 are disposed adjacent to respective ribbon-unit interfaces. On the other hand, second joining material 115 has a generally uniform thickness adjacent to the subunit interface between subunits 112,113, thereby creating a more robust connection between the subunit interface compared with the ribbon-unit interface. Preferential tear portions 115a are recessed portions and preferential tear portion 115b is an indentation. However, ribbons of the present invention can include any suitable preferential tear portion or feature to provide the preferential separation sequence of the ribbon-units. For instance, other embodiments of ribbon 110 can have asymmetrical forms such as two ribbon-units A and B respectively having one and two subunits with a minimum of six optical fibers in the ribbon. Additionally, ribbon-units can include other suitable numbers of subunits and/or subunits can include suitable numbers of optical fibers.

Furthermore, the concepts of a preferential separation sequence between ribbon-units can employ subunits having other suitable geometry. For instance, FIG. 12 depicts ribbon 120 having ribbon-units E,F,G with respective subunits that can include a non-uniform thickness connected by a second joining material 127 having preferential tear portions. In this case, subunits 122–126 have at least a first end portion with a thickness that is greater than a medial portion and subunit 121 is a subunit with a generally uniform thickness. Preferably, a first and a second end of subunits are generally symmetrical so that orientation during ribbonizing is of no concern; however, end portions can have different shapes so that orientation during ribbonizing matters. Moreover, having generally symmetrical subunits with non-uniform thicknesses can inhibit the formation of wings during separation of subunits in the same ribbon-unit if necessary. As depicted, subunits 122,123,124 have at least one end portion with a generally angular shape and subunits 124,125,126 have at least one end portion with a generally bulbous shape.

As shown, second joining material 127 includes at least one preferential tear portion disposed adjacent to ribbon interfaces E/F and F/G. Specifically, preferential tear portions of second joining material are recessed portions 127a having a generally concave shape that is offset at a distance d from the ribbon-unit interface. For example, distance d is between about 125 µm and about 300 µm, but other suitable distances can be used. Additionally, recessed portions 127a can have other shapes, widths, and/or depths. Additionally, the top and bottom of ribbon 120 can have different numbers or shapes of recessed portions 127a. In this case, recessed portions 127a are generally symmetrical about axis A—A at the ribbon-unit interface.

Still further, the concepts of a preferential separation sequence between ribbon-units can employ more than two joining materials. For instance, FIG. 13 depicts ribbon 130 having ribbon-units H,I,J connected by a third joining material 138 having preferential tear portions. Specifically, the subunits of ribbon 130 include optical fibers 12 (not numbered) connected by respective joining material (not numbered) and each ribbon-unit H,I,J includes two subunits connected by a respective second joining material 137 that are connected by third joining material 138. Third joining material 138 includes preferential tear portions such as recesses 138a or indentations; however, any suitable preferential tear portion as described herein can be used.

Other constructions of ribbon assemblies are also possible using the concepts of the present invention. In other embodiments, the joining material modulus characteristics of ribbon assemblies can be controlled within predetermined ranges and/or ratios for enhancing separation characteristics of the assembly. For instance, U.S. Pat. No. 6,253,013 discusses ribbon assemblies having a subunit/common matrix modulus ratio that is about 1.5 or greater, the disclosure of which is incorporated herein by reference.

Ribbon assemblies can also include a marking indicia for identification purposes. For instance, alpha/numeric characters can be printed on the outer surface or between matrix layers of ribbon 10. In another embodiment, ribbon 10 can include identifying information about the ribbon conveyed by a series of colored regions such as a ribbon number and/or the type of optical waveguides in the ribbon as discussed in U.S. patent application Ser. No. 09/886,559 filed on Jun. 21, 2001, the disclosure of which is incorporated herein by reference. In other embodiments, ribbon 10 has a radiation markable section that has a radiation, reactive ingredient compounded with a base matrix material as discussed in U.S. Pat. No. 6,370,304, the disclosure of which is incorporated herein by reference.

Figure 14:
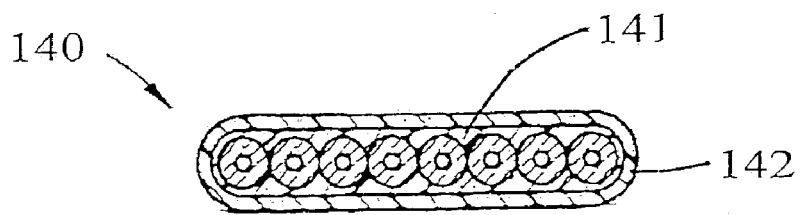
Figure 15:
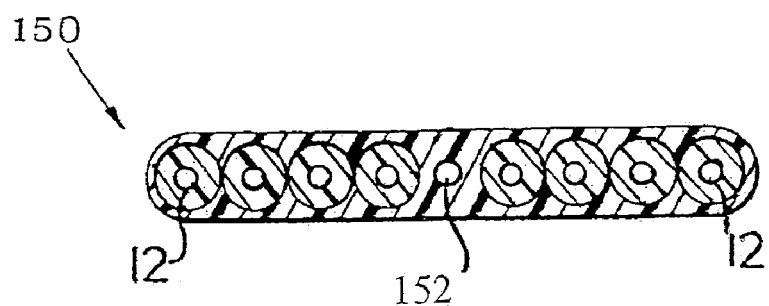
Figure 16:
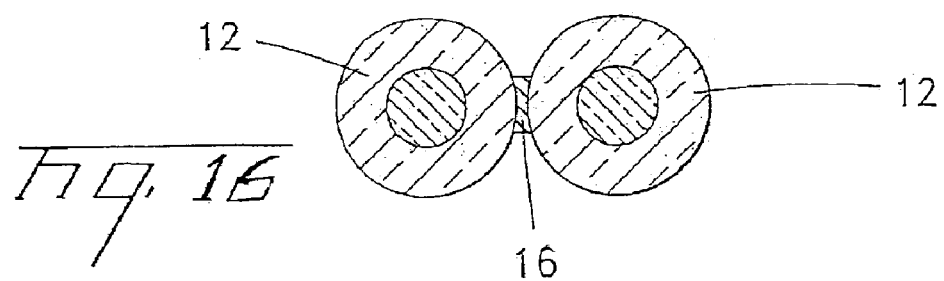

Still other ribbon constructions are within the scope of this invention. FIG. 14 illustrates ribbon 140, which includes a ribbon 141 similar to ribbon 10 having eight optical waveguides 12 and a sheath 142 thereover. Sheath 142 is constructed from any suitable polymer material and may be flame-retardant. Sheath 142 is tight-buffered on ribbon 141 to couple sheath 142 and ribbon. 141, thereby inhibiting ribbon 141 from twisting relative to sheath 142 and generally protecting ribbon 141. The extrusion and quenching of sheath 142 can create strains and/or stress that act on ribbon assembly 140; however, assembly 140 has relatively low delta attenuation from the manufacturing process. FIG. 15 illustrates ribbon 150 that is similar to ribbon 10, except that it includes strength members 152 in a joining material. For example, strength members 152 can be aramid, metallic wires, or fiberglass rovings. Likewise, ribbon assemblies may have ripcords disposed in the joining material as discussed in U.S. Pat. No. 5,442,722, the disclosure of which is incorporated herein by reference. FIG. 16 depicts assembly 160 having two optical waveguides 12 tacked together by joining material 16 as disclosed in U.S. patent application Pub. No. 2003/0118301, the disclosure of which is incorporated herein by reference. Of course, other embodiments can have more than two optical waveguides 12 tacked together.

Figure 17:
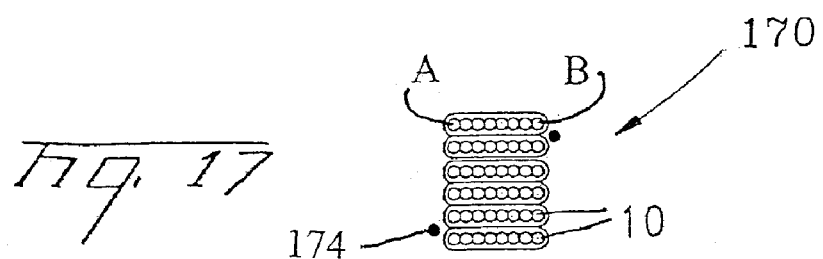
FIGS. 17 and 18 illustrate exemplary ribbon stacks according to the present invention.

Moreover, assemblies of the present invention such as ribbons can be used in larger assemblies and/or cables. One such assembly is constructed by stacking at least one ribbon of the present invention with other ribbons, thereby forming a dense array of optical fibers. Ribbon stacks can have various configurations or suitable numbers of optical waveguides such as twelve, thirty-six, seventy-two or multiples thereof; however, other suitable ribbon stacks are possible. FIG. 17 depicts a ribbon stack 170 having at least one ribbon 10 with the other ribbons having the same numbers of optical waveguides, thereby forming a rectangular or square array of optical waveguides.

Figure 18:
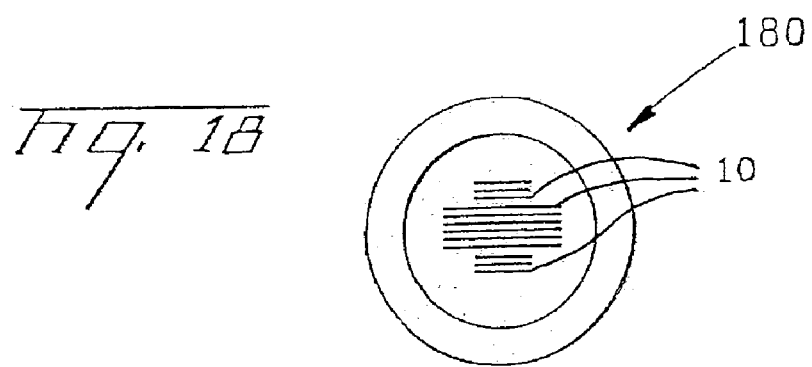

FIG. 18 illustrates another advantageous ribbon stack 180 disposed in a tube assembly as disclosed U.S. Pat. Nos. 6,192,178, 6,519,399, and U.S. patent application Ser. No. 09/789,048 filed on Feb. 19, 2001, the disclosures of which are incorporated herein, by reference. As schematically illustrated, ribbon stack 180 includes a profiled group of ribbons 10 that, conform to the shape of a round tube. Ribbon stack 180 may include ribbons having different numbers of optical waveguides such as twelve, eight, four; however, other suitable configurations are possible. In other embodiments, one or more of the ribbons of the stack may have a preferential tear portion and/or a preferential separation sequence as discussed previously.

As known in the art, ribbon stacks can also include a pre-wet layer of grease between the ribbons to facilitate movement between ribbons, for instance, during bending. Additionally, the pre-wet layer holds the ribbons of the stack together, through surface tension, thereby providing stack integrity. Other ribbon stack embodiments using the concepts of the present invention are possible. For instance, a slip layer between ribbons of a stack can be wet or dry such as oils, graphite, talc, silicone mircospheres, Teflon® powders, or the like.

Additionally, grease pre-wet layers can include suitable fillers. Fillers for the pre-wet layer can influence the viscosity of the pre-wet layer and/or reduce the material costs. Conventional ribbon stacks typically use a pre-wet layer having fillers that do not cause elevated levels of stress or strain on the optical ribbons. For example, U.S. patent application Pub. No. 2002/0102079 discusses how the particle size of the fillers affects the optical performance of a ribbon. Unlike conventional ribbon stacks, the ribbon stacks according to the present invention are less sensitive to stress and/or strains caused by relatively large particles, or other media, in the pre-wet layer. Thus, the percentage of fillers and/or the particle size of the filler may be increased in a pre-wet layer, while still providing suitable optical performance.

Figure 19:
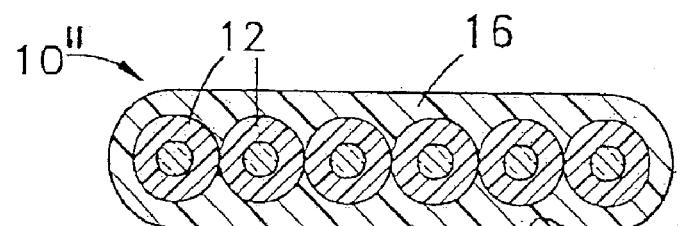
FIG. 19 depicts a ribbon having a semi-solid film on a portion of its outer surface according to the present invention.

One type of a dry ribbon stack has a semi-solid film disposed on an outer surface of the ribbons as disclosed in U.S. patent application Ser. No. 10/325,539 filed on Dec. 20, 2002, the disclosure of which is incorporated herein by reference. FIG. 19 depicts a ribbon 10' having a semi-solid film 190 on a surface thereof. Semi-solid film can include materials such as waxes, surfactants such as soaps, or glycols such as propylene glycol. However, other suitable materials can be used such as cured water-swellable coatings for water blocking assemblies. Preferably, the semi-solid film is disposed on both sides of ribbon 10. Moreover, the semi-solid film can also include additives that are organic or inorganic. For example, additives such as silicone oil or mineral oil can be added in relatively small amounts to act as flow agents; however, any suitable oil can be used. Additionally, additives such as microspheres or other suitable modifiers can be used.

Figure 20:
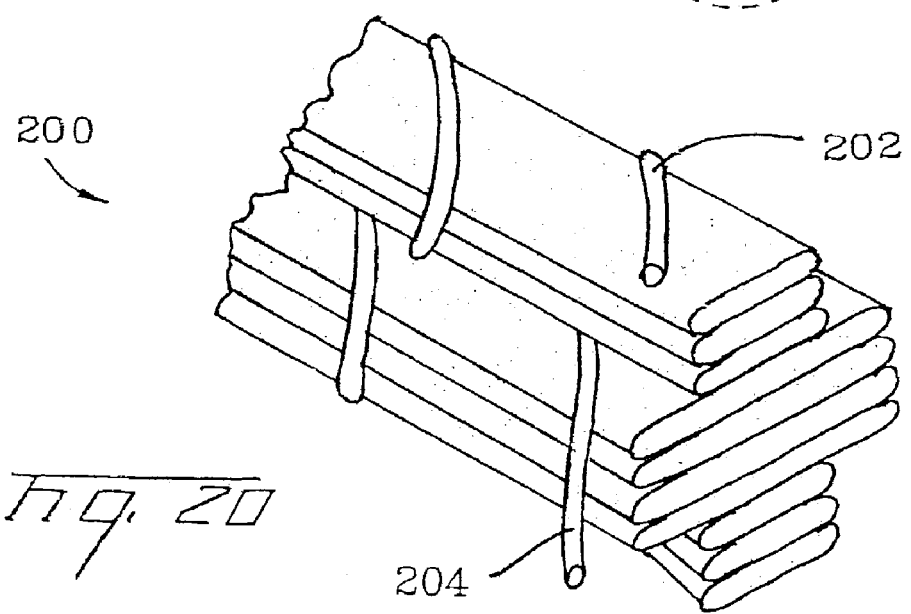
FIG. 20 depicts a ribbon stack having a plurality of binders wrapped therearound according to the present invention.

Ribbon stacks can use other methods for holding the ribbons of the stack together to provide stack integrity. For instance, ribbon stack 170, or portions of ribbon stack 170, can also have a binder or a stitch therearound, additionally other types of binders are possible. For example, a binder 174, or stitched threads, may be used to hold the entire group of ribbons together as depicted. Binders 174 can include threads, yarns, tapes, or other suitable materials for holding at least two optical waveguides together. Binders 174, or stitched threads, may also contain water-swellable materials and/or be colored for identification purposes. In other embodiments, the binder or stitch can hold less than all of the ribbons of the stack together. For example, as depicted in FIG. 20, a ribbon stack 200 has a profiled group of ribbons with a plurality of binders 202, 204, and 206 (not visible) around portions of ribbon stack 200. By way of example, three ribbons of a first lateral group of ribbon stack 200 have a first binder 202 therearound, three ribbons of a second lateral group of ribbon stack 200 has a second binder 206 therearound, and a medial group of ribbons has a third binder 204 therearound. Moreover, an optional fourth binder thread, or stitch, can be used for holding the three individually bound groups of ribbons together as a profiled ribbon stack. Holding individual groups together is advantageous for organization and routing to predetermined locations and aids the craft. Moreover, a single ribbon can be routed outside the stitch or binder by the craftsman for optical connection, while the other ribbons of the group are still held, together by the binder or stitch.

Other ribbon stacks are also possible. For instance, any of the ribbon assemblies can be used in a stack. Additionally, different types of ribbons can be used in a single stack or a portion of a stack. Stacks can also have optical waveguides arranged, or stacked, in a common connecting material, thereby providing a monolithic stack. For example, FIG. 21 depicts assembly 210 having twelve optical waveguides 12 connected using a common joining material 16. FIG. 22 depicts assembly 220 having joining material 16 formed from more than one material disposed. In this case, joining material 16 is formed in radial layers about the array of optical waveguides 12. For instance, an outer layer 16a may include one or more foamed layers 16a, or other like materials for protection purposes. In other advantageous embodiments, the outer layer of assembly 220 has a surface roughness suitable for creating fluid drag so that assembly 220 can be blown within a duct. Moreover, the surface roughness can reduce the friction between assembly 220 and the duct.

The optical performance and the temperature cycling tests show that optical articles, assemblies and cables according to the present invention can handle higher levels of stress and/or strain without degrading optical performance. In other words, assemblies and/or cable configurations can allow ribbon 10, or other configurations of optical waveguides, to experience higher levels of stress and/or strain without significant increases in attenuation levels. Consequently, assembly and/or cable designs can have smaller diameters, reduced tensile enhancement, i.e., fewer or smaller strength components, relaxed stranding requirements, wide ranges of excess ribbon length (ERL), and/or a higher optical waveguide packing density while maintaining reliable optical performance. Likewise, optical waveguides such as optical fibers can have wider ranges of excess fiber length (EFL).

By way of example, one or more ribbons can be used as a portion of a ribbon tube assembly. Moreover, tube assemblies with ribbons having optical waveguides 12 disposed in high stress locations are advantageous. For instance, in one embodiment ribbons 10 of the ribbon stack 170 have optical waveguides 12 disposed solely as end optical fibers A,B. End optical fibers A,B typically experience the highest levels of stress and/or strain when, for example, the ribbon contacts the tube wall during bending. In other embodiments, all of the optical waveguides of the ribbon tube assembly are optical waveguides 12. Additionally, tube assemblies can be used as a portion of larger assemblies such as monotube cables, stranded tube cables, or drop cables.

FIG. 23 depicts an exemplary tube assembly 230 having a ribbon stack 232 within a tube 235. Moreover, tube 235 is filled with a thixotropic material 234 such as grease for inhibiting the migration of water inside the tube. In addition to blocking water, thixotropic materials to provide a cushioning layer, allow movement of ribbons, and couple the optical waveguides with the tube.

Like the pre-wet layer, conventional tube assemblies typically use a thixotropic material composition that does not cause elevated levels of stress and/or strain on the optical waveguides. For example, conventional tube assemblies use thixotropic materials having specific viscosity ranges so that at relatively low temperatures the optical performance is acceptable. A typical thixotropic material for conventional tube assemblies is available from the Stewart Group of Charlotte, N.C. under the tradename K550. Additionally, thixotropic materials suitable for conventional tube assemblies may include inorganic fillers such as silica fillers for reducing cost and/or influencing the viscosity of the thixotropic material; however, fillers may be organic such as hollow (expanded or unexpanded) or solid thermoplastic microspheres such as Expancel® commercially available from Expancel, Inc. of Duluth, Ga. Thixotropic materials may also include fillers for flame-retardant purposes such as magnesium hydroxide or aluminum trihydrate (ATH). However, the silica, or other fillers, must have a relatively fine particle size for achieving acceptable optical performance in conventional tube assemblies. In other words, if the particle size of the filling material is too large the particles can cause undesirable optical attenuation in conventional tube assemblies.

On the other hand, the articles and assemblies of the present invention can handle increased levels of stress and/or strain. Consequently, tube assembly 100 can use thixotropic materials that would have caused elevated and/or unacceptable levels of optical attenuation in conventional tube assemblies. By way of example, assemblies and/or cables of the present invention can have thixotropic materials with lower viscosities, fillers having larger particle sizes, a wider range of filler particle density, irregular shapes, and/or increased particle hardness. However, thixotropic materials have the disadvantage of being relatively messy and must be cleaned from the optical waveguide before optical connection or splicing. Consequently, materials other than thixotropic materials are useful for at least partially filling a tube assembly.

Figure 24:
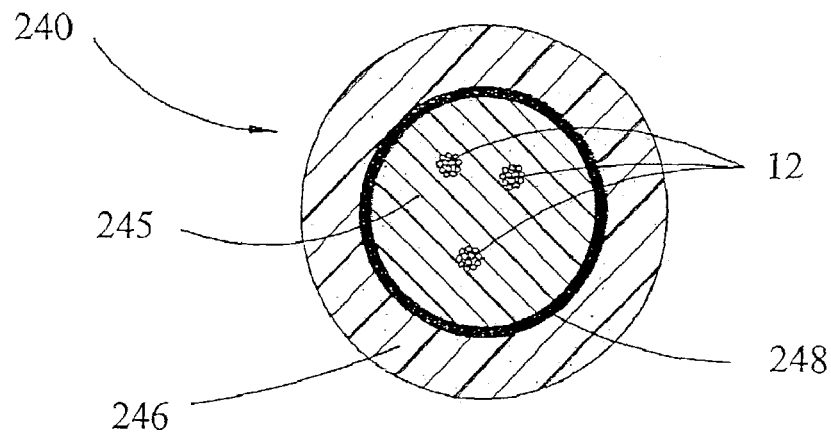

U.S. Pat. No. 6,374,023, the disclosure of which is incorporated herein by reference, discusses filling materials having thermoplastic polymeric molecules that have bonded, thereby forming a three-dimensional network. Generally speaking, unlike thixotropic materials, these filling materials having three-dimensional networks are dry materials that are easily and cleanly removed from optical waveguides. Furthermore, assemblies using filling materials having three-dimensional networks may eliminate the tube or be used as a friction element within the tube as discussed in U.S. patent application Ser. No. 09/966,646 filed on Sep. 28, 2001, the disclosure of which is incorporated herein by reference. In other words, the material forms a soft housing such as a buffer tube about the optical waveguide 12. FIG. 24 depicts an optical assembly 240 of the present invention having bundles of optical waveguides 12 at least partially embedded in a soft housing 242 having two layers 245 and 246 separated by an interfacial layer 248. Interfacial layer 248 may have several functions such as controlling the bonding between layers 245 and 246 or other suitable functions.

Additionally, tube assemblies according to the present invention may have a relatively dense packing of ribbons within the tube. Stated another way, a ribbon packing density within a tube can be relatively high without degrading optical performance because assemblies such as ribbons can have more contact with the inner wall of the tube during, for example, bending. Assemblies of the present invention achieve their packing density, for example, by increasing the allowable number of ribbons within a tube, using thinner tube walls, and/or using ribbons having a smaller cross-sectional area.

The ribbon packing density can be calculated as the area occupied by the ribbons divided by the area circumscribed by the outer diameter of the tube, which yields a number less than unity. The ribbon packing density can be improved by using a tube assembly having less free space between the ribbon stack and the tube wall, using a tube having a thinner wall thickness, and/or using stack profiles that conform with the tube shape. Likewise, an optical fiber packing density can be calculated. The optical fiber packing density can be calculated as the area occupied by the optical waveguides divided by the area circumscribed by the outer diameter of the tube, which yields a number less than unity. Generally speaking, the ribbon packing density is the preferred way to compare ribbon tube assemblies. For embodiments that do not employ ribbons, the optical waveguide packing density is a way in which assemblies may be compared. Optical waveguide packing density is a ratio of the area occupied by the optical waveguides divided by the outer dimension of a given component.

Figure 25:
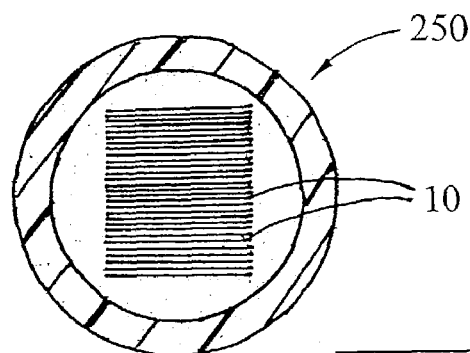

Illustratively, a tube assembly houses eighteen ribbons. 10 each having twelve uncolored optical fibers 12 with a nominal outer diameter of 245 microns. Given ribbons having a width of 3.12 mm and a height of 0.310 mm the total area for all eighteen ribbons can be calculated as about 17.41 mm$^2$. The tube has an ID of about 9.0 mm and a tube wall thickness of about 1.0 mm for an OD of about 11 mm for an occupied area of about 95 mm$^2$. Thus, in this case, the ribbon packing density is about 0.18. The present invention allows high ribbon packing densities while still maintaining optical performance. Using the same ribbon and tube dimensions as given above, FIG. 25 schematically illustrates tube assembly 250 with twenty-nine ribbons 10 disposed in the tube for a total ribbon area of about 28.05 mm$^2$ and a ribbon packing density of about 0.30. Preferably, the ribbon packing density is about 0.15 or greater, more preferably about 0.3000 or greater, but of course other suitable ranges are possible. For comparison purposes, an optical waveguide packing density for tube assembly 250 can be calculated as about 0.11.

Figure 26:
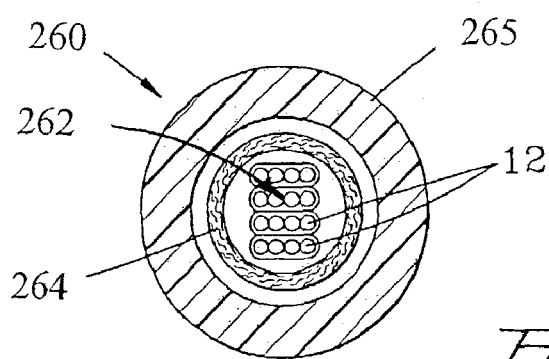

FIG. 26 depicts a dry tube assembly 260 according to the present invention. Dry tube assemblies generally exclude thixotropic materials, but may include suitable lubricants therein such as oils, waxes, or the like between ribbons to allow relative movement between the ribbons. Dry tube assembly 260 has a ribbon stack 262 with one or more ribbons 10 and one or more water-swellable yarns and/or tapes 264 within tube 265. Yarns and/or tapes 264 can be loosely or tightly packed, wrapped, or disposed about ribbon stack 262, but to a certain extent should couple the ribbon stack with tube 265. Water-swellable components may include a mixture of two or more water receptive agents as discussed in U.S. Pat. No. 6,304,701, the disclosure of which is incorporated herein by reference. Specifically, the mixture can include a at least two or more superabsorbent substances such as a first substance having a very fast swelling rate for blocking the flow of water and a second substance having a high gel strength to inhibit wicking. Additionally, other dry tube assemblies may be filled continuously or intermittently with other suitable materials such as foam or foam tapes for water-blocking and coupling. Examples of which are discussed in U.S. Pat. No. 6,463,199, the disclosure of which is incorporated herein by reference.

Figure 27:
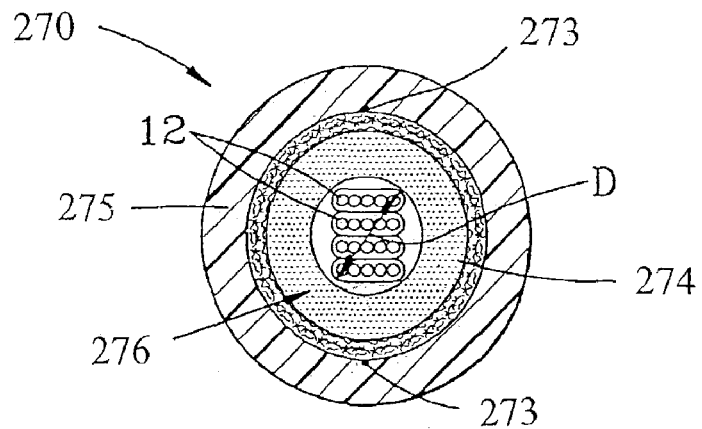

FIG. 27 depicts another dry tube assembly 270 that includes a dry insert 274 generally surrounding at least one optical waveguide 12 within tube 275 as discussed in U.S. patent application Ser. No. 10/326,022 filed on Dec. 19, 2002, the disclosure of which is incorporated herein by reference. Dry insert 274 includes one or more layers, and in preferred embodiments dry insert 274 includes a foam layer and a water-swellable layer that generally surround a ribbon stack secured by at least one binder 273, thereby forming a core 276 within tube 275. Foam layer of dry-insert 274 is preferably a compressible tape that assists in coupling the at least one optical fiber with the tube, more preferably an open cell foam tape. Dry insert 274 and/or other means preferably couple the ribbon stack so as to require a ribbon pullout force in the range of about 0.5 N/m to about 5.0 N/m, more preferably, in the range of about 1 N/m to about 4 N/m. Other embodiments include attaching or bonding a portion of dry insert 274 with tube 275 for achieving coupling therebetween. For example, adhesives, glues, elastomers, and/or polymers (not visible) are disposed on at least a portion of the surface of dry insert 274 that contacts tube 275 for attaching/coupling dry insert 274 with tube 275.

Furthermore, the compression of dry insert 274 can provide a portion or essentially all of the coupling force between dry insert 274 and tube 275. Compression of dry insert 274 is actually a localized maximum compression of dry insert 274. The localized maximum compression of dry insert 274 occurs at the corners of the ribbon stack across the diameter. Calculating the percentage of compresssion of dry insert 274 in FIG. 27 requires knowing an inner diameter of tube 275, a diagonal D dimension of the ribbon stack, and an uncompressed height H of dry insert 274. By way of example, inner diameter of tube 275 is 7.1 mm, diagonal D of the ribbon stack is 5.1 mm, and the uncompressed height H of dry insert 274 across a diameter is 3.0 mm (2 times 1.5 mm). Adding diagonal D (5.1 mm) and the uncompressed height H of dry insert 274 across the diameter (3.0 mm) yields an uncompressed dimension of 8.1 mm. When placing the ribbon stack and dry insert 274 and into tube 275 with an inner diameter of 7.1 mm, dry insert 274 is compressed a total of 1 mm. (8.1 mm–7.1 mm). Thus, dry insert 274 is compressed by about thirty percent across the diameter of tube 275. In other embodiments, dry insert 274 is essentially uncompressed, but begins to compress if optical waveguide movement is initiated.

Additionally, dry tube assembly 270 can include a binder 273 for securing dry insert 274 about optical waveguide 12 as discussed in, U.S. patent application Ser. No. 10/448,874 filed on May 30, 2003, the disclosure of which is incorporated herein by reference. Specifically, at least one binder 273 is surrounded by a polymer layer. In the case of dry tube assembly 270 the polymer layer is tube 275. The polymer layer, i.e., tube 275, at least partially melts the at least one binder 273 when the polymer layer is extruded thereover, thereby at least partially bonding the at least one binder with the polymer layer. Consequently, when the craftsman opens, or removes the tube formed by the polymer layer, binder 273 at least partially comes off with the polymer layer because it is at least partially bonded therewith. This bonding between binder 273 and the polymer layer generally eliminates the time consuming step of removing binder 193 from the dry insert when accessing the optical waveguides. In other embodiments, the polymer layer can essentially melt binder 273. Moreover, a binder that melts when a polymer layer is extruded thereover can be used in other suitable locations and/or with other assemblies.

Tube assemblies of the present invention may also have wider ranges of excess ribbon length (ERL). ERL is the percent difference between the ribbon length minus the length of tube, or other article, that houses the ribbon. For example, during bending of a tube assembly, the ribbons reposition themselves to an inner diameter of the bend and may contact the inner wall of a tube if there is not a sufficient ERL, this contact may cause optical degradation. However, a slightly positive ERL may reduce this effect during bending. However, too high an ERL value can cause undulations within the tube that have a similar effect by causing the ribbons to contact the tube wall. Additionally, a positive ERL in an assembly generally allows the assembly to carry a tensile stress without transferring the stress to the ribbons. Embodiments according to the present invention can have wider ranges of ERL such as between about zero percent and about 0.25 or greater percent ERL because the assemblies are not as sensitive, for example, to the forces cause by the ribbons contacting the tube wall.

Tubes of the assemblies are preferably made from a dielectric polymeric material such as a polyethylene, a polypropylene, a polyvinylchloride (PVC), or a PBT. Moreover, polymer tubes along with other components of the cable, can be formed from flame-retardant polymeric materials, thereby improving flame-retardant properties of the cable. However, other suitable materials such as semi-conductive or conductive materials such as steel or copper can be used where suitable such as in submarine applications. Other suitable materials for the tube can include composite materials. Composite materials may include suitable fillers in a polymer material for reducing post-extrusion shrinkage. Suitable fillers include clay, nano-carbon tubes, titanium dioxide (TiO2), or like fillers.

Figure 28:
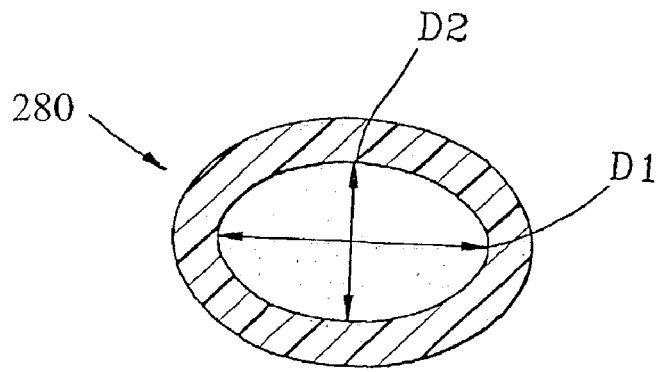

Filling, the tube assembly with a thixotropic material provides other benefits such as aiding in maintaining the tube shape before the tube is cooled and solidifies. Since dry tube assemblies are generally not filled with a thixotropic material the tube may deform or collapse, thereby forming an oval shaped tube instead of a round tube. U.S. patent application Ser. No. 10/448,509 filed on May 30, 2003, the disclosure of which is incorporated herein by reference, discusses dry tube assemblies where the tube is formed from a bimodal polymeric material having a predetermined average ovality. As used herein, ovality is the difference between a major diameter D1 and a minor diameter D2 of tube 280 (FIG. 28) divided by major diameter D1 and multiplied by a factor of one-hundred, thereby expressing ovality as a percentage. Bimodal polymeric materials of the present invention include materials having at least a first polymer material having a relatively high molecular weight and a second polymer material having a relatively low molecular weight that are manufactured in a dual reactor process. This dual reactor process provides the desired material properties and should not be confused with simple post reactor polymer blends that compromise the properties of both resins in the blend. In one embodiment, the tube has an average ovality of about 10 percent or less.

In other embodiments, the tube can have one or more strength members or ripcords within a tube wall, and/or a water-swellable coating thereon or embedded therein as discussed in U.S. Pat. Nos. 5,388,175 and 6,195,486, the disclosures of which are incorporated herein by reference. The tube may also be a co-extrusion of two or more materials for tailoring tube properties and/or reducing material costs. Other tube assemblies according to the present invention can include other components such as electrical components inside the tube or within the tube wall. Other tube assemblies can also have at least one removable section or weakened portion. An example of which is discussed in U.S. Pat. No. 5,970,196, the disclosure of which is incorporated herein by reference.

Figure 29:
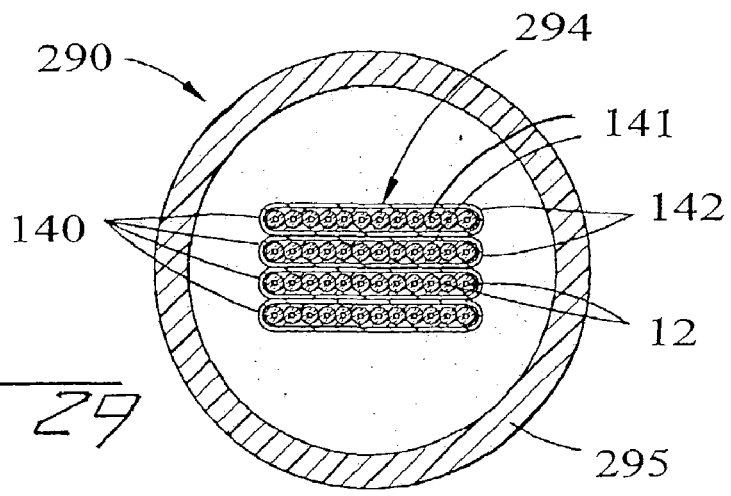

Other tube assemblies are also within the scope of the present invention. For instance, FIG. 29 depicts a tube assembly 290 having ribbons 140 arranged in a ribbon stack 294 and disposed within a tube 295 as discussed in U.S. patent application Ser. No. 10/403,327 filed on Mar. 31, 2003, the disclosure of which is incorporated herein by reference.

Tube assemblies according to the present invention having at least one optical waveguide 12 can be used as a portion of a cable such as a monotube cable, a stranded tube cable, or a drop cable. Moreover, the at least one optical waveguide 12 of the tube assembly may be a portion of a ribbon, an optical waveguide bundle, a tight-buffered fiber or ribbon, a bare fiber, or other suitable configuration.

Generally speaking, cables having at least one tube assembly include a sheath system disposed around the tube assembly. The sheath assembly includes at least one jacket and other optional components such as tensile strength, members, anti-buckling members, anti-shrink members, ripcords, tapes, binders, and/or armor. Using these components a multitude of different cable configurations are possible. The following cable embodiments are representative cables using the concepts of the present invention.

Figure 30:
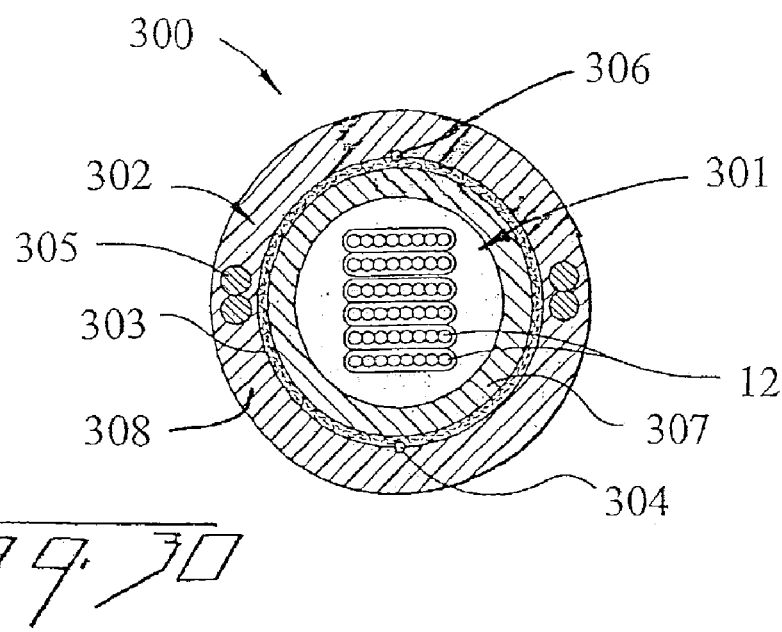
FIGS. 30–44 depict exemplary cable assemblies according to the present invention.

FIG. 30 illustrates a monotube cable 300 having a sheath system 302 disposed around a tube assembly 301 having ribbons with optical waveguides 12. Sheath system 302 includes a water-swellable tape 303 wrapped about tube assembly 301 that is secured by a binder 304, two pairs of strength members 305, a ripcord 306, and a jacket 308. Wrapping water-swellable tape 303 around tube assembly 301 inhibits jacket 308 from sticking to a tube 307 during extrusion, thereby making it easier for the craftsman to remove jacket 308. Another way to aid the craft is by using a binder having a material that at least partially melts when the polymer layer of the jacket is extruded thereover, thereby at least partially bonding the binder with the jacket. Furthermore, tube assembly 301 can either be wet tube assembly, i.e., filled with a thixotropic material or dry tube assembly, i.e., having water-swellable tapes and/or yarns therein such, as assembly 260.

Figure 31:
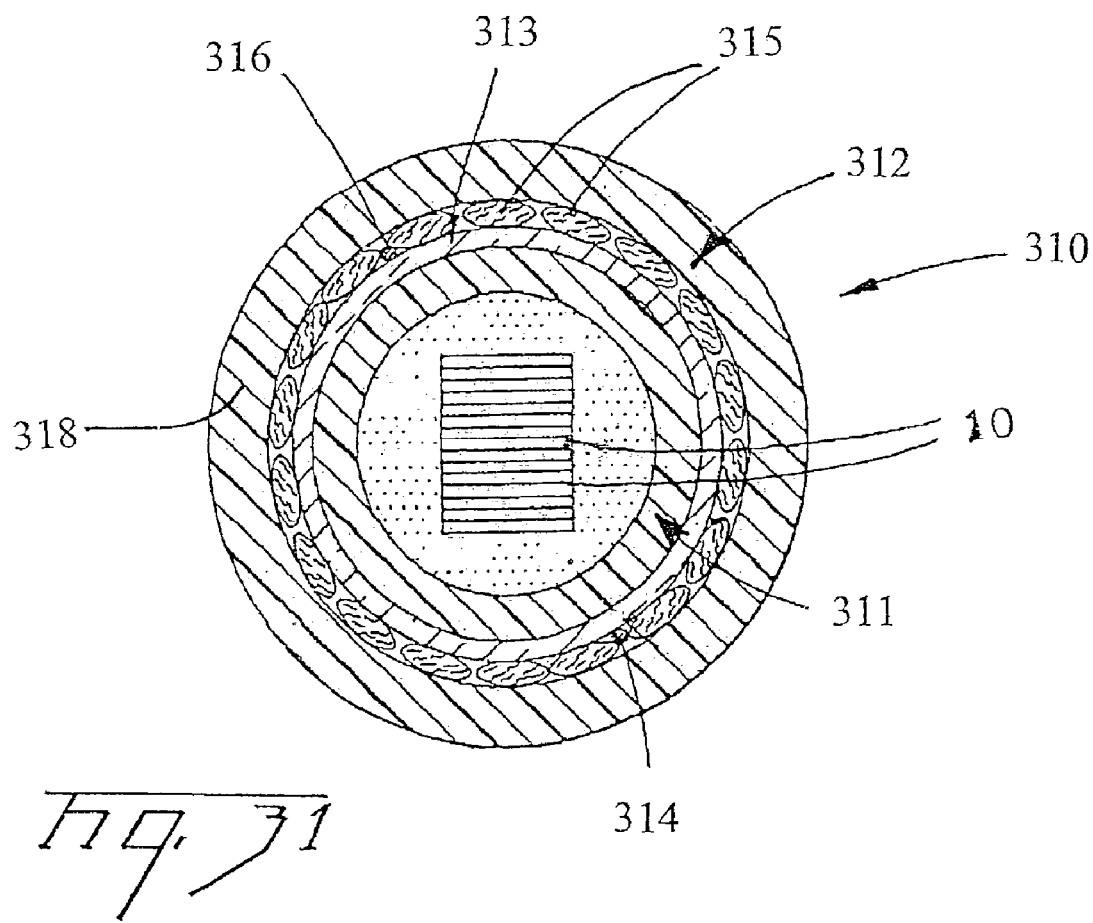

In this embodiment, strength members 305 are disposed adjacent to water-swellable tape 303. Besides being disposed radially outward of tube 307, strength members may have other suitable locations such as within the tube or jacket wall. Strength members 305 may be reinforced plastic rods that provide both tensile strength and anti-buckling resistance for an all-dielectric construction. By way of example, suitable reinforcement for the strength members can be glass, aramid, or fiberglass materials for respectively forming glass-reinforced plastic (GRP), aramid reinforced plastic (ARP), or fiberglass reinforced plastic rods. Additionally, strength members can have suitable shapes and sizes for the particular cable design. Moreover, embodiments of the present invention can use other materials for strength members, for instance, other dielectric, semi-conductive, or conductive materials. Suitable dielectric strength members include flexible fiberglass rovings, aramid yarns, and other like materials. Suitable conductive strength members may include steel, copper, copper-cladded steel, or other suitable materials. Additionally, semi-conductive strength members such as carbon fibers are also possible. As depicted, strength members 305 are configured for a preferential bend characteristic. However, other embodiments can have strength members arranged for a non-preferential bend characteristic (FIG. 31). In further embodiments, strength members may be impregnated or coated with a water-absorbent or water-swellable material.

Cable 300 also includes ripcord 306 that is preferably disposed radially inward of jacket 308 for aiding in the removal of the same. Suitable ripcords are made from materials such as PBTs, polyesters, and polypropylenes. Ripcords of the present invention may be disposed on a tape or formed from a metallic material having surface roughness as discussed in U.S. patent application Ser. No. 10/036,027 filed on Dec. 26, 2001, the disclosure of which is incorporated herein by reference. Additionally, ripcords are useful for ripping other layers of an assembly such as a tape, film, or armor. However, the ripcord should have suitable characteristics for ripping the intended material without breaking.

Jacket 308 is preferably a polymeric material such as polyethylene, polypropylene, PVC, PBT, or other suitable polymers. The polymeric material can comprise blends, additives, and fillers. In plenum and riser applications, jacket 308 is a suitable flame-retardant material. Suitable flame-retardant materials include polyvinyl chloride (PVC), polyvinylidene fluoride (PVDF), flame-retardant polyethylene (FRPE), but other suitable flame-retardant materials can be used. In flame-retardant embodiments, other components are also preferably constructed from flame-retardant materials. Additionally, jackets, tubes, or other polymeric flame-retardant components may include a reduced level of a hydrated inorganic filler in a polymer blend that includes a polymerization or copolymerzation product of one or more ethylenically unsaturated monomers and an aliphatic polyketone as discussed in U.S. Pat. No. 6,025,422, the disclosure of which is incorporated herein by reference.

Jackets as well as other polymer components can also include other suitable additives or fillers for shrinkage control, adhesion characteristics, and/or cost reductions. One additive may be a fungicide for inhibiting the growth of fungus. Additionally, polymer components requiring resistance to fungus in the absence of a fungicide, may be formed from an extruded blend of a nonplasticized PVC and ether-based polyurethane as discussed in U.S. Pat. No. 6,057,018, the disclosure of which is incorporated herein by reference. Additionally, jackets according to the present invention can also have a reduced wall thickness because the optical assemblies can tolerate larger stresses and/or strains, from crushing, impacts, or tensile forces without degrading optical performance of the assembly.

FIG. 31 depicts another monotube cable 310 that may be riser or plenum rated having a sheath system 312 disposed around a tube assembly 311 having ribbons 10 therein. In this case, sheath system 312 includes at least one tape 313 wrapped about tube assembly 311 and secured by a binder 314, a plurality of strength members 315 that are relatively flexible, a ripcord 316, and a jacket 318. The at least one tape 313 can be a water-swellable tape, a flame-retardant tape, or both. Examples of flame-retardant tapes include Kapton® or mica tapes. In this case, the at least one tape may be a composite tape having a water-swellable coating and a flame-retardant layer as discussed in U.S. Pat. No. 6,501,887, the disclosure of which is incorporated herein by reference. In other embodiments, a water-swellable tape and a flame-retardant tape are used. In other embodiments, a flame-retardant tape is disposed between two water-swellable tapes. Additionally, In further embodiments, a flame-retardant jacket has layers of components disposed in the space between the flame-retardant jacket and the tube that provide strength and flame-inhibiting capabilities as discussed in U.S. Pat. No. 6,122,424, the disclosure of which is incorporated herein by reference.

The plurality of strength members 315 are preferably flexible fiberglass strength members helically stranded in a single layers about tube assembly 311; however, the strength members may be disposed in two contra-helically stranded layers. In other embodiments, the strength members 315 include water-swellable materials for blocking the migration of water near the strength members. The uniform placement of the strength members results in a cable having a non-preferential bend characteristic. Ripcord 316 lies radially inward of jacket 318. Additionally, the tube of tube assembly 311 and jacket 318 are formed from suitable materials for meeting desired plenum or riser ratings. Cables such as cable 310 may take other forms such as having tight-buffered or bare optical waveguides 12, instead of ribbons within the tube. Likewise, other embodiments can include profiled ribbon stacks within the tube as discussed previously. Additionally cables may also have other configurations that include armor, flame-retardant tapes or polymer materials, and/or electrical components.

Delta attenuation caused by a cabling manufacturing process was also examined. Specifically, a cabling performance test was conducted on a cable similar to cable 300 having eighteen multi-mode ribbons 10 and a conventional cable. More specifically, the cables tested each respectively had eighteen twelve-fiber ribbons. The delta attenuation (dB/km) results for the cabling performance test are summarized in Table 6. As shown, the tested cable according to the present invention had about one-third the delta attenuation as a similar conventional cable during the cable manufacturing process. Additionally, in service a cable experiences a total delta attenuation. In other words, the total delta attenuation is the sum of delta attentuations due to individual components such as cable manufacturing component and an environmental component. Thus, embodiments of the present invention are suitable for use where high levels of reliability and performance are required. Moreover, cables of the present invention may be specified with performance levels such as cabling delta attenuation less than 0.300 dB, and more preferably less than 0.200 dB for multi-mode cables.

TABLE 6

Delta attenuation for a multi-mode cabling performance test

| Assembly Type | 850 nm Ave | 1300 nm Ave |
| --- | --- | --- |
| Conventional | 0.321 | 0.349 |
| Cable 330 | 0.120 | 0.146 |

Figure 32:
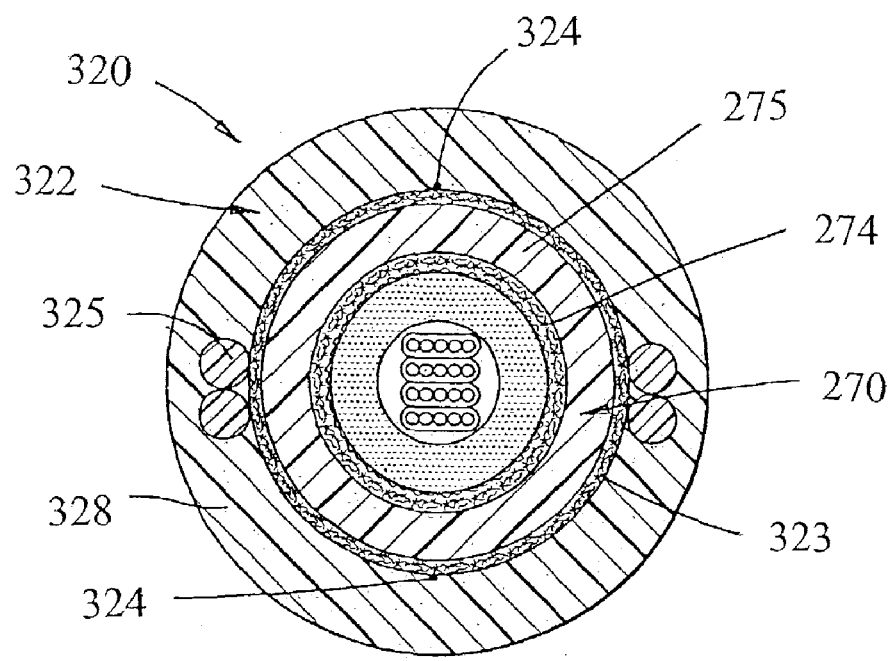
Figure 33:
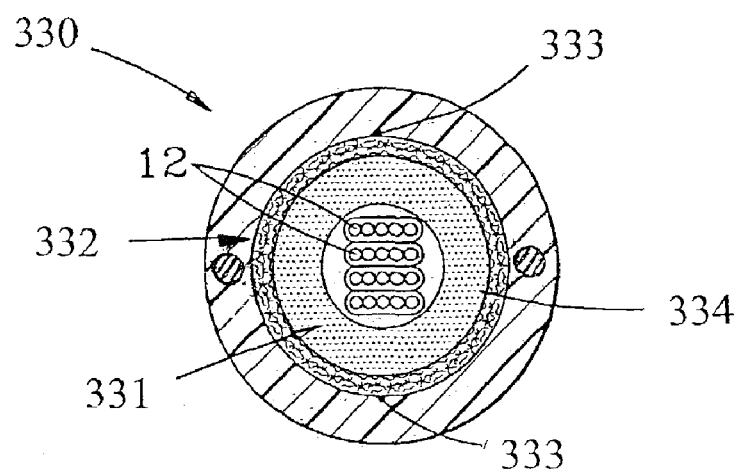
Figure 34:
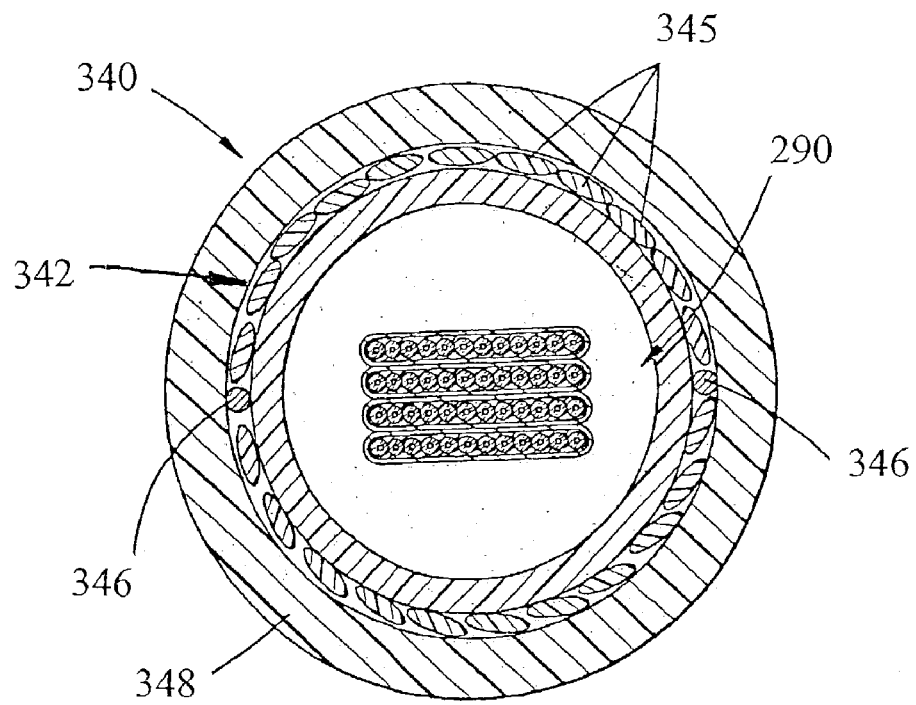

FIG. 32 depicts a dry cable 320 having tube assembly 270 with a sheath system 322. Sheath system 322 includes a water-swellable tape 323 wrapped about tube assembly 270 and secured by at least one binder 324, strength members 325, and a jacket 328. FIG. 33 depicts cable 330, which is similar to cable 320, except that it eliminates the tube and the water-swellable tape wrapped about the tube. In other words, cable 330 is a tubeless design. Tubeless designs generally allow for relatively smaller cable diameters since the tube is eliminated. A core 331 includes a dry insert 334 surrounding a ribbon stack and secured using at least one binder 333. Since core 331 is surround solely by a sheathing system 332, the craftsman only has to open the jacket to access core 331 instead of having to open both a jacket and a tube for accessing the ribbons. FIG. 34 depicts another monotube cable 340 according to the present invention using tube assembly 290 with a sheath system 342. Sheath system 342 includes a plurality of strength members 345 stranded about tube assembly 290, ripcords 346, and a jacket 348.

Figure 35:
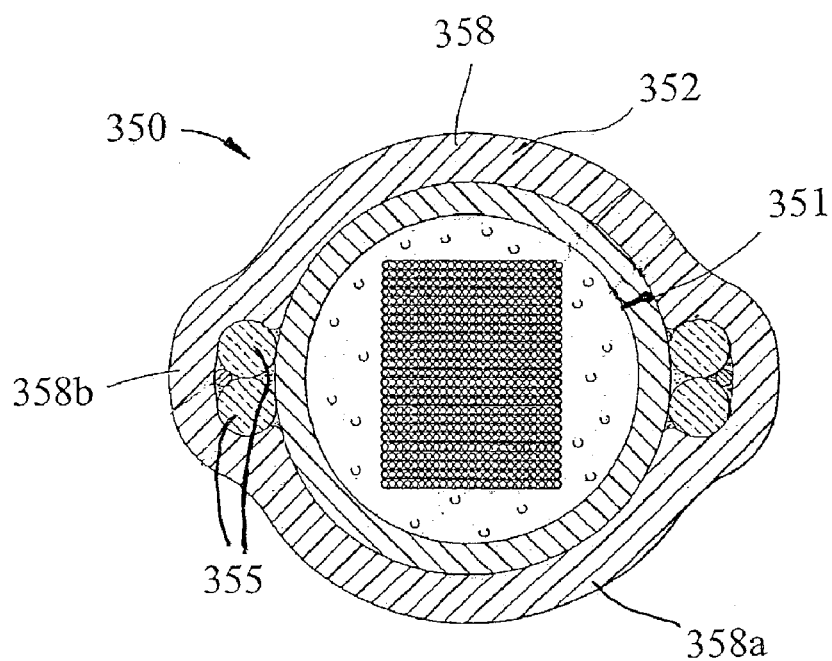

In other embodiments, the sheathing system of any of these cables can have other suitable configurations. For instance, FIG. 35 depicts cable 350 having a sheath system 352 surrounding a ribbon stack within a tube assembly 351. Sheath system 352 includes strength members 355, and a jacket 358 having a non-uniform profile with close profile sections 358a and extended profile sections 358b as discussed in U.S. Pat. No. 6,101,305, the disclosure of which is incorporated herein by reference. Likewise, other suitable sheath systems can be used.

Figure 36:
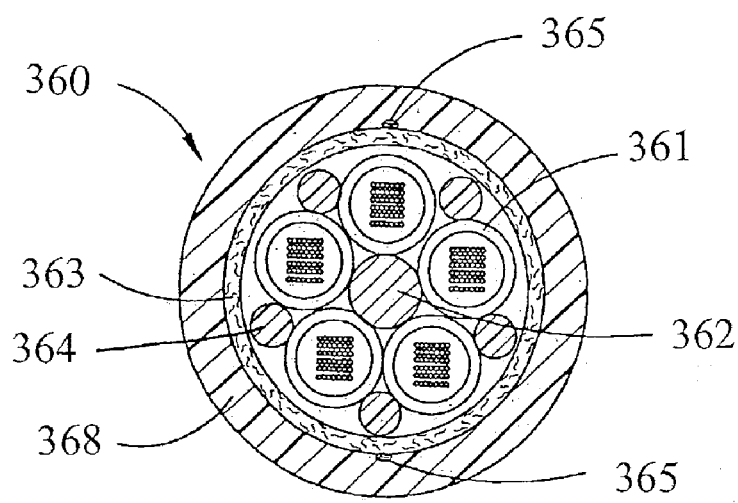
Figure 37:
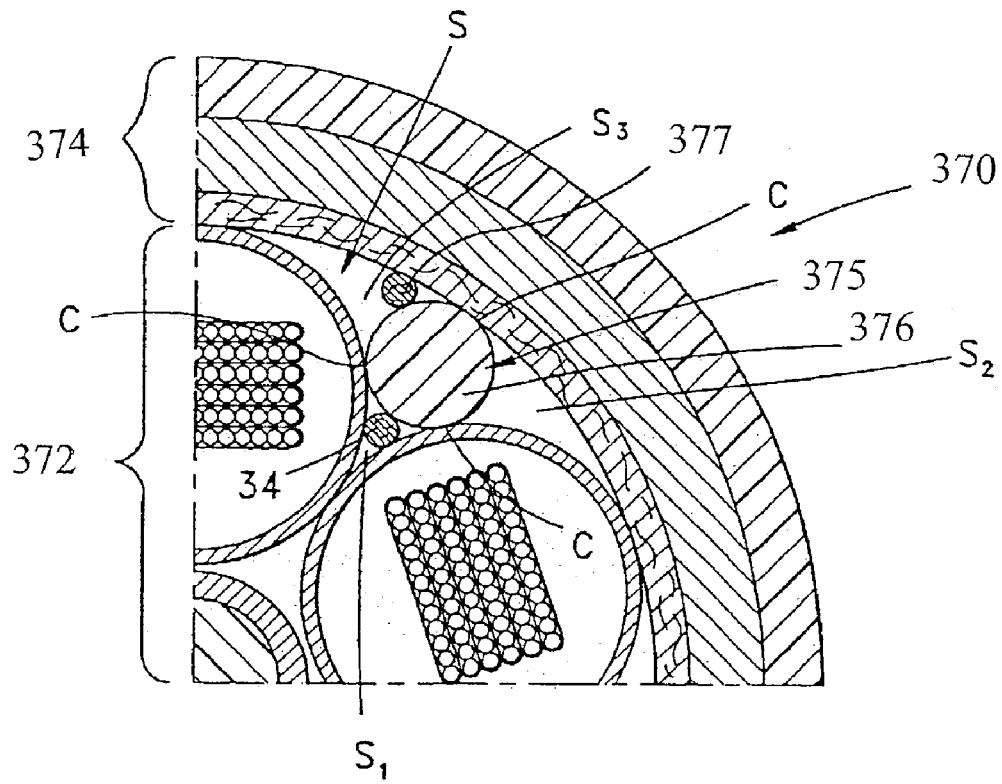

Additionally, one or more tube assemblies of the present invention can be stranded to form other cable designs of the present invention. FIG. 36 depicts cable 360 having a plurality of tube assemblies 361 and filler rods 364 stranded about a central member 362. More specifically, tube assemblies 361 and fillers 364 are S-Z stranded about central member 362. Moreover, any suitable tube assembly of the present invention may form a portion of a stranded tube cable. In addition to blocking water, a water-swellable tape 363 inhibits a jacket 368 from adhering to tube assemblies 361. Water-swellable tape is secured by binder 365 and holds the stranded core together until jacket 368 is extruded thereover. Central member 362 is made of a suitable material such as a dielectric, conductor, or composites. Central member 362 can also have a water-swellable coating on its outer surface or a water-swellable tape wrapped therearound for inhibiting the migration of water near the center of the cable. Other stranded tube cable embodiments can employ an interstitial assembly as shown in FIG. 37 fore providing crush resistance and water-blocking features to the cable as discussed in U.S. Pat. No. 6,014,487, the disclosure of which is incorporated herein by reference. Specifically, FIG. 37 depicts a tube section 372 and a sheath section 374 of a cable 370. Between sections 372 and 374 is interstitial assembly 375 having a compressive strength member 376 and a water-swellable member 377 where water-swellable member 377 is disposed generally alongside compressive strength member 376 in a radially inner sub-interstice S1,S2, S3 of a general interstice S. Compressive strength member 376 provides crush resistance to the cable at contact points C.

Figure 38:
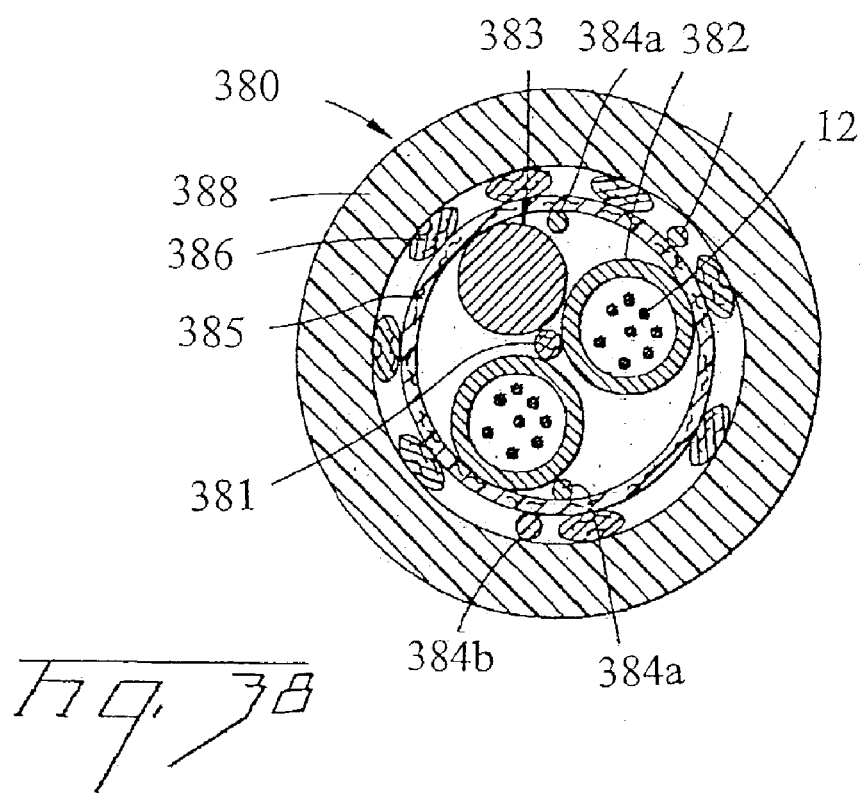

Another stranded tube cable 380 is depicted in FIG. 38. As shown, at least one tube assembly 282 includes bare optical waveguides 12; however, other tube assemblies can have buffered optical fiber, ribbons, or optical waveguide bundles. Specifically, tube assemblies 382 are stranded along with at least one strength component 383, which generally offset from a center-zone of cable 280, about a central member 381 as discussed in U.S. Pat. No. 6,249,629, the disclosure of which is incorporated herein by reference. In preferred embodiments, tube assemblies 282 and strength component 283 are stranded about a water-swellable component for inhibiting the migration of water near the center of cable 380. Cable 380 may also include a first binder 284a for holding the stranding together. A sheath system may include a tape 385, a plurality of strength elements 386, a ripcord 287, and a jacket 288. Tape 285 is wrapped about the stranding and is secured by a second binder 384b. The plurality of strength members 386 preferably have a water-swellable substance therein or thereon. Jacket 388 along with the other polymer components are formed from suitable materials.

Figure 39:
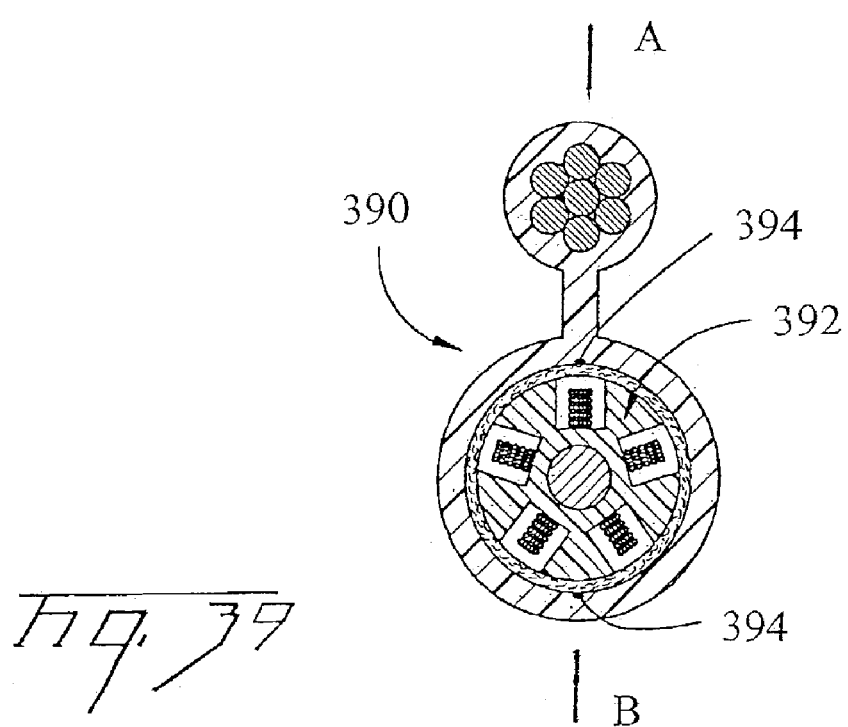
Figure 40:
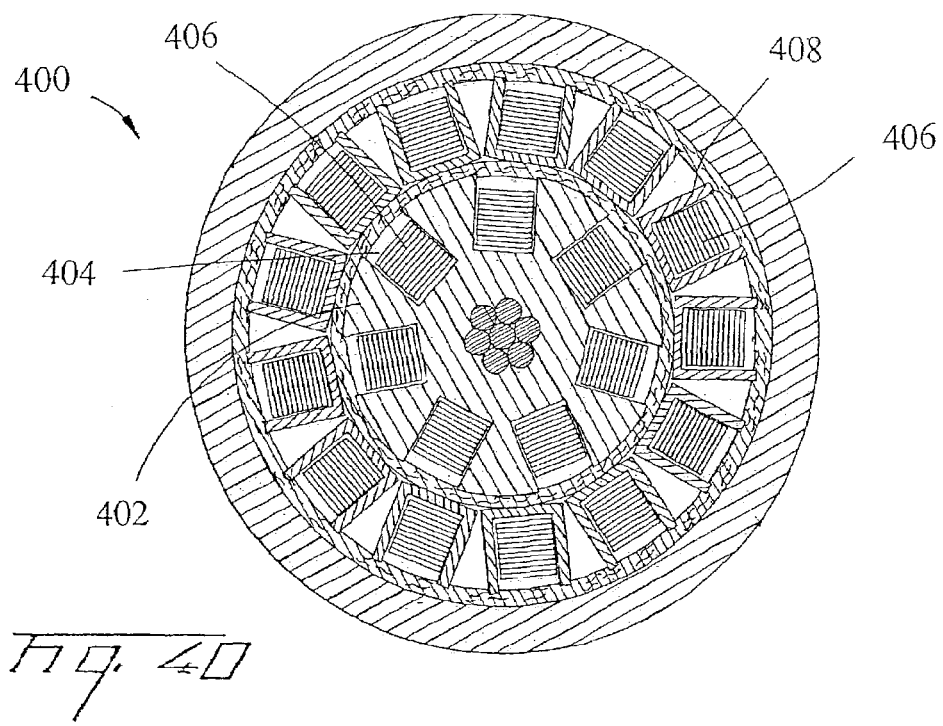

The concepts of the present invention are also useful with other assemblies in other cable designs. Specifically, assemblies-having optical waveguides 12 can include slotted core cables (SC) and/or U-shaped carriers. FIG. 39 illustrates an exemplary figure-eight cable 390 with a slotted core 392 as discussed in U.S. Pat. No. 6,356,690, the disclosure of which is incorporated herein by reference. Specifically, cable includes a messenger section and a carrier section connected by a web and is suitable for applications such as routing optical fibers to a premises. In preferred embodiments, the web has a preferential tear portion. The carrier section includes at least one optical waveguide 12 and at least one strength member that lies in a reference plane A-B that generally extends through the messenger section, the carrier section, and the web. Additionally, the carrier section may have an overlength with respect to the messenger section by using an intermittent web, thereby inhibiting tensile forces on the optical waveguide in the carrier section. FIG. 40 depicts a dual-layer ribbon cable 400 having a slotted core 402 with a plurality of helical grooves 404 having a respective ribbon stack 406 as a first layer. A second layer is formed by a plurality of U-shaped carriers 408 having ribbon stacks 406 that are stranded about slotted core 402. Other dual layer configurations are also possible using buffer tubes.

Figure 41:
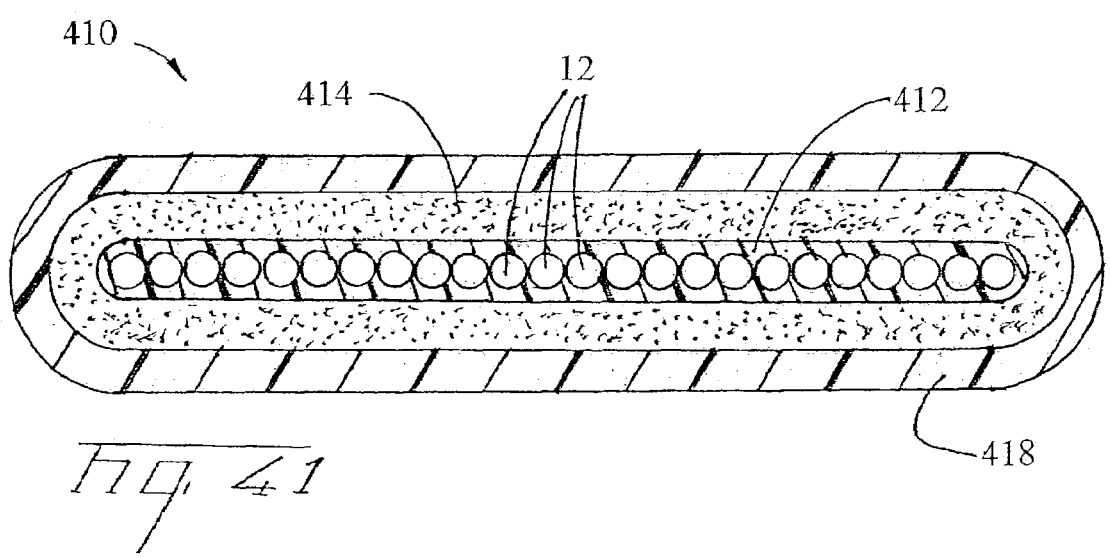

Ribbons of the present invention may also be used in other cable configurations that utilize relatively low ribbon counts. For instance, FIG. 41 illustrates cable 410 having a ribbon 412, similar to ribbon 10, but with twenty-four optical waveguides 12 connected by joining material 16, strength members 414, and a jacket 418. Cable 410 has tensile strength due to strength members 334, but they do not provide anti-buckling resistance because they are aramid, fiberglass, or other like materials. An experiment was conducted to examine the delta attenuation caused by making cable 410 with twenty-four multi-mode optical waveguides 12. The delta attenuation (dB/km) results for manufacturing cable 410 are summarized in Table 7.

TABLE 7

Delta attenuation for cabling

| Assembly Type | 850 nm Ave | 850 nm Max | 1300 nm Ave | 1300 nm Max |
|---|---|---|---|---|
| Conventional | 0.30 | 0.64 | 0.28 | 0.65 |
| Cable 410 | 0.14 | 0.19 | 0.09 | 0.16 |

Figure 42:
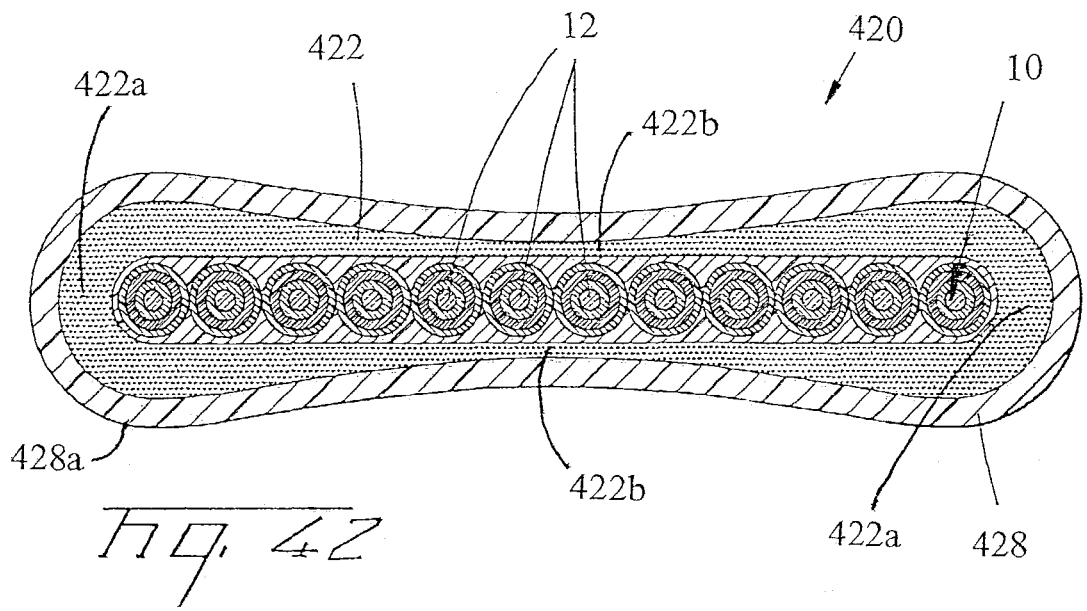

Another embodiment is shown in FIG. 42 and includes ribbon 10, a buffer material 422, and a jacket 428 where buffer material 422 is disposed between ribbon 10 and jacket 428 and at least one volume of buffer material 422 defines a stress-cushioning zone 422a as discussed in U.S. Pat. No. 6,449,412, the disclosure of which is incorporated herein by reference. Moreover, jacket 428 is substantially non-uniformly disposed about ribbon 10 such that the jacket portions adjacent the stress-cushioning zones includes respective crests 428a from which portions of jacket 428 slopes inwardly toward an intermediate buffer zones 422b.

Figure 43:
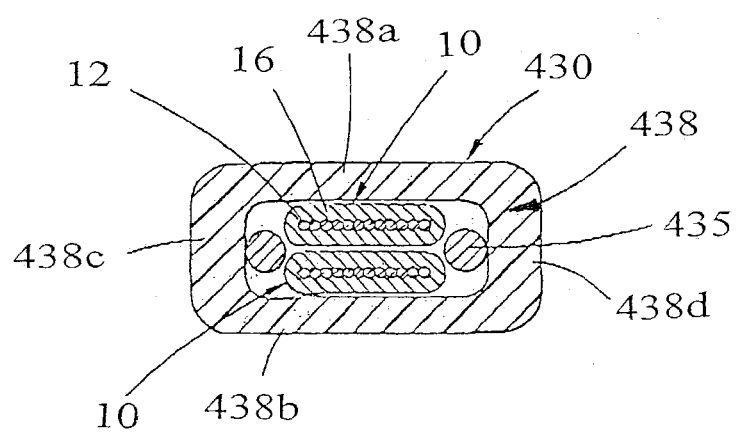
Figure 44:
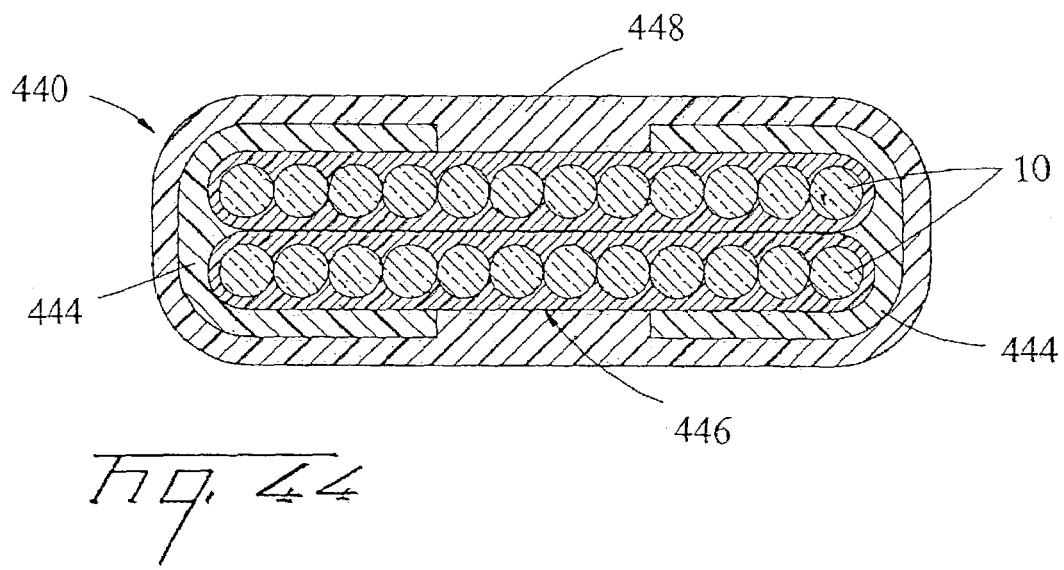

Another cable 430 according to the present invention is depicted in FIG. 43 and includes at least one ribbon 10 and a jacket 438 with a total vertical free space of about 1.7 mm±25% between a jacket 438 and ribbon(s) 10 as discussed in U.S. patent application Ser. No. 09/748,541 filed on Dec. 26, 2000, the disclosure of which is incorporated herein by reference. Jacket 438 includes a pair of sidewalls 438c and 438d that are thicker than the top and bottom walls 438a and 438b, thereby providing a predetermined hoop strength. Cable 430 may also include at least one strength member 435 within jacket 438. Another embodiment is depicted in FIG. 44 which is a ribbon assembly 440 having at least one ribbon 10, at least one-cushioning material 442, and at least one buffer material 444 that contacts a portion of ribbon 10 at 446 as discussed in U.S. patent application Ser. No. 10/108,581, the disclosure of which is incorporated herein by reference. Additionally, any of these low count ribbon configurations, as well as other designs, can be used as a portion of a larger breakout cable.

Articles, assemblies, or cables of the present invention can also include one or more suitable connectors. Suitable connectors include SC, FC, duplex, and MTP; however, other optical connectors may be used.

Figure 45:
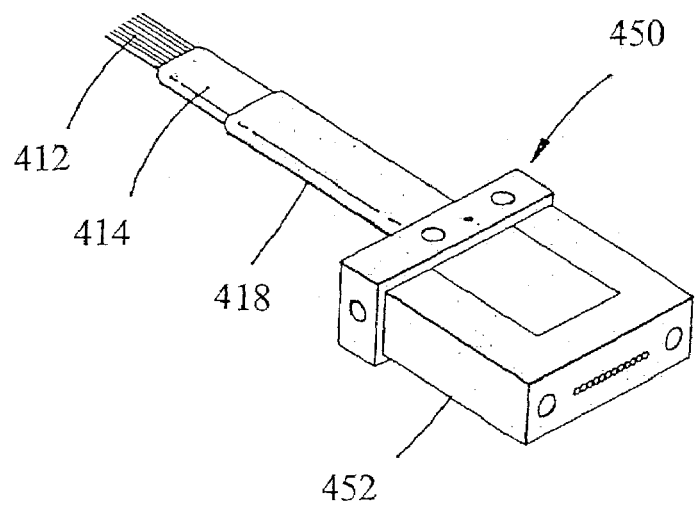
FIG. 45 depicts an exemplary connectorized assembly according to the present invention.

Especially advantageous embodiments of the present invention also include ribbons and interconnect assemblies employing the concepts of U.S. patent application Ser. No. 09/943,996, the disclosure of which is incorporated herein by reference. The '996 patent application is directed to, among other things, selecting optical waveguides having predetermined characteristics for minimizing insertion losses for interconnect assemblies such as ribbons, pigtails, and interconnect cables. FIG. 45 illustrates an exemplary assembly 450 that terminates cable 410 with at least one optical connector 452. In this case, connector 452 is a MTP connector that terminates a plurality of optical waveguides. Of course, other suitable embodiments similar to assembly 450 are possible, such as a plurality of connectors on a single end, optical waveguides being a portion of an optical backplane, or a zipcord having connectors to name a few.

Figure 46:
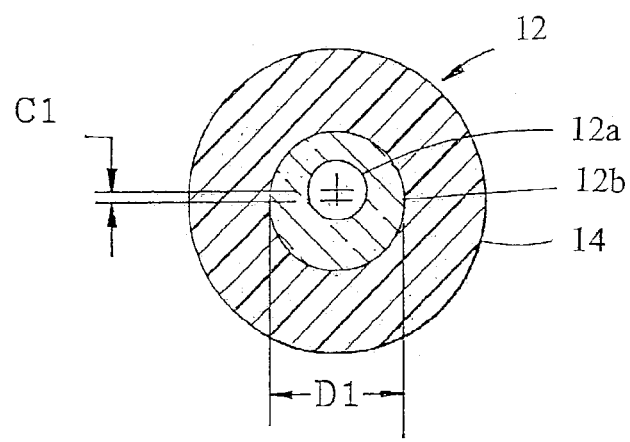
FIG. 46 depicts characteristics for selecting optical waveguides for use in assemblies according to the present invention.

In this case, assembly 450 has at least one optical waveguide 12 selected using a predetermined range of optical waveguide characteristics for improving the insertion loss of assembly 450. As shown in FIG. 46, optical waveguide 12 is selected from a general population of optical fibers so as to have one or more predetermined values of a cladding outer diameter D1, a core 12a to a cladding 12b concentricity C1, and/or a mode-field diameter. For example, optical fiber 12 is selected so that cladding outer diameter D1 is about 125.0 µm±0.1 µm, the core 12a to cladding 12b concentricity C1 is about 0.2 µm or less, and the mode-field diameter D2 is about 9.2 µm±0.2 µm at an optical source wavelength of 1310 nm. Likewise, insertion loss can be improved by selecting connectors and/or other components having a predetermined range of geometric tolerances and/or performance characteristics. Additionally, optical fibers 12 may be selected with other predetermined ranges of cladding outer diameter D1, core to cladding concentricity C1, and/or mode-field diameter, thereby reducing insertion losses.

In another advantageous embodiment, optical waveguides are selected and processed to have a low skew in optical propagation time for the signal as discussed in U.S. Pat. No. 5,768,460, the disclosure of which is incorporated herein by reference. For instance, in one embodiment the skew in optical propagation time for signals transmitted over the optical waveguides of the ribbon assembly is less than 1.0 psec/m.

Figure 47:
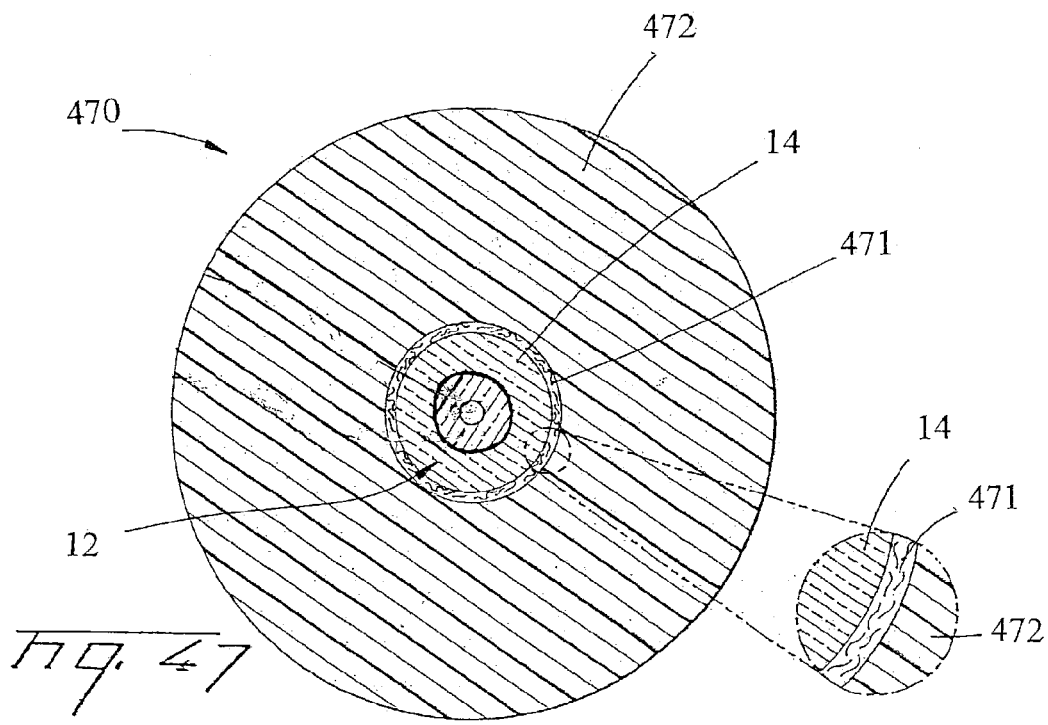
FIGS. 47–49 illustrate exemplary buffered optical waveguides according to the present invention.

Other configurations and/or manufacturing steps can cause delta attenuation of optical waveguide 12. By way of example, buffering optical waveguides can cause increases in delta attenuation. FIG. 47 depicts a buffered optical waveguide assembly 470 according to the present invention includes at least one optical waveguide 12 and a buffer layer 472. Assembly 470 is advantageous for use as a portion of a larger assembly such as an interconnect assembly, a single-waveguide cable, or a multiple-waveguide cable. Buffer layer 472 is formed from a suitable material such as a polymer. For instance, buffer layer 472 is formed from a PVC under the tradename GW 2052 available from AlphaGary Corporation of Leominster, Mass.; however, other suitable buffer materials are possible. A typical outer diameter for buffer layer 472 is 900 microns; however, any suitable outer diameter or other shape/geometry can be used.

Assembly 470 may also include an interfacial layer 471 between optical waveguide 12 and buffer layer 472 such as disposed over coating system 14. Interfacial layer 471 (not visible) acts as a slip layer for aiding in stripping of the buffer layer 472 from assembly 470. For instance, interfacial layer 471 can include a non-reactive solid lubricant in particulate form dispersed in a cross-linked film-forming binder as discussed in U.S. Pat. No. 5,408,564, the disclosure of which is incorporated herein by reference. Another advantageous embodiment is discussed in U.S. patent application Pub. No. 2002/0102078, the disclosure of which is incorporated herein by reference. In particular, the disclosure discusses a release layer 471 generally surrounding the protective layer and at least partially bonding thereto, which includes an acrylate with oligomers, monomers, and a reactive release substance distributed within a matrix. The reactive release layer preferably includes silicone, more particularly, the release layer may be selected from the group consisting of methyl and phenyl silicones. Moreover, the matrix can be mechanically or chemically bonded to the protective layer so that stripping the buffer layer essentially does not remove the release layer. Additionally, the release layer preferably has a secant modulus of about 20–600 MPa, an elongation to break ratio of preferably less than about 10% and/or a tensile strength of less than about 20 MPa. Of course, other suitable materials can be used as an interfacial layer for acting as a release layer such as oils or other lubricants applied to the optical waveguide or formulated into the outer coating.

Buffer layer 472 is preferably formed from a polymeric material, but other suitable materials such as elastomeric materials, or UV materials are possible. Additionally, buffer layer 472 can have a low-shrink buffer layer or manufacturing method therefor as discussed in U.S. patent application Ser. No. 10/098,971 filed on Mar. 15, 2002, the disclosure of which is incorporated herein by reference.

Assembly 470 is advantageous because it has a relatively small delta attenuation after buffering. In one experiment, a maximum delta attenuation for a population of multi-mode assemblies 470 was measured at reference wavelengths of 850 nm and 1300 nm for comparison with similar conventional tight-buffered assemblies. Specifically, the tested assemblies 470 included a 50 micron multi-mode optical fiber 12 with an interfacial layer 471 surrounded by a flame-retardant PVC buffer layer 472. Moreover, optical waveguides 12 of tested assembly 470 had coating system 14 with an inner coating B and the outer coating as specified in Table 1.

The tested conventional assemblies had a construction that was similar to assembly 470 so a valid comparison could be made. The maximum delta attenuations for the population were averaged for the respective reference wavelengths. The results are summarized in Table 8. As shown, assembly 400 has an average maximum delta attenuation that is about one-half of an average maximum delta attenuation for a conventional assembly at a reference wavelength of 1300 nm. Likewise, assembly 400 had an average maximum delta attenuation that was significantly less than the conventional assembly at a reference wavelength of 850 nm.

TABLE 8

Delta attenuation for manufacturing 50 micron buffered multi-mode optical waveguide

| Assembly Type | Average Maximum Delta Attenuation at 850 nm | Average Maximum Delta Attenuation at 1300 nm |
| --- | --- | --- |
| Conventional | 0.878 | 0.602 |
| Present Invention | 0.510 | 0.310 |

Figure 48:
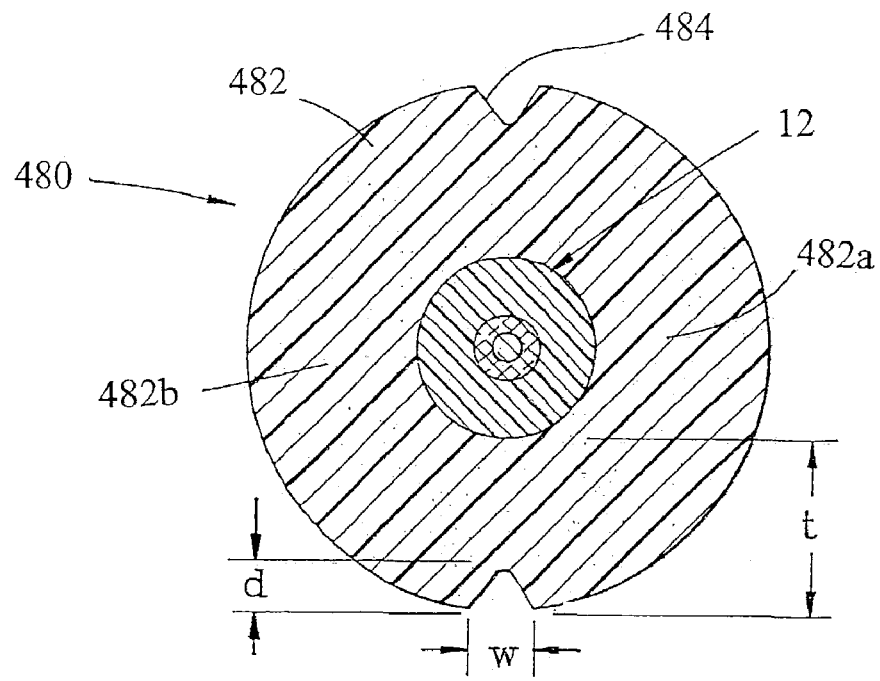

FIG. 48 illustrates assembly 480 another buffered optical waveguide according to the present invention. Assembly 480 includes a peelable buffer layer 482 having at least one preferential tear portion 484 as discussed in U.S. patent application Ser. No. 10/284,485 filed on Oct. 31, 2002, the disclosure of which is incorporated herein by reference. Buffer layer 482 generally surrounds optical waveguide 12 and has at least one preferential tear portion 484 generally formed along a longitudinal axis of the buffer layer. Preferential tear portion 484 allows separation of buffer layer 482 into portions 482a and 482b, thereby allowing access to optical fiber 12. Preferential tear portion 484 can have suitable dimensions of width w, depth d, and/or ratios of width to thickness w/t to tailor the separation force required to separate portions 482a and 482b. In preferred embodiments, the tight buffer layer is formed from a material having an elongation to break of about 300% or less so that the at least one preferential tear portion of the buffer layer is capable of being torn when a predetermined tearing force is applied.

Figure 49:
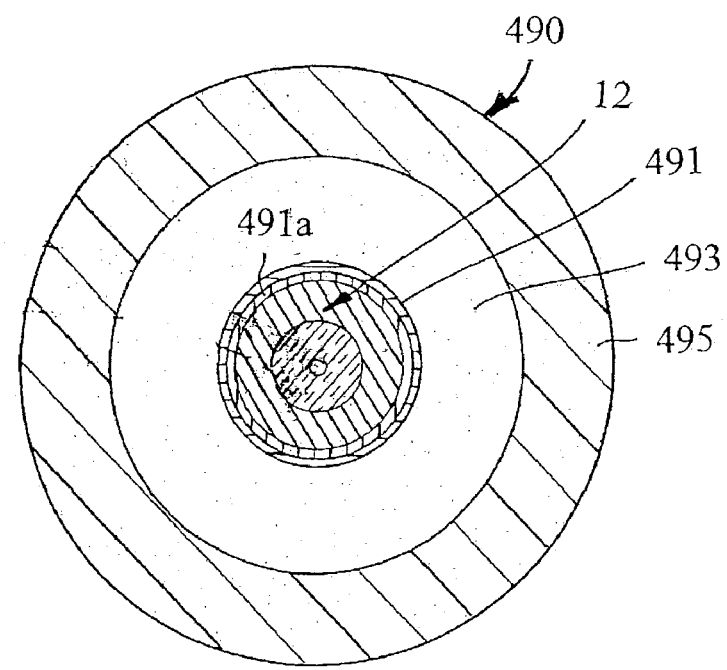

FIG. 49 depicts assembly 490 still another buffered optical waveguide according to the present invention. Assembly 490 has an optical fiber 12 having an ink layer 491a and an interfacial layer 491 such as a lubricant disposed on ink layer 491a. Assembly 490 includes a gap 493 between optical waveguide 12 having a buffer layer 495 as discussed in U.S. Pat. No. 5,917,978, the disclosure of which is incorporated herein by reference.

Figure 50:
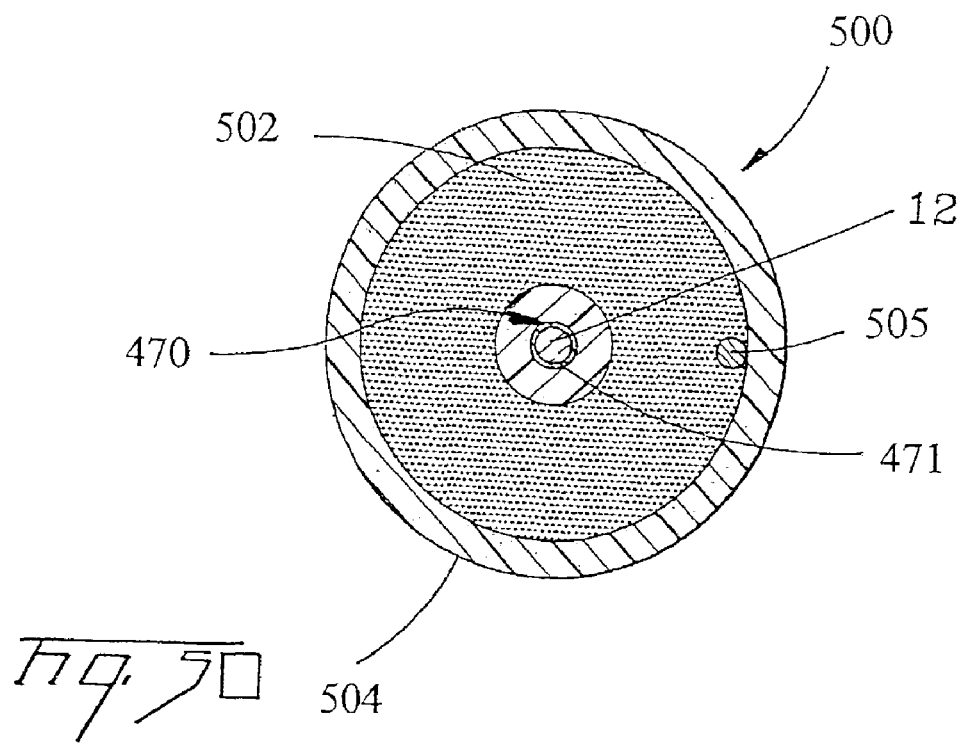
FIGS. 50–51 illustrate exemplary single waveguide cables according to the present invention.

Additionally, the buffered optical waveguide assemblies can be used in single-waveguide cables. FIG. 50 depicts an exemplary single-waveguide cable 500 including assembly 470, filaments 502, and a jacket 504. Other embodiments can use other suitable buffered assemblies. Moreover, other embodiments of cable 500 can include other suitable components such as a ripcord 505 or an interfacial layer (not shown) between buffer layer 472 and jacket 504 for inhibiting the extruded jacket from sticking to buffer layer 472. Interfacial layer can include powders, such as talc, a thin film, a tape, or a water-swellable substance. Furthermore, single-waveguide cables such as cable 500 can form a portion of a larger breakout cable.

Filaments 502 of cable 500 provide tensile strength along with cushioning and covering protection for assembly 470. In other words, filaments cushion the assembly from impact and cover the assembly so that the extruded jacket does not stick to the assembly 400 during manufacture. Filaments 502 preferably include aramid yarns for tensile strength; however, other suitable materials such as fiberglass can be used for providing tensile strength. In other embodiments, filaments 502 include two or more materials such as aramid and polyester. The aramid essentially provides the tensile strength, while both the aramid and polyester provide cushioning and covering protection. Additionally, filaments can include a coating for providing one or more of the following properties: anti-static, anti-abrasion, lubrication, flame-inhibitance, flame-resistance, non-wicking, smoke-inhibitance, water-blocking and/or water-swelling.

Figure 51:
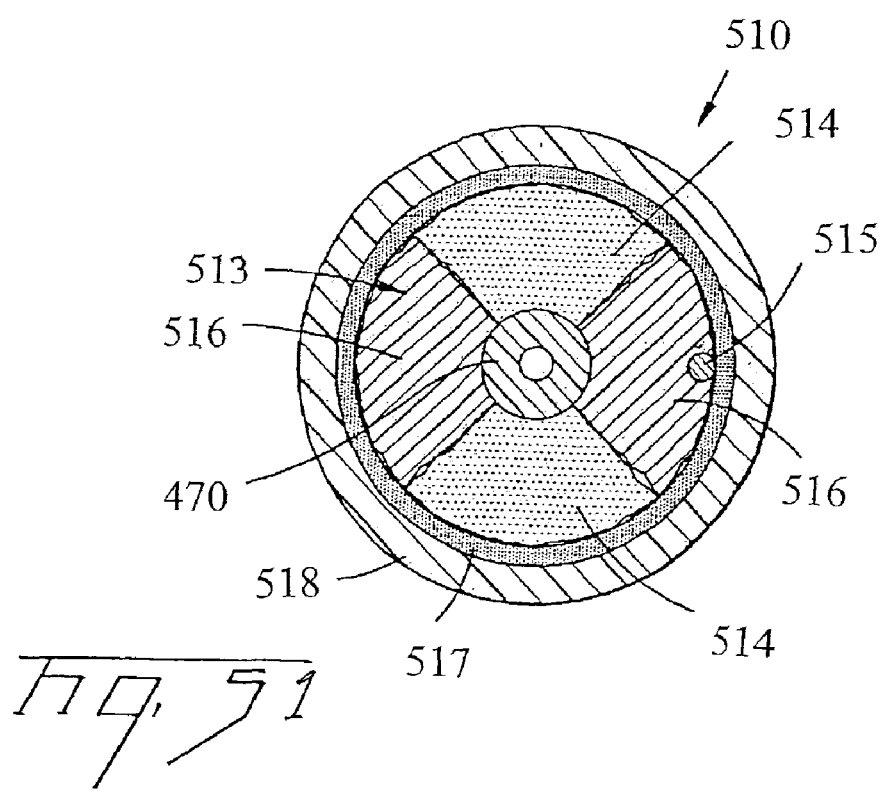

FIG. 51 depicts cable 510 having assembly 470 having a layer 513 being formed of at least one stranded ultra-low shrinking filaments or yarns 516 as discussed in U.S. Pat. No. 6,553,167, the disclosure of which is incorporated herein by reference. Cable 510 may also include strength members 514 such as aramid filaments 514 that are suitable for stranding with yarns 516 about assembly 470, a ripcord 515, an interfacial layer 517, and a cable jacket 518. Ultra-low shrinking filaments 516 generally have a linear shrinkage of about 0.2% or less, preferably about 0.1% or less, when heated and held at about 85° C. for about seven days. Ultra-low shrinking filaments 516 can include materials such as nylon, rayon, cotton, polyester, acrylics, acetates, polypropylene, polyethylene, or blends thereof that are further processed, for instance, with an autoclave. Suitable ultra-low shrinking filaments are available from Hickory Yarns of Hickory, N.C. Additionally, ultra-low shrinking filaments may be used in other assemblies or cables of the present invention.

The jacket generally provides environmental protection by surrounding filaments 502 and assembly 400. Jacket 504 is preferably a polymer material and more preferably a PVC such as available under the tradename 16881 from NAP of Madison, Miss., a division of the Georgia Gulf Co. However, other polymers such as a flame-retardant polyethylene or low smoke zero halogen material can be used. The flame resistance of the cable may be specified, for example, by UL standard 1666 for riser-rated cables or by UL standard 910 for plenum-rated cables. In tested embodiments, jacket 504 had an outer diameter of about 2.9 mm; however, other sizes of diameters may be used. Other embodiments of cable 500 can use a low-shrink cable jacket and/or a manufacturing method therefor as discussed in U.S. patent application Ser. No. 10/038,073 filed on Jan. 4, 2002, the disclosure of which is incorporated herein by reference.

Single-waveguide cables (SWC) were also tested for temperature cycling performance. In this case, a special temperature cycling test was performed on a small population of 50 micron multi-mode cables 500 for comparison with a similar conventional cable at reference wavelengths of 850 and 1300 nm. The special temperature cycling test was similar for both cables and was useful for examining the delta attenuation at a 0° C. stage. The delta attenuation (dB/km) for the SWC at a second 0° C. stage are summarized in Table 9. As shown, the delta attenuation due to temperature cycling shows significantly reduced values for the present invention at the second 0° C. stage.

TABLE 9

Temperature cycling test results at the second 0° C. stage

| Cable Type | Average Maximum Delta Attenuation at 850 nm | Average Maximum Delta Attenuation at 1300 nm |
| --- | --- | --- |
| Conventional | 0.126 | 0.121 |
| Multi-mode SWC | 0.080 | 0.088 |

Additionally, temperature cycling was performed using indoor cable standard ICEA-596-2001 to test performance of SWC at −20° C. Specifically, temperature cycling for three 50 micron-multi-mode riser-rated SWCs having an OD of 2.9 mm was performed at a reference wavelength of 1300 nm. The riser-rated SWCs tested used a PVC buffer material available from AlphaGary under the tradename 2052 and a PVC jacket available from NAP under the tradename 16881. Moreover, optical waveguides 12 of tested assembly had coating system 14 with an inner coating B and the outer coating as specified in Table 1. The average maximum delta attenuation (dB/km) at −20° C. stages for the SWCs using ICEA-596-2001 are summarized in Table 10.

TABLE 10

ICEA-596-2001 temperature cycling test results for a riser rated SWC

| Cable Type | $1^{st}$ −20° C. at 1300 nm | $2^{nd}$ −20° C. at 1300 nm |
| --- | --- | --- |
| 2.9 mm Riser SWC | 0.010 | 0.177 |

Figure 52:
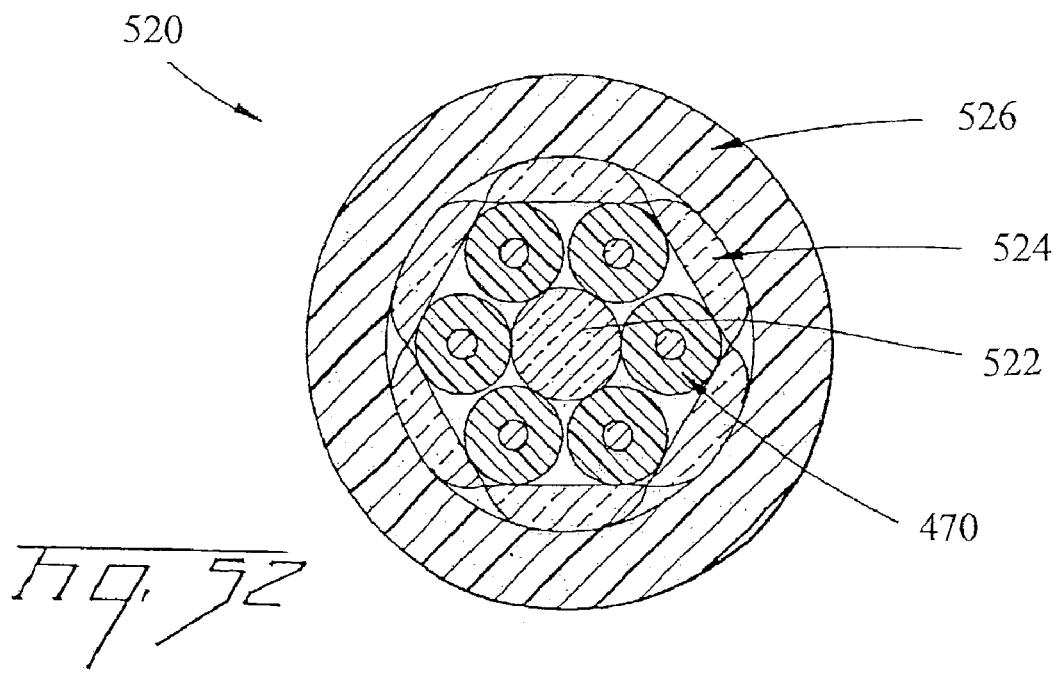
FIGS. 52–57 depict exemplary multiple waveguide cables according to the present invention.

Additionally, buffered optical waveguide assemblies according to the present invention can be used in larger assemblies having multiple optical waveguides. For instance, FIG. 52 depicts an exemplary cable 520 that includes a plurality of assemblies 470 stranded about a central member 522, filaments 524, and a jacket 526. Central member 522 may be any suitable component such as a plurality of filaments, a GRP, or the like. Additionally, embodiments such as a three-position cable may omit a central member (not illustrated). Filaments 524 are preferably a layer of aramid stranded about assemblies 470, but other suitable filament may be used such as fiberglass. Filaments may also include a water-swellable component suitable for blocking water migration. In other embodiments, two or more different types of filaments are stranded about assemblies 470 such as polyester and aramid. In other embodiments, filaments can be a yarn having a coating system as discussed in U.S. Pat. No. 6,389,204, the disclosure of which is incorporated herein by reference. Specifically, the yarn coating system has a percentage by weight, based on the dry weight of the yarn, of about 2.0% or less. In still further embodiments, filaments may be replaced with a tape or layer that holds the assembly together and inhibits the extruded jacket from sticking to the buffer layer of the stranded assemblies. Additionally, the tape or layer may provide water-blocking features. Likewise, the buffer layer and jacket of cable 520 may be suitable materials selected for meeting cable requirements.

Figure 53:
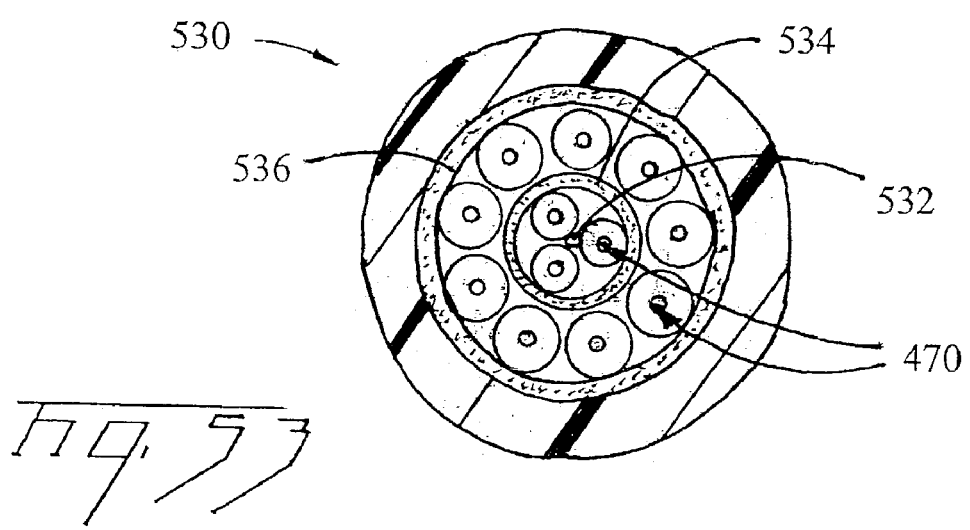
Figure 54:
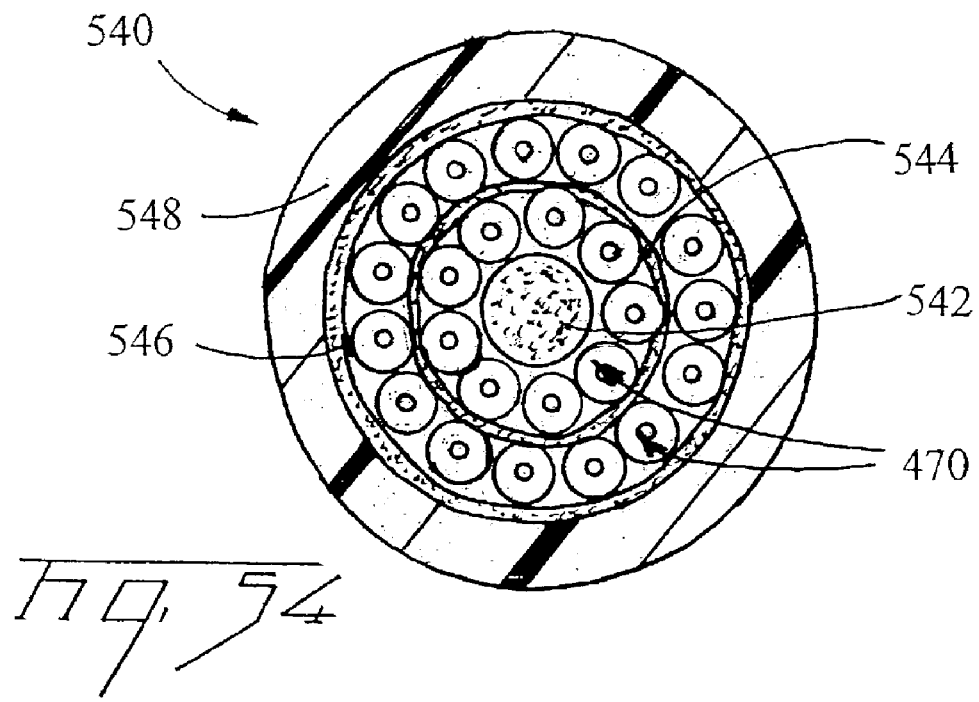

Although, cable 520 depicts six assemblies 470 stranded in one layer, other embodiments can include other numbers of assemblies in one or more layers. For example, FIGS. 53 and 54 respectively illustrate a twelve and a twenty-four position cables 530 and 540 having the assemblies stranded in two layers. Cable 530 includes twelve assemblies 470 stranded in two layers with a cable jacket 538. Specifically, three assemblies 470 are stranded about central member 532 in a first layer and are secured by a first stranded filament layer 534, thereafter nine assemblies 470 are stranded about the first layer and secured using a second stranded filament layer 536. Likewise, cable 540 has a similar construction. Other embodiments according to the present invention can have other suitable configurations such as 36, 72, or more positions. Besides suitable assemblies, a position may also be occupied by a filler or other element such as electrical component. Moreover, the positions of the cable can have single-mode, multi-mode or other suitable assemblies therein.

Cable 540 was tested measuring delta attenuation for temperature cycling and tensile performance using ICEA-596-2001, along with cable manufacturing delta attentuation. Specifically, cable 540 had nine assemblies 470 stranded about a central member 542 formed from four 2450 denier Kevlar® filaments. Buffer layer 472 of assemblies 470 was made from a PVC available from AlphaGary under the tradename 2052. The first layer of assemblies 470 was secured by a first stranded filament layer 544 formed from eight 1420 denier Kevlar® filaments. Fifteen assemblies 470 of the second layer are stranded about the first layer and secured using a second stranded filament layer 546 formed from eighteen 1420 denier Kevlar® filaments. Additionally, the cable core is surround by a jacket 548 made from a PVC available from NAP under the tradename 16881. The maximum delta attenuation (dB/km) at −20° C. stages for cable 540 at a reference wavelength of 1300 nm are summarized in Table 11.

TABLE 11

ICEA-596-2001 temperature cycling test results for 24 position multi-mode cable

| Cable Type | 1st −20° C. at 1300 nm | 2nd −20° C. at 1300 nm |
|---|---|---|
| Cable 540 | 0.165 | 0.362 |

The ICEA-596-2001 tensile test has two mutually exclusive requirements for qualifying a cable, namely, a tensile loading requirement and an optical fiber strain requirement. The tensile loading requirement applies a rated installation load for thirty minutes and measures the fiber strain at the end of thirty minutes with the load applied. Thereafter, the load is reduced to 30% of the rated installation loading, called the residual load, and held for ten minutes at which time the delta attenuation and fiber strain is measured with the load applied. The fiber strain requirement states that the axial fiber strain must be less than, or equal, to 20% of the fiber proof at the rated installation load and less than, or equal, to 20% of the fiber proof level at the residual load. The attenuation requirement states that the delta attenuation at residual load must be less than or equal to 0.60 dB/km. Table 12 summarizes the average delta attenuation (dB/km) at a reference wavelength of 1300 nm for both the rated installation load and the residual load along with the optical fiber strain at both loads. As shown, tested cable 540 passed the ICEA-596-2001 tensile test for both the tensile loading requirement and the optical fiber strain requirement. The delta attenuation value at the rated installation load are given for reference.

TABLE 12

ICEA-596-2001 tensile test results at 1300 nm for 24 position multi-mode cable

| Assembly | Ave. Delta Attenuation at Rated Installation Load | Ave. Delta Attenuation at Residual Load | Fiber Strain at Rated Installation Load | Fiber Strain at Residual Load |
|---|---|---|---|---|
| Cable 540 | 0.08 | 0.05 | 0.34% | 0.15% |

Furthermore, the average and maximum cabling attenuations associated with manufacturing tested cable 540 according to the present invention were examined at a reference wavelength of 1300 nm. Respectively, the average and maximum cabling attenuations for manufacturing were 0.494 dB/km and 0.549 dB/km. An average cabling attenuation associated with manufacturing similar conventional cables was taken from production data for comparison purposes. The average delta attenuation for the conventional 24 position cable is 0.57 dB/km.

Additionally, 24 position cables 540 were subjected to GR-409 mechanical testing for determining delta attenuation on multi-mode designs. Specifically, tensile testing according to GR-409 was performed on cable 540. The GR-409 specification requires that all of the optical waveguides of the cable have a maximum delta attenuation that is less than 0.4 dB/km. In total ten cables were tested, five were conventional cables and five were according to the present invention. The delta attenuation (dB/km) data for the GR-409 tensile test at 1300 nm is summarized in Table 13.

TABLE 13

Maximum delta attenuation results for GR-409 tensile testing of 24 position cables at 1300 nm

| Type | Cable 1 | Cable 2 | Cable 3 | Cable 4 | Cable 5 | Average |
|---|---|---|---|---|---|---|
| Conventional | 0.492 | 0.282 | 0.382 | 0.422 | 0.495 | 0.415 |
| Cable 540 | 0.155 | 0.133 | 0.105 | 0.082 | 0.253 | 0.146 |

As shown, the average maximum delta attenuation for cables 540 is about one-third of the maximum value for the conventional cables tested. More importantly, conventional cables 1, 4, and 5 failed the GR-409 requirement for maximum attenuation. On the other hand, all of tested cables 540 passed this GR-409 requirement. Thus, cable 540 has superior performance over the conventional cable with the multi-mode assemblies.

Figure 55:
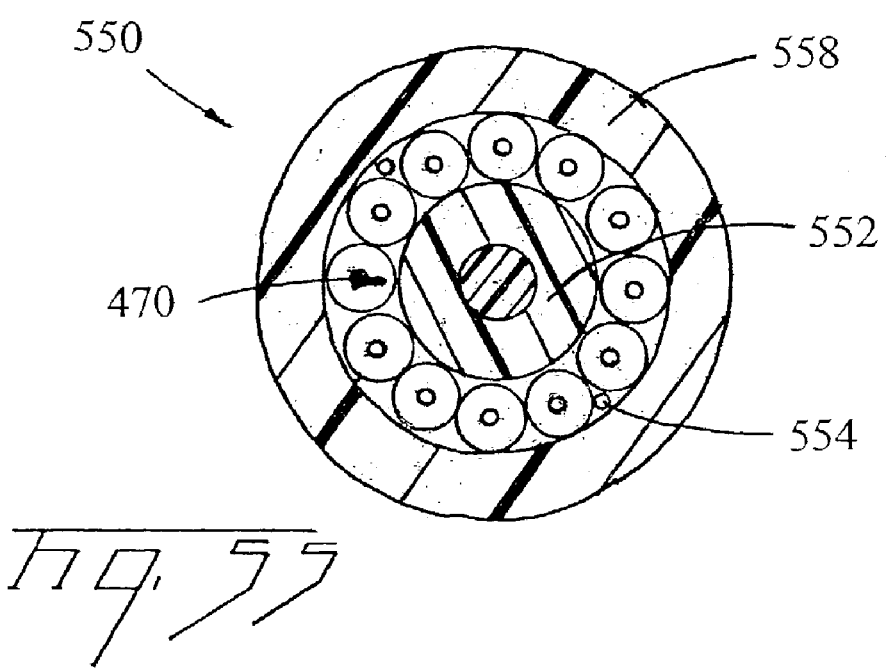

Stranded cables using assemblies such as 470 can have other configurations that are suitable for both indoor and outdoor applications. FIG. 55 depicts a cable 550 having a central member 552, a plurality of assemblies 470, a pair of filaments 554, and a jacket 558. In this cable, twelve assemblies are stranded in a single layer about central strength member 552, which is a 1.6 mm GRP that is overcoated to about 2.7 mm with a polymer. Filaments 554 are used for securing the assembly before jacket 558 is extruded thereover. Moreover, filaments 554 may include a water-swellable component for blocking the migration of water along the cable.

Figure 56:
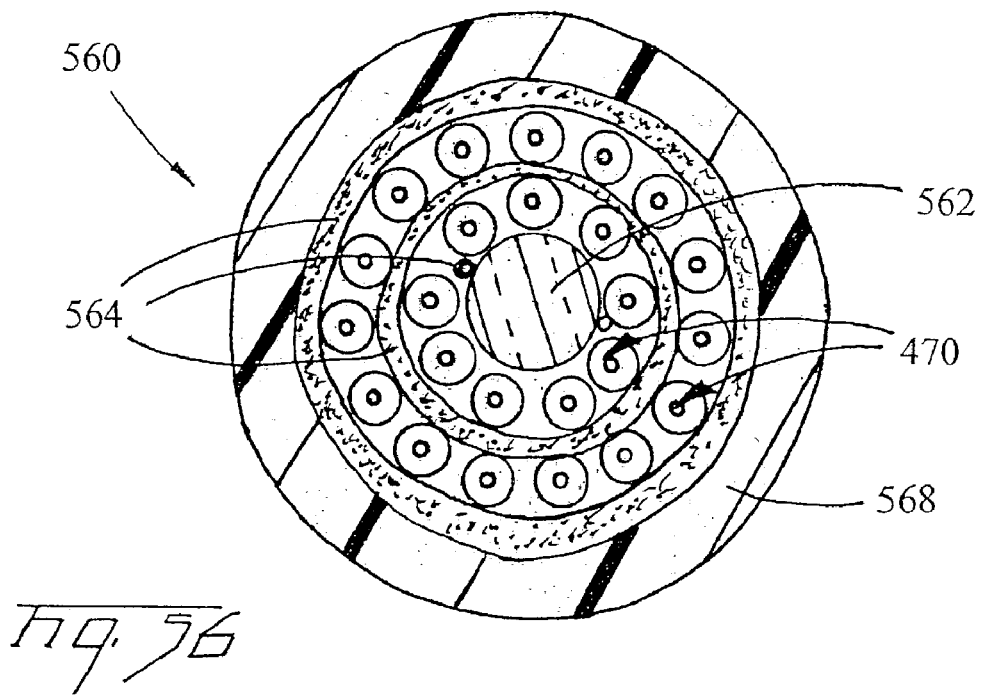

Of course, dual-layer configurations are possible and generally speaking are more difficult to qualify in performance tests. FIG. 56 depicts a dual-layer cable 560 having twenty-four assemblies 470 stranded in a fifteen around nine configuration. Specifically, a GRP central strength member 562 has two 3220 dtex water-swellable filaments 564 stranded therearound, thereby blocking water migration along the center of the cable. Next, nine PVC assemblies 470 are stranded about central member 562 and are secured by twelve 3220 dtex water-swellable aramid filaments 564, thereby forming a first layer. A second layer of fifteen PVC assemblies 470 are stranded about the first layer and secured by eighteen 3220 dtex water-swellable aramid filaments 564. Thereafter, a jacket 568 is extruded therearound. Additionally, stranded cables can include other components such as armor, tapes, ripcords, and other suitable components.

Cables 550 and 560 in 50 micron multi-mode configurations were tested according to a modified ICEA-696-2001 temperature cycling test and compared with similar conventional cables. The standard ICEA-696-2001 temperature cycling test requires two −40° C. to 70° C. cycles. In order to pass the ICEA-596-2001 temperature cycling test, the cable must have a maximum delta attenuation of 0.600 dB/km or less. In the past, qualifying conventional cables with this specification was difficult. Moreover, the specification was extremely difficult, if not impossible, with 50 micron multi-mode dual-layer cable configurations.

The modified ICEA-696 temperature test included two −20° C. cycles at the beginning of the test for determining performance at −20° C., which were followed by standard ICEA-596 temperature cycling test. The modified ICEA-696 temperature test is considered a more severe temperature cycling test since the additional −20° C. temperature cycles subject the cable to additional stress levels. A single layer 12-position cable was tested in both plenum and riser configurations and the dual-layer cable was tested in a plenum configuration. Tables 14 and 15 respectively summarize the maximum and average delta attenuation (dB/km) results for the modified ICEA-696 test at a reference wavelength of 1300 nm for a plenum and riser-rated cables along with corresponding conventional cables. The plenum-rated cables tested are denoted with a P, and used a PVDF material for the jacket available from Dyneon under the tradename 31008-003. The riser-rated cables are denoted with a R and used a PVC material available from AlphaGary under the tradename GW 2371.

TABLE 14

Maximum delta attenuation for a modified ICEA-696-2001 test at 1300 nm for plenum and riser-rated 50 micron multi-mode cables

| Assembly | 1st −20° C. | 2nd −20° C. | 1st −40° C. | 2nd −40° C. |
|---|---|---|---|---|
| Cable 550 P | 0.181 | 0.005 | 0.158 | 0.162 |
| Conventional 12-fiber P | 0.345 | −0.058 | 1.283 | 1.299 |
| Cable 550 R | 0.083 | 0.100 | 0.093 | 0.120 |
| Conventional 12-fiber R | 0.196 | 0.250 | 0.718 | 0.733 |
| Cable 560 P | 0.327 | 0.002 | 0.526 | 0.566 |
| Conventional 24-fiber P | 0.393 | −0.090 | 2.828 | 2.752 |

TABLE 15

Average delta attenuation for a modified ICEA-696-2001 test at 1300 nm for plenum and riser-rated 50 micron multi-mode cables

| Assembly | 1st −20° C. | 2nd −20° C. | 1st −40° C. | 2nd −40° C. |
|---|---|---|---|---|
| Cable 550 P | 0.082 | 0.002 | 0.115 | 0.117 |
| Conventional 12-fiber P | 0.198 | −0.072 | 0.790 | 0.792 |
| Cable 550 R | 0.051 | 0.070 | 0.060 | 0.081 |
| Conventional 12-fiber R | 0.128 | 0.173 | 0.495 | 0.529 |
| Cable 560 P | 0.108 | −0.024 | 0.302 | 0.307 |
| Conventional 24-fiber P | 0.241 | −0.147 | 1.389 | 1.371 |

As shown in Tables 13 and 14, the conventional 24-fiber dual-layer plenum configuration had elevated levels of attenuation for the modified ICEA-696 temperature test. On the other hand, the tested cable 560 P met the requirements of the ICEA-696-2001 temperature test since the maximum delta attenuation was less than 0.60 dB/km.

Cables 550 and 560 in 50 micron multi-mode configurations were also tested according to the respective ICEA-696-2001 tensile tests and compared with similar conventional cables. The ICEA-696-2001 tensile test requires applying a rated installation load and measuring the delta attenuation and fiber strain. The rated installation load is held for one hour and then the fiber strain is measured with the load applied. In this case, the delta attenuation was also measured at the rated installation load to gauge the difference in optical performance between the cables at equivalent strain values. Thereafter, the load is reduced to 30% of the rated installation loading, called the residual load, and held for ten minutes at which time the delta attenuation and fiber strain is measured with the load applied. Finally, the load is removed and the cable is allowed to relax for five minutes before taking the final delta attenuation measurement. In order to pass the ICEA-696-2001 tensile test, the multi-mode cable must have a maximum delta attenuation of 0.60 dB/km or less at residual load and after removal of the load. Like the temperature cycling test, a single layer 12-position cable was tested in both plenum and riser configurations and the dual-layer cable was tested in a plenum configuration for this tensile test. Table 16 summarizes the maximum delta attenuation (dB/km) results for the ICEA-696 tensile test at a reference wavelength of 1300 nm for a plenum and riser-rated cables along with corresponding conventional cables. Like before, the plenum and riser configurations are respectively noted by P and R in the Tables.

TABLE 16

Maximum delta attenuation for ICEA-696-2001 tensile test at 1300 nm for plenum and riser-rated 50 micron multi-mode cables

| Assembly | Rated Installation Load | 1 Hour hold at Rated Installation Load | Residual Load | Relax |
|---|---|---|---|---|
| Cable 550 P | 0.09 | 0.10 | 0.06 | 0.04 |
| Conventional 12-fiber P | 0.31 | 0.32 | 0.17 | 0.01 |
| Cable 550 R | 0.13 | 0.08 | 0.06 | 0.01 |
| Conventional 12-fiber R | 0.31 | 0.19 | 0.16 | 0.05 |
| Cable 560 P | 0.29 | 0.31 | 0.16 | 0.04 |
| Conventional 24-fiber P | 0.59 | 0.62 | 0.16 | 0.07 |

As shown in Table 16, the conventional cables had elevated levels of delta attenuation at the 1-hour hold at the rated installation load. On the other hand, the tested cables according to the present invention met the requirements of the ICEA-696-2001 tensile test since the maximum delta attenuation was less than 0.60 dB/km. Moreover, the cables according to the present invention had significant reduction of delta attenuation compared with the conventional cables at the 1-hour hold measurement.

Figure 57:
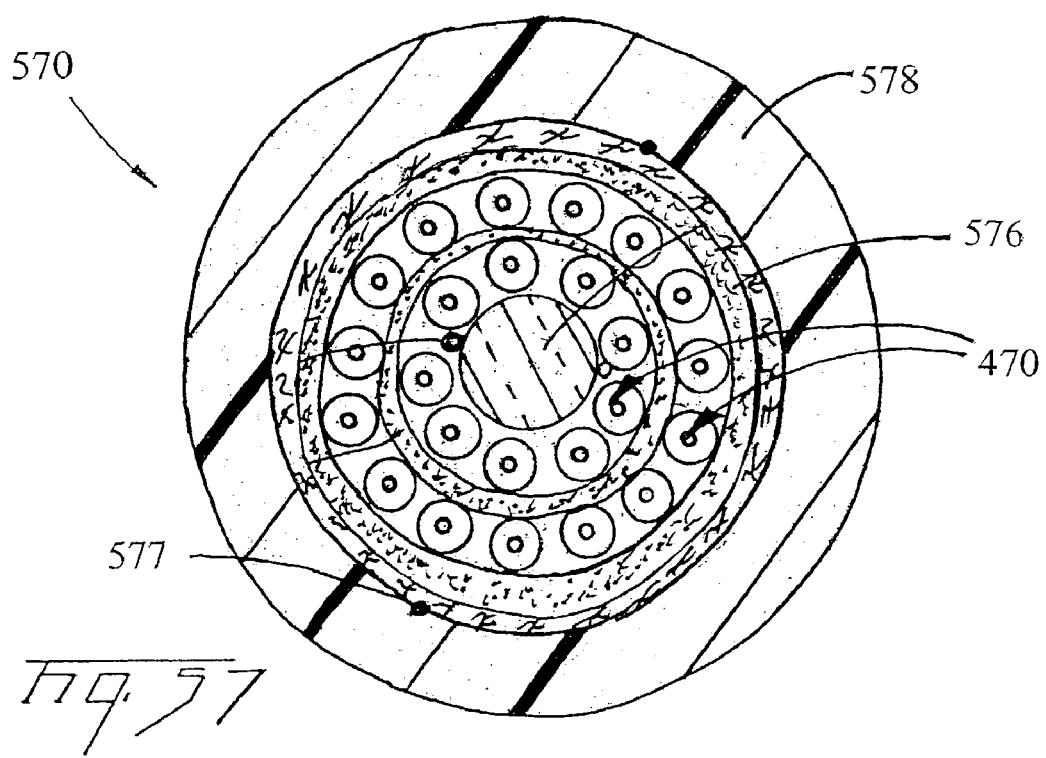

Additionally, the concepts of the present invention may be used in other stranded cable configurations. FIG. 57 depicts, cable 570 which is similar to cable 560, except that the outer layer of filaments in cable 560 is replaced with a dry insert 576 as discussed previously herein. Dry insert is secured by a binder 577 and disposed within a jacket 578.

Figure 58:
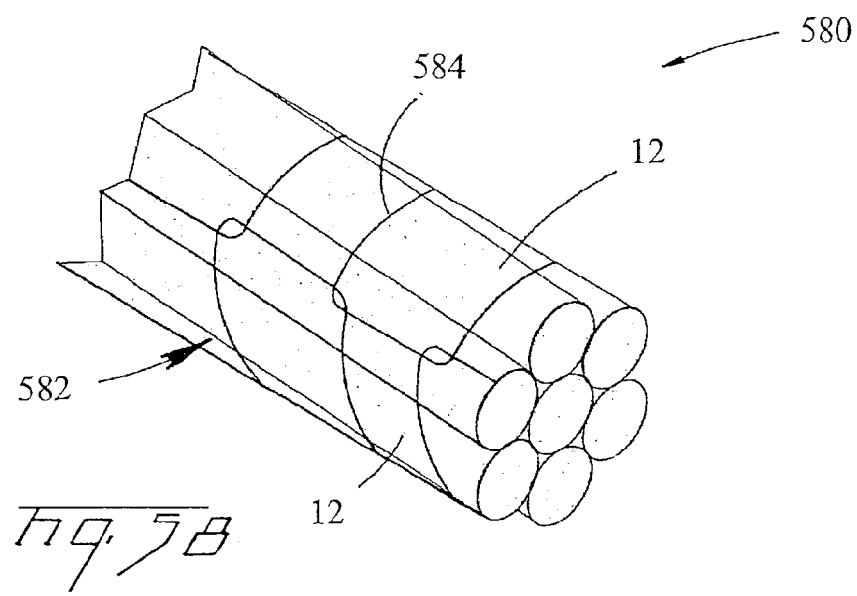
FIGS. 58 and 59 depict exemplary bundled optical waveguide assemblies according to the present invention.

Other embodiments of the present invention can package optical waveguide 12 in other ways. For instance, FIG. 58 depicts assembly 580 having a plurality of optical waveguides 12 in a bundle 582 secured by at least one thread 584. Thread 584 may be an air entangled, textured, continuous multi-filament thread as disclosed in U.S. patent application Pub. No. 2002/0197030, the disclosure of which is incorporated herein by reference. In this case, a plurality of threads are stitched together for securing bundle 582. Moreover, optical waveguides 12 can be a portion of an assembly like assembly 470, or the optical waveguides may be bare as disclosed in U.S. patent application Pub. 2003/0091307, the disclosure of which is incorporated herein by reference.

Figure 59:
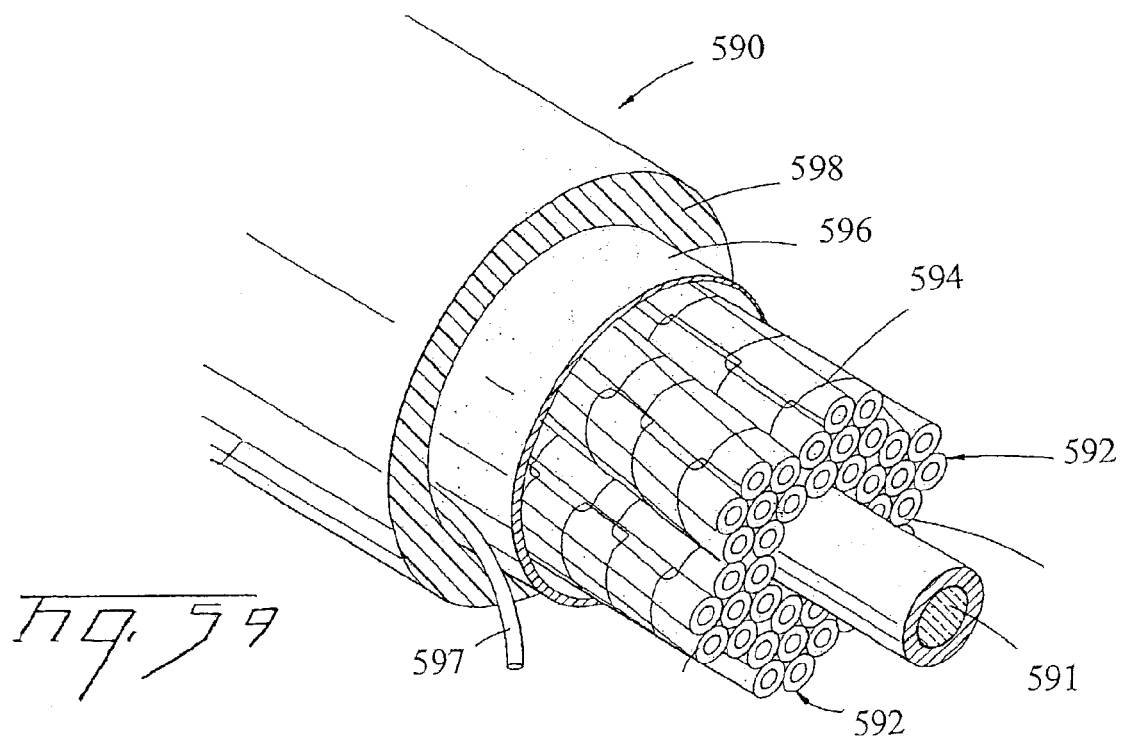

Assemblies like assembly 580 may be used as stranded subunits in larger assemblies. For instance, FIG. 59 depicts a cable 590 having a plurality of assemblies 470 secured by a thread 594, thereby forming a bundle 592. Bundles 592 are stranded about central member 591 with a suitable lay length. A further layer 596 is disposed between a jacket 598 and the stranded bundles 592. Further layer 596 may provide several different fuctions depending on the material selected. Further layer 596 such as a Mylar® tape may provide coverage of bundles 592. Further layer 596 could also be a water-swellable tape for blocking water, filaments for providing tensile strength, or binding threads for securing the stranded bundles 592. In preferred embodiments, the further layer is a water-swellable tape secured by a binder thread that also inhibits the extruded jacket from sticking to the cable core. Optionally, cable 590 may also have a ripcord 597 for removing jacket 598. Additionally, relatively high packing densities are achievable with embodiments similar to cable 590 that use bundles having bare optical waveguides 12.

Figure 60:
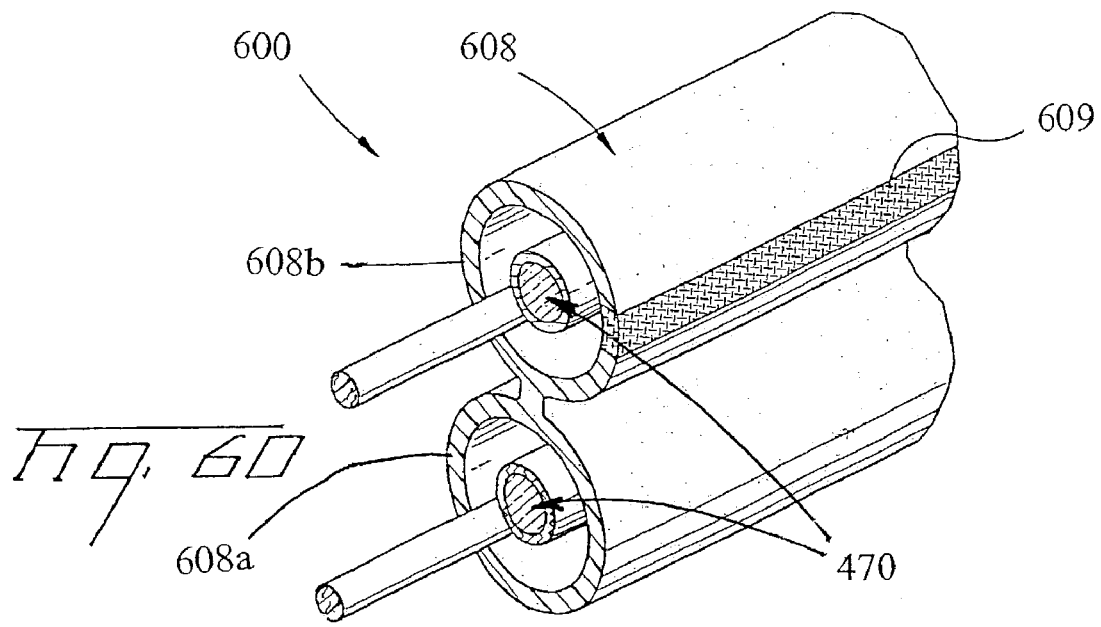
FIGS. 60 and 61 depict exemplary zipcords according to the present invention.

Other assemblies of the present invention were also tested to determine, the delta attenuation due to manufacturing. For instance, FIG. 60 illustrates a zipcord 600 having a plurality of assemblies 470 disposed within individual legs 608a and 608b of a jacket 608. The tested zipcords had 2.8 mm legs with assemblies 470 having 50 micron multi-mode optical waveguides 12 with a coating system 14 including inner coating B and the outer coating as specified in Table 1. Additionally, plenum and riser embodiments were tested. The plenum-rated zipcord is denoted with a P, and used a PVC material for the jacket available from available from AlphaGary under the tradename 6960-J. The riser-rated zipcord is denoted with a R and used a PVC material available from NAP under the tradename 16881. Table 17 summarizes the average cabled attenuation (dB/km) results at a reference wavelength of 1300 nm for a plenum and riser-rated cables along with corresponding conventional cables. As shown, zipcords of the present invention have reduced manufacturing delta attenuation.

TABLE 17

Average cabled attenuation for manufacturing 2.8 mm zipcords

| Assembly Type | Average Cabled Attenuation at 1300 nm |
| --- | --- |
| Conventional Zipcord P | 0.53 |
| 2.8 mm Zipcord P | 0.46 |
| Conventional Zipcord R | 0.51 |
| 2.8 Zipcord R | 0.43 |

Additionally, the zipcords were temperature cycled using standard ICEA-596-2001 to test performance of the zipcord at −20° C. Specifically, temperature cycling zipcords was performed at a reference wavelength of 1300 nm. The maximum delta attenuation (dB/km) at −20° C. stages for the zipcords tested using ICEA-596-2001 are summarized in Table 18.

TABLE 18

ICEA-596-2001 temperature cycling test results for 2.8 mm zipcords

| Cable Type | 1st −20° C. at 1300 nm | 2nd −20° C. at 1300 nm |
| --- | --- | --- |
| 2.8 mm Zipcord P | 0.268 | 0.385 |
| 2.8 mm Zipcord R | 0.014 | 0.070 |

Zipcords according to the present invention can also include embodiments having features as disclosed in U.S. patent application Ser. No. 10/209,485 filed on Jul. 31, 2002, the disclosure of which is incorporated herein by reference. For instance, optical waveguides 12 may have a bandwidth capacity ratio between the first and second optical waveguides of about 2:1 or greater. Additionally, the appropriate leg of the zipcord can have a marking indicia 609 for marking the leg with the high capacity optical waveguide 12.

Figure 61:
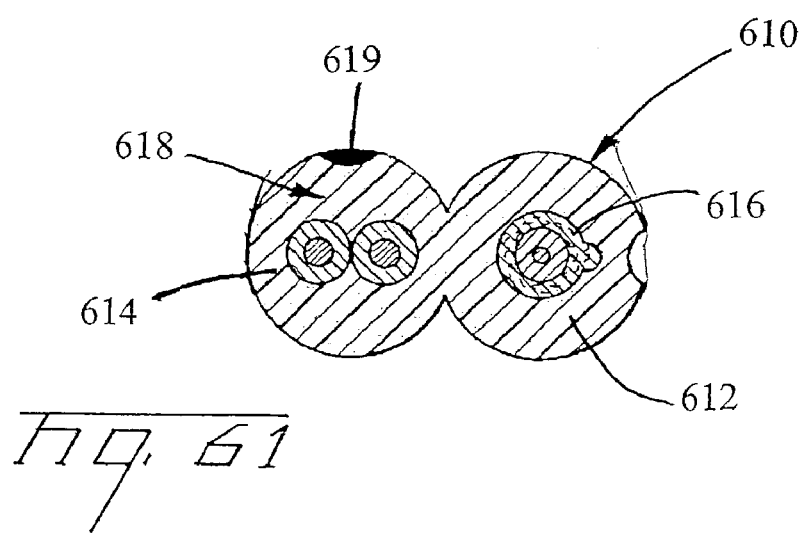

The concepts of the present invention can also be practiced with other suitable assemblies having both one or more electrical components and at least one optical waveguides 12. By way of example, FIG. 61 depicts a zipcord 610 as discussed in U.S. Pat. No. 6,363,192, the disclosure of which is incorporated herein by reference. Specifically, zipcord 610 includes an optical subunit 612 having at least one optical waveguide 12 (not numbered) and an electrical subunit 614 having at least one electrical component (not numbered) in a common jacket 618. Optical waveguide 12 may be buffered or bare and is generally surrounded by strength members or filaments 616 that decouple optical waveguide 12 from common jacket 618. In other embodiments, the strength members or filaments are not required. Electrical subunit 614 can include any suitable electrical component such as a coaxial cable or a twisted pair as shown. Additionally, jacket 618 can have a marking indicia 619 for locating the optical waveguide or the electrical component.

Figure 62:
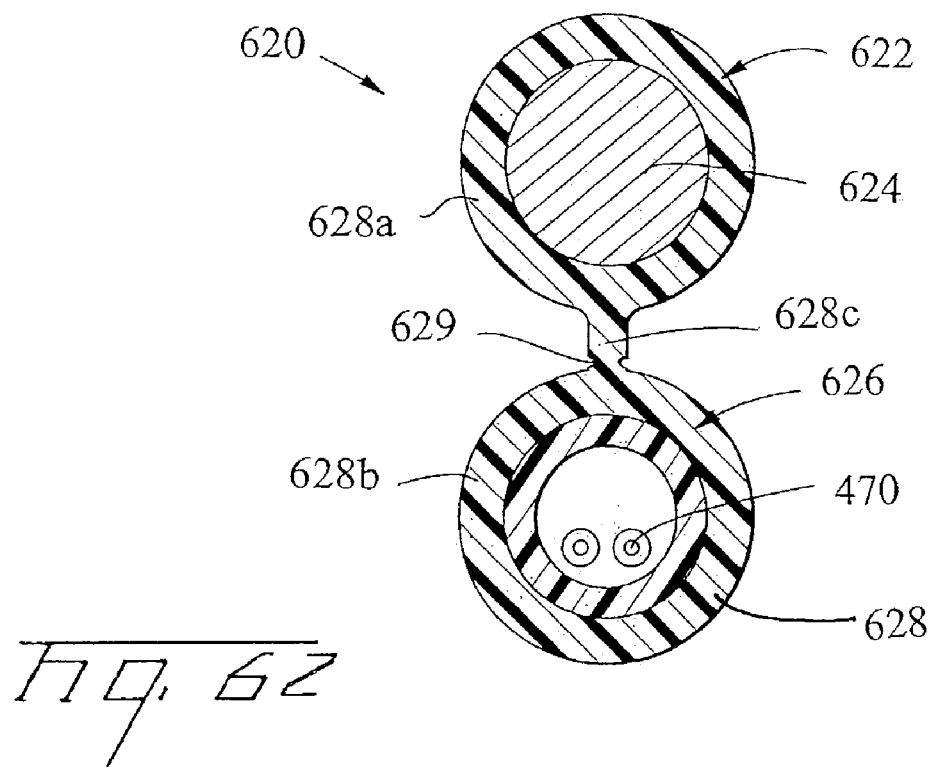

Still other exemplary embodiments according to the present invention are possible. For instance, cable assemblies according to the present invention can also be configured as drop/access cables. FIG. 62 depicts cable 620 having a messenger section 622 having at least one strength member 624, a carrier section 626 having at least one assembly 470, and a jacket 628. Jacket 628 includes a part of a messenger jacket 628a and a part of a carrier jacket 628b connected by a web 628c in a figure eight design. Additionally, web 628c has a preferential tear portion 629.

In one embodiment, strength member 624, or other drop cable strength members, are a solid metallic material such as steel having a relatively low bend energy and good memory shape so that it can be bent into a relatively tight radius so that it may function as a tie down. Thus, the strength member is suitable, if necessary, for; self-attaching to studs, hooks, or the like without the added expense and labor of clamps and/or other hardware, yet it is still suitable for such hardware. The strength member may also be annealed to relieve work hardening. In another embodiment, the strength member has a carbon content between about 0.30 percent to about 0.75 percent. A coating may also be applied to the strength member. For instance, suitable coatings include zinc-based or polymer coatings for environmental/corrosion protection, a copper coating for conductivity; however, other suitable coating(s) may be useful.

Figure 63:
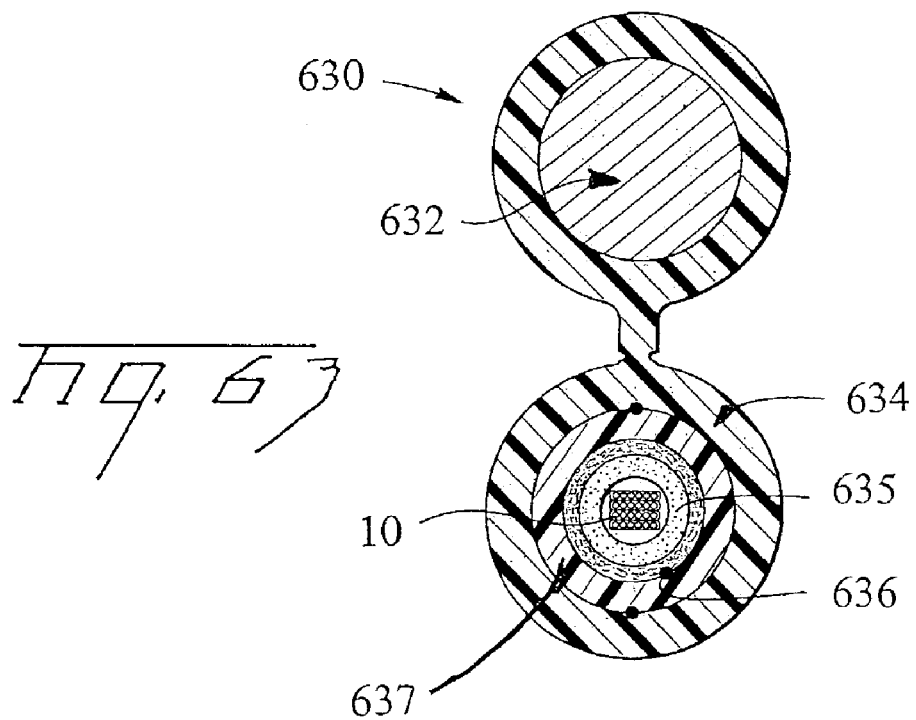
Figure 64:
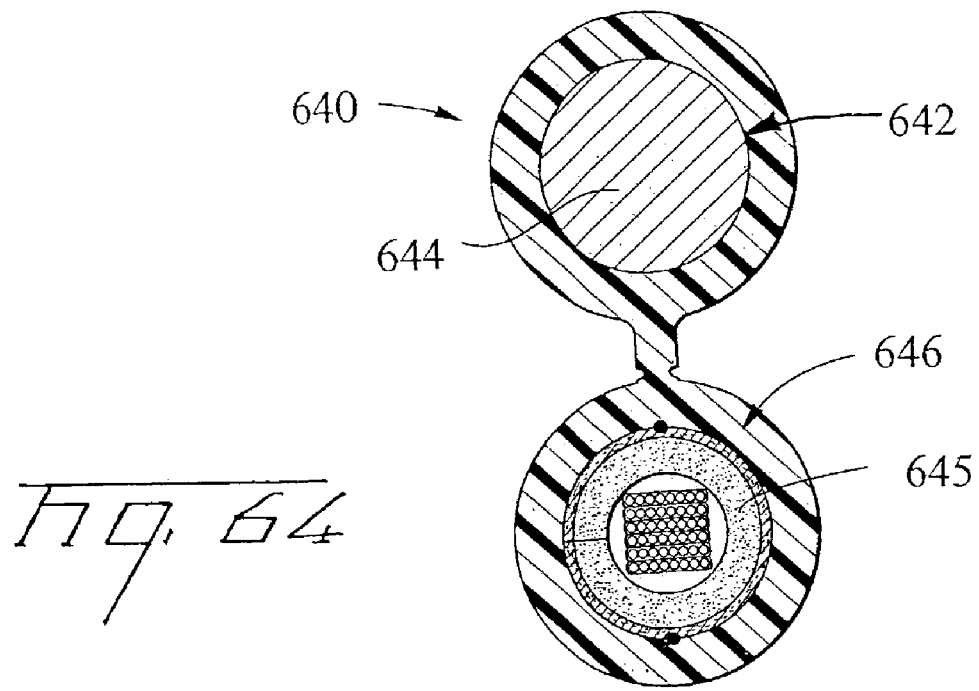
Figure 65:
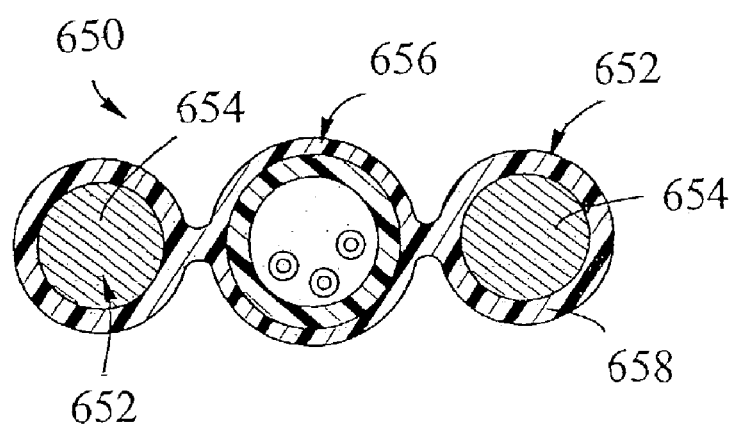
Figure 66:
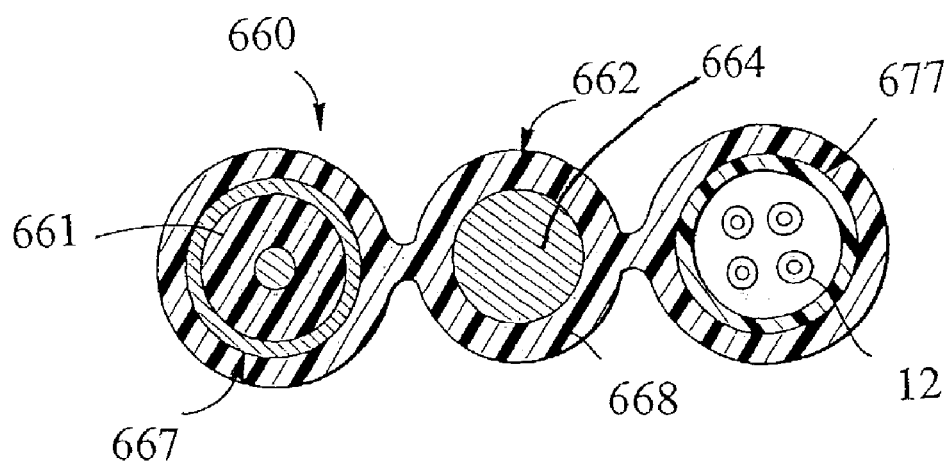
Figure 67:
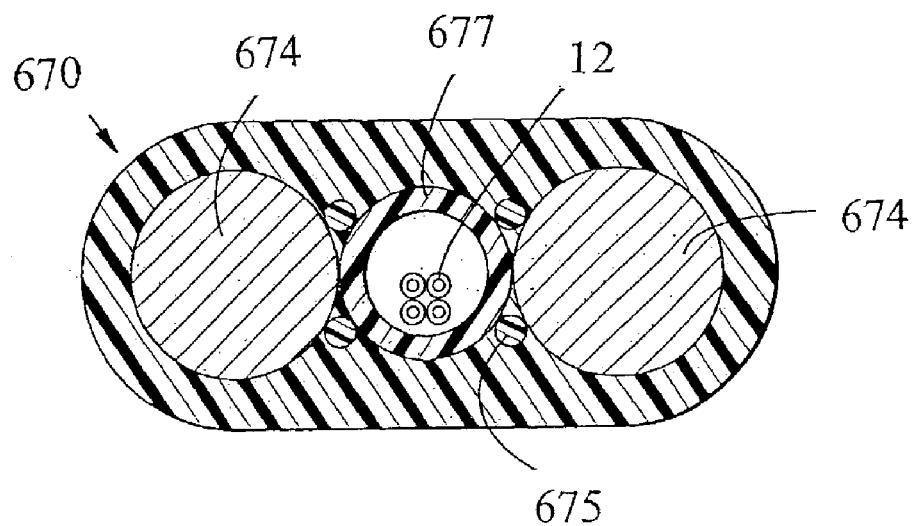
Figure 6B:
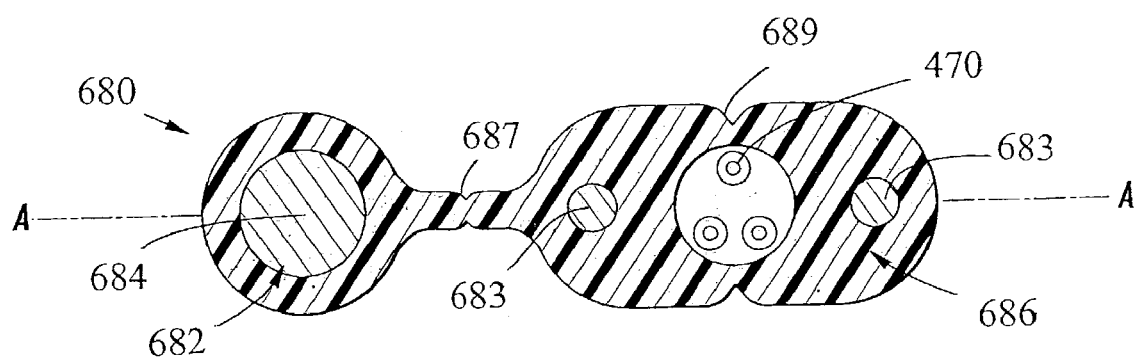

FIG. 63 depicts a figure-eight drop cable 630 that includes a carrier section 634 having a plurality of ribbons 10 disposed within a dry insert 635. Dry insert 635 is secured by a binder 636 and disposed inside a tube 637. The foam layer of dry-insert 635 is preferably a compressible tape that assists in coupling the at least one optical fiber with tube 37. FIG. 64 depicts cable 640 that is a tubeless embodiment according to the present invention. Cable 640 uses a dry insert 645 inside a carrier portion 646 with at least one optical waveguide (not numbered). A messenger section 642 includes a strength member 644. Other configurations of drop cables are also possible. For instance, cables according to the present invention can have more than two sections as shown in FIGS. 65 and 66. FIG. 65 depicts a cable 650 having two messenger sections 652 with strength members 654 disposed at outboard locations and a carrier section 656 therebetween connected together by jacket 658. Carrier section 656 includes at least one optical waveguide (not numbered), but may also include suitable electrical components such as a coaxial cable or a twisted pair. FIG. 66 depicts a cable 660 having a single messenger section 662 with a strength member 664 disposed between two carrier sections 667 and connected together by a jacket 668. At least one of carrier sections 667 includes at least one optical waveguide 12 and the other carrier section may have optical waveguides and/or suitable electrical components. As shown, cable 660 includes a coaxial cable 661 as one of the carrier sections. Still another configuration is shown in FIG. 67. Specifically, FIG. 67 depicts cable 670 having at least one optical waveguide 12 disposed within a tube 677 and at least one strength member 674 and at least one strength component 675. For instance, the use of the rigid strength member 674 and an aramid strength component 675 allows cable to provide the necessary tensile and anti-buckling strength, while still remaining relatively flexible. Cable 670 is generally flat but can have other shapes or configurations as well. FIG. 68 shows still another cable 680 according the present invention. Cable 680 includes at least one strength member 684 in a messenger section 682 and a carrier section 686. In this cable, carrier section is a tubeless configuration having assemblies 470 in a passageway of the jacket. Additionally, cable 680 has a plurality of preferential tear portions. Specifically, the first preferential tear portion 687 is useful for easily and cleanly separating messenger section 682 from carrier section 686. The second preferential tear portion 699 is useful for opening the jacket of the carrier section for accessing assemblies 470 therein. Furthermore, carrier section 686 includes anti-buckling members 683 made from, for example, low-carbon steel having tensile strength. In addition to providing strength, anti-shrink members 87 inhibit the jacket of carrier section 686 from shrinking after being separated from messenger section 682. Additionally, drop cables can have other forms, for example, U.S. Pat. No. 6,256,438, the disclosure of which is incorporated herein by reference, discusses cables having optical waveguides within an armor layer that is surrounded by a jacket and a water-swellable layer is either on the inner surface or outer surface of the armor.

The concepts of the present invention can also be practiced with high-data rate communication systems. For instance, the chromatic dispersion characteristics of the optical waveguides can be controlled in dispersion managed cable system (DMCS) so that the positive and negative chromatic dispersion in the system at least partially offset each other. One way to manage dispersion is by controlling a helix value of a cable as discussed in U.S. patent application Ser. No. 10/035,769 filed on Dec. 26, 2001, the disclosure of which is incorporated herein by reference. Moreover, dispersion managed cable systems can employ cables having controlled helix-plus-EFL (excess fiber length) values as discussed in U.S. patent application Ser. No. 10/107,424, the disclosure of which is incorporated herein by reference.

Furthermore, dispersion managed cable systems can be optically connected optical waveguides 12 that have a mode field differential, i.e., a D+ optical waveguide and a D− optical waveguide, using a bridge fiber within a cable as discussed in U.S. patent application Ser. No. 09/908,183 filed on Jul. 18, 2001, the disclosure of which is incorporated herein by reference. Optical waveguides for dispersion managed cable systems may be allocated according to U.S. patent application Ser. No. 10/328,507 filed on Dec. 24, 2002, the disclosure of which is incorporated herein by reference. The dispersion managed cable systems can also have marking indicia on the buffer tubes or cable jacket so that the craftsman can identify specific optical waveguides. The buffer tubes or cable marking indicia is preferably according to U.S. patent application Ser. No. 09/902,239 filed on Jul. 10, 2001, the disclosure of which is incorporated herein by reference.

Many modifications and other embodiments of the present invention will become apparent to a skilled artisan. For instance, articles, assemblies, and/or cables can include suitable configurations having other components such as strength members, ripcords, water-swellable materials, armor, electrical components, or other cable components. Additionally, the concepts of the present invention are useful with other fiber optic assemblies or cables such as optical backplanes. Therefore, it is to be understood that the invention is not to be limited to the specific embodiments disclosed herein and that modifications and other embodiments may be made within the scope of the appended claims. Although specific terms are employed herein, they are used in a generic and descriptive sense only and not for purposes of limitation. The invention has been described with reference to silica-based optical fibers, but the inventive concepts of the present invention are applicable to other suitable optical waveguides, fiber optic articles, assemblies, and/or cable configurations as well.

That which is claimed:

1. A fiber optic ribbon comprising:
a plurality of optical fibers, at least one of the plurality of optical fibers having a core, a cladding, and a coating system, the coating system including an inner coating and an outer coating, wherein the outer coating is the cured reaction product of an outer curable composition comprising a total oligomer concentration of less than about 15%, by weight, and at least one monomer, wherein the inner coating has a Young's modulus of about 1 MPa or less, and the outer coating has a Young's modulus of at least about 1400 MPa or greater;
a joining material, the joining material connecting the plurality of optical fibers, thereby forming a planar structure.

2. The fiber optic ribbon of claim 1, wherein the ribbon has a maximum delta attenuation of about 0.050 dB/km or less for a ribbon optical performance test at a reference wavelength of 1550 nm.

3. The fiber optic ribbon of claim 1, wherein the ribbon has a maximum delta attenuation of about 0.400 dB/km or less for a ribbon optical performance test at a reference wavelength of 850 nm.

4. The fiber optic ribbon of claim 1, wherein the plurality of optical fibers further include an ink layer.

5. The fiber optic ribbon of claim 1, the joining material being a flame-retardant material.

6. The fiber optic ribbon of claim 1, the at least one of the plurality of optical fibers having a further layer applied to the coating system selected from the group of a release agent, an adhesion promoter, a friction agent, and a anti-static agent.

7. The fiber optic ribbon of claim 1, the at least one of the plurality of optical fibers being selected from the group consisting of a multi-mode optical fiber and a single-mode optical fiber.

8. The fiber optic ribbon of claim 1, the ribbon being a portion of a ribbon stack.

9. The fiber optic ribbon of claim 8, the ribbon stack being at least partially disposed within a tube.

10. The fiber optic ribbon of claim 1, the ribbon being a portion of a dry core.

11. The fiber optic ribbon of claim 10, the ribbon being a portion of a dry core that includes a dry insert.

12. The fiber optic ribbon of claim 1, the ribbon being a portion of a cable.

13. The fiber optic ribbon of claim 12, the cable being flame-retardant.

14. The fiber optic ribbon of claim 1, the ribbon having a sheath thereover.

15. The fiber optic ribbon of claim 1, wherein the ribbon has a maximum delta attenuation of about 0.005 dB/km or less during a ribbon temperature performance test at a reference wavelength of 1550 nm.

16. The fiber optic ribbon of claim 1, the ribbon being a subunit in a larger ribbon assembly.

17. The fiber optic ribbon of claim 1, the ribbon having a preferential tear portion.

18. The fiber optic ribbon of claim 1, the at least one of the plurality of optical fibers being a 50 micron multi-mode optical fiber.

19. The fiber optic ribbon of claim 1, the inner coating is the cured reaction product of an inner curable composition comprising an oligomer, a hydroxy-functional monomer in a concentration of 0.1 to 25%, by weight, and a co-monomer.

20. A tube assembly comprising:
at least one optical waveguide, the at least one optical waveguide having a core, a cladding, and a coating system, the coating system including an inner coating and an outer coating, wherein the outer coating is the cured reaction product of an outer curable composition comprising a total oligomer concentration of less than about 15%, by weight, and at least one monomer, wherein the inner coating has a Young's modulus of about 1 MPa or less, and the outer coating has a Young's modulus of at least about 1400 MPa or greater; and
a tube, the at least one optical waveguide being disposed within the tube.

21. The tube assembly of claim 20, the at least one optical waveguide further includes an ink layer.

22. The tube assembly of claim 20, the at least one optical waveguide includes a further layer.

23. The tube assembly of claim 20, the at least one optical waveguide being a portion of a ribbon.

24. The tube assembly of claim 23, wherein the ribbon has a maximum delta attenuation of about 0.050 dB/km or less for a ribbon optical performance test at a reference wavelength of 1550 nm.

25. The tube assembly of claim 23, wherein the ribbon has a maximum delta attenuation of about 0.400 dB/km or less for a ribbon optical performance test at a reference wavelength of 850 nm.

26. The tube assembly of claim 20, the at least one optical waveguide having a buffer layer.

27. The tube assembly of claim 26, further comprising an interfacial layer between the at least one optical waveguide and the butter layer.

28. The tube assembly of claim 20, the tube being formed from a bimodal material.

29. The tube assembly of claim 20, the tube assembly being a dry tube assembly.

30. The tube assembly of claim 20, further comprising a dry insert within the tube.

31. The tube assembly of claim 20, the tube assembly housing a plurality of ribbons, wherein the tube assembly has a ribbon packing density of about 0.15 or greater.

32. The tube assembly of claim 20, the tube assembly forming a portion of a cable.

33. The tube assembly of claim 20, the inner coating is the cured reaction product of an inner curable composition comprising an oligomer, a hydroxy-functional monomer in a concentration of 0.1 to 25%, by weight, and a co-monomer.

34. The tube assembly of claim 20, the tube assembly being a portion of a cable having at least one strength member.

35. A fiber optic cable comprising:
at least one optical waveguide, the at least one optical waveguide having a core, a cladding, and a coating system, the coating system including an inner coating and an outer coating, wherein the outer coating is the cured reaction product of an outer curable composition comprising a total oligomer concentration of less than about 15%, by weight, and at least one monomer, wherein the inner coating has a Young's modulus of about 1 MPa or less, and the outer coating has a Young's modulus of at least about 1400 MPa or greater; and
a jacket, the at least one optical waveguide being disposed within the jacket.

36. The fiber optic cable of claim 35, the at least one optical waveguide being a portion of a ribbon, wherein the ribbon has a maximum delta attenuation of about 0.050 dB/km or less for a ribbon optical performance test at a reference wavelength of 1550 nm.

37. The fiber optic cable of claim 35, the at least one optical waveguide being a portion of a ribbon, wherein the ribbon has a maximum delta attenuation of about 0.400 dB/km or less for a ribbon optical performance test at a reference wavelength of 850 nm.

38. The fiber optic cable of claim 35, the cable being a dry cable design.

39. The fiber optic cable of claim 38, the dry cable design having a dry insert.

40. The fiber optic cable of claim 35, the at least one optical waveguide being a 50 micron multi-mode optical fiber.

41. The fiber optic cable of claim 35, the at least one optical waveguide being buffered.

42. The fiber optic cable of claim 35, the cable being flame-retardant.

43. The fiber optic cable of claim 35, the cable being a figure eight design.

44. The fiber optic cable of claim 35, the inner coating is the cured reaction product of an inner curable composition comprising an oligomer, a hydroxy-functional monomer in a concentration of 0.1 to 25%, by weight, and a co-monomer.

* * * * *